(12) United States Patent
Kunieda

(10) Patent No.: US 10,565,246 B2
(45) Date of Patent: Feb. 18, 2020

(54) INFORMATION PROCESSING APPARATUS, INFORMATION PROCESSING METHOD, AND INFORMATION PROCESSING SYSTEM

(71) Applicant: Takayuki Kunieda, Tokyo (JP)

(72) Inventor: Takayuki Kunieda, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 350 days.

(21) Appl. No.: 15/682,665

(22) Filed: Aug. 22, 2017

(65) Prior Publication Data

US 2018/0052837 A1  Feb. 22, 2018

(30) Foreign Application Priority Data

Aug. 22, 2016 (JP) .................................. 2016-162229

(51) Int. Cl.
*G06F 16/40* (2019.01)
*G06F 16/48* (2019.01)
*G06F 16/438* (2019.01)

(52) U.S. Cl.
CPC ............ *G06F 16/40* (2019.01); *G06F 16/438* (2019.01); *G06F 16/489* (2019.01)

(58) Field of Classification Search
CPC ....... G06F 16/40; G06F 16/489; G06F 16/438
USPC ......................................................... 707/736
See application file for complete search history.

(56) References Cited

U.S. PATENT DOCUMENTS

| | | | | |
|---|---|---|---|---|
| 6,332,147 B1 * | 12/2001 | Moran | ..................... | G06F 16/40 715/203 |
| 6,622,171 B2 * | 9/2003 | Gupta | ............... | H04L 29/06027 709/219 |
| 6,771,875 B1 | 8/2004 | Kunieda et al. | | |
| 7,096,271 B1 * | 8/2006 | Omoigui | ........... | H04L 29/06027 709/217 |
| 7,299,405 B1 * | 11/2007 | Lee | ........................ | G06Q 10/10 715/700 |
| 7,457,784 B2 | 11/2008 | Hashimoto et al. | | |

(Continued)

FOREIGN PATENT DOCUMENTS

| | | |
|---|---|---|
| JP | 2008-172582 | 7/2008 |
| JP | 2015-041373 | 3/2015 |

OTHER PUBLICATIONS

Brotherton, Jason A., et al., "Automated Capture, Integration, and Visualization of Multiple Media Streams", MMCS 1998, Austin, TX , Jul. 1998, pp. 54-63.*

(Continued)

*Primary Examiner* — Robert Stevens
(74) *Attorney, Agent, or Firm* — Harness, Dickey & Pierce, P.L.C.

(57) ABSTRACT

An information processing apparatus includes processing circuitry. The processing circuitry processing circuitry is configured to acquire information sequentially in accordance with a first timeline; set, to the first timeline, a first timepoint and a second timepoint that is subsequent to the first timepoint on the first timeline; and present target information over a period between the second timepoint and a third timepoint that is subsequent to the second timepoint on the timeline, in accordance with a second timeline having a unit time shorter than a unit time of the first timeline. The target information is included in a period between the first timepoint and the third timepoint out of the acquired information.

10 Claims, 42 Drawing Sheets

(56) References Cited

U.S. PATENT DOCUMENTS

| | | | | |
|---|---|---|---|---|
| 7,809,792 | B2* | 10/2010 | Hirata | G11B 27/105 709/205 |
| 7,840,693 | B2* | 11/2010 | Gupta | G06Q 30/0242 709/219 |
| 7,995,074 | B2* | 8/2011 | Okamoto | G06F 3/04855 345/619 |
| 8,799,757 | B2* | 8/2014 | Jewsbury | G11B 27/005 715/203 |
| 2002/0165721 | A1* | 11/2002 | Chang | G10L 19/00 704/503 |
| 2004/0017511 | A1 | 1/2004 | Kunieda | |
| 2004/0027369 | A1* | 2/2004 | Kellock | G11B 27/034 715/716 |
| 2004/0030729 | A1 | 2/2004 | Yamagata et al. | |
| 2004/0114541 | A1* | 6/2004 | Caspi | H04L 29/06027 370/260 |
| 2006/0010366 | A1 | 1/2006 | Hashimoto et al. | |
| 2008/0079693 | A1* | 4/2008 | Okamoto | G06F 3/01 345/157 |
| 2010/0306018 | A1* | 12/2010 | Burtner | G06Q 10/10 705/7.19 |
| 2012/0047421 | A1* | 2/2012 | Holman | G06Q 10/1091 715/202 |
| 2012/0110446 | A1 | 5/2012 | Kunieda | |
| 2013/0151965 | A1* | 6/2013 | Demiris | G11B 27/34 715/716 |
| 2013/0163039 | A1 | 6/2013 | Fujii et al. | |
| 2013/0282804 | A1* | 10/2013 | Mate | G11B 27/11 709/204 |
| 2014/0006387 | A1 | 1/2014 | Kishi et al. | |
| 2014/0006435 | A1 | 1/2014 | Kishi et al. | |
| 2014/0033073 | A1* | 1/2014 | Pegg | H04L 65/403 715/753 |
| 2014/0164852 | A1* | 6/2014 | Sumiyoshi | H04N 7/155 714/57 |
| 2014/0282089 | A1* | 9/2014 | West | H04L 65/403 715/753 |
| 2014/0325393 | A1* | 10/2014 | Quinn | H04N 7/15 715/753 |
| 2015/0054968 | A1 | 2/2015 | Murata | |
| 2015/0134742 | A1* | 5/2015 | Ikeda | H04L 65/403 709/204 |

OTHER PUBLICATIONS

Haubold, Alexander, et al., "VAST MM: Multimedia Browser for Presentation Video", CIVR '07, Amsterdam, The Netherlands, Jul. 9-11, 2007, pp. 41-48.*

Myers, Brad A., et al., "A Multi-View Intelligent Editor for Digital Video Libraries", JCDL '01, Roanoke, VA, Jun. 24-28, 2001, pp. 106-115.*

* cited by examiner

INFORMATION PROCESSING APPARATUS, INFORMATION PROCESSING METHOD, AND INFORMATION PROCESSING SYSTEM

CROSS-REFERENCE TO RELATED APPLICATIONS

The present application claims priority under 35 U.S.C. §119 to Japanese Patent Application No. 2016-162229, filed Aug. 22, 2016. The contents of which are incorporated herein by reference in their entirety.

BACKGROUND OF THE INVENTION

1. Field of the Invention

The present invention relates to an information processing apparatus, an information processing method, and an information processing system.

2. Description of the Related Art

For example, it is now assumed that during a meeting in which speech is recorded using a conventional minutes creating system, one of the participants temporarily leaves the meeting, and, after the participant returns, the participant checks for the details of the meeting during the time of his/her absence using the recorded speech. In such a case, the participant returning the meeting needs to replay the speech recorded over a period between the timepoint at which the participant has left the meeting and the timepoint at which the participant has returned, in the sequence of time in the meeting, so that the participant can catch up with the proceedings of the meeting. However, when the speech is merely replayed at higher speed, the participant often experiences difficulty in recognizing the spoken words in the speech being replayed, disadvantageously.

SUMMARY OF THE INVENTION

According to one aspect of the present invention, an information processing apparatus includes processing circuitry. The processing circuitry processing circuitry is configured to acquire information sequentially in accordance with a first timeline; set, to the first timeline, a first timepoint and a second timepoint that is subsequent to the first timepoint on the first timeline; and present target information over a period between the second timepoint and a third timepoint that is subsequent to the second timepoint on the timeline, in accordance with a second timeline having a unit time shorter than a unit time of the first timeline. The target information is included in a period between the first timepoint and the third timepoint out of the acquired information.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
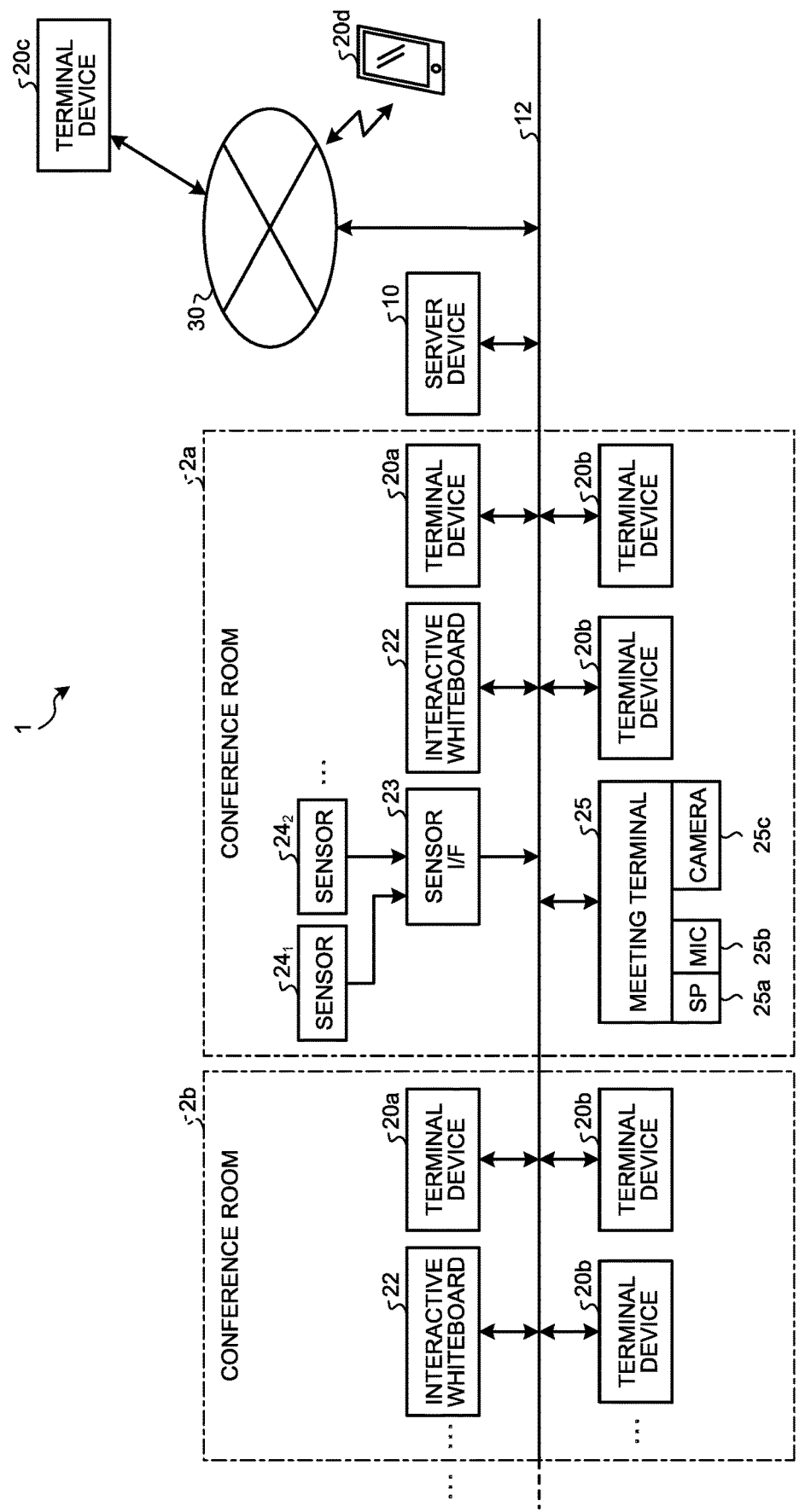
FIG. 1 is a block diagram illustrating an exemplary configuration of an information processing system applicable to embodiments of the present invention.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An object of an embodiment is to enable the information between two points in a timeline to be checked easily.

Configuration Applicable to Embodiments

FIG. 1 illustrates an exemplary configuration of an information processing system applicable to an embodiment of the present invention. In FIG. 1, this information processing system 1 includes a server device 10 serving as an information processing apparatus, and the server device 10 is connected to a device deployed in one or more conference rooms 2a, 2b, . . . over a network 12, such as a local area network (LAN).

Deployed in the conference room 2a, for example, are one or more terminal devices 20a and 20b that are connected to the network 12, an interactive whiteboard 22, a sensor interface (I/F) 23, and a meeting terminal 25. As the terminal devices 20a and 20b, desktop or laptop personal computers, or tablet computers may be used. The terminal devices 20a and 20b are connected to the network 12 over the wire or wirelessly. Each of the terminal devices 20a and 20b has an internal microphone, or enabled to be connected with a microphone, and is enabled to handle the speech recorded with the microphone as speech data.

The interactive whiteboard 22, the details of which will be described later, is provided with a large touch panel that is an integration of a display device and an input device, a central processing unit (CPU), a memory, and a communication I/F, and is installed in the conference room 2a immovably, for example. The interactive whiteboard 22 updates a display screen that is displayed on the display device of the touch panel, in response to a drawing operation of a user performed on the touch panel. The interactive whiteboard 22 can also present a display based on data received over the network 12, and save the image data of a display screen presented by the display device.

To the sensor I/F 23, one or more sensors $24_1$, $24_2$, are connected. Each of the sensors $24_1$, $24_2$, . . . detects environment information of the conference room 2a. Examples of the environment information of the conference room 2a include information as to whether the interior light installed in the conference room 2a is ON, and whether the door is opened or closed. The sensor I/F 23 transmits detection results that are based on the outputs from the respective sensors 24₁, 24₂, ... to the server device 10 over the network 12.

The meeting terminal 25 includes, for example, a speaker (SP) 25a, a microphone (MIC) 25b, and a camera 25c capable of capturing a video. The meeting terminal 25 is installed in the conference room 2a immovably, for example, and transmits speech data that is based on the speech recorded with the microphone 25b and captured image data that is captured with the camera 25c to the server device 10 over the network 12. The meeting terminal 25 also replays the speech that is based on the speech data received from the server device 10 over the network 12, using a speaker 25a, for example.

In the conference room 2a, the interactive whiteboard 22 and the terminal devices 20a, 20b are possibly in positional relations where the users using the terminal devices 20a, 20b can see the display of the interactive whiteboard 22 from their respective positions where the user can operate their terminal devices, for example. The meeting terminal 25 is installed in a manner at least enabling the camera 25c to capture the display of the interactive whiteboard 22, enabling the users in the conference room 2a to hear the speech replayed by the speaker 25a, and enabling the microphone 25b to record what are spoken by the users in the conference room 2a.

Because the conference room 2b has a configuration that is substantially the same as that of the conference room 2a, the explanation thereof is omitted herein. The positional relations and configurations of the devices included in the conference rooms 2a, 2b, ... are not particularly limited, as long as the devices can be connected to the server device 10.

The information processing system 1 also includes the terminal devices 20a and 20b, the interactive whiteboard 22, the sensor I/F 23, and the sensors 24₁, 24₂, ... , and the meeting terminal 25 that are installed in the conference room 2a. In the same manner, the information processing system 1 may also include the same elements installed in the conference room 2b, being the same as those included in the conference room 2a.

The information processing system 1 also includes one or more terminal devices 20c and 20d that are connected to the server device 10 over an external network 30, such as the Internet. These terminal devices 20c and 20d are used in locations remote from the conference room 2a, where the users cannot observe the conference room 2a at least directly, for example.

Illustrated herein is an example in which the terminal device 20c is an immovable device such as a desktop computer, and the terminal device 20d is a mobile device such as a multifunctional mobile telephone terminal (smartphone) or a tablet computer. It is assumed herein that a laptop computer is included as the immovable device, and the terminal device 20c may be a laptop computer. Each of the terminal devices 20c and 20d has an internal microphone, or enabled to be connected with a camera, and is enabled to handle the speech recorded with the microphone, and the captured video captured with the camera, as speech data and video data, respectively.

Figure 2:
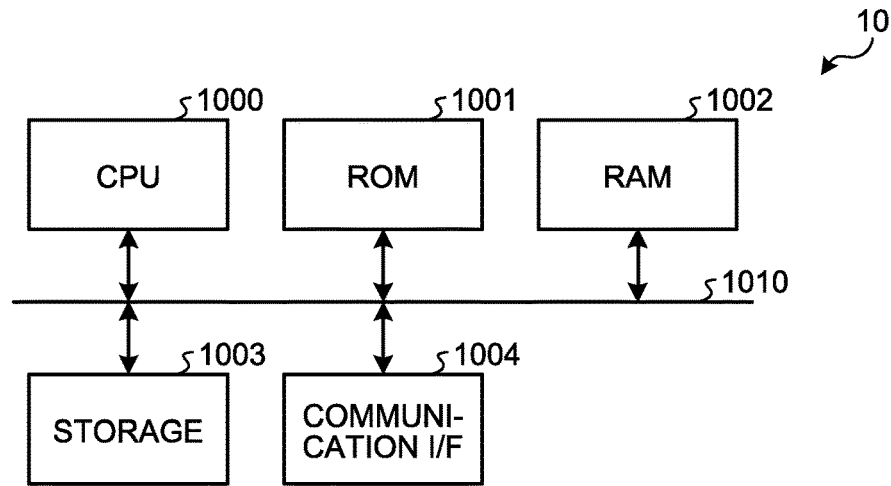
FIG. 2 is a block diagram illustrating an exemplary hardware configuration of a server device applicable to the embodiments.

FIG. 2 illustrates an exemplary hardware configuration of the server device 10 applicable to the embodiments. In FIG. 2, the server device 10 includes a CPU 1000, a read-only memory (ROM) 1001, a random access memory (RAM) 1002, a storage 1003, and a communication I/F 1004, and these units are communicatively connected to one another via a bus 1010.

The storage 1003 is provided as a hard disk drive or a non-volatile semiconductor memory, and stores therein various computer programs and data for allowing the CPU 1000 to operate. For example, computer programs and data allowing the server device 10 to start and to operate are stored in the ROM 1001 in advance. The CPU 1000 operates in accordance with a computer program stored in the storage 1003 or the ROM 1001, using the RAM 1002 as a working area, and controls the operations of the entire server device 10. The communication I/F 1004 controls the communication over the network 12, in accordance with instructions issued by the CPU 1000.

Figure 3:
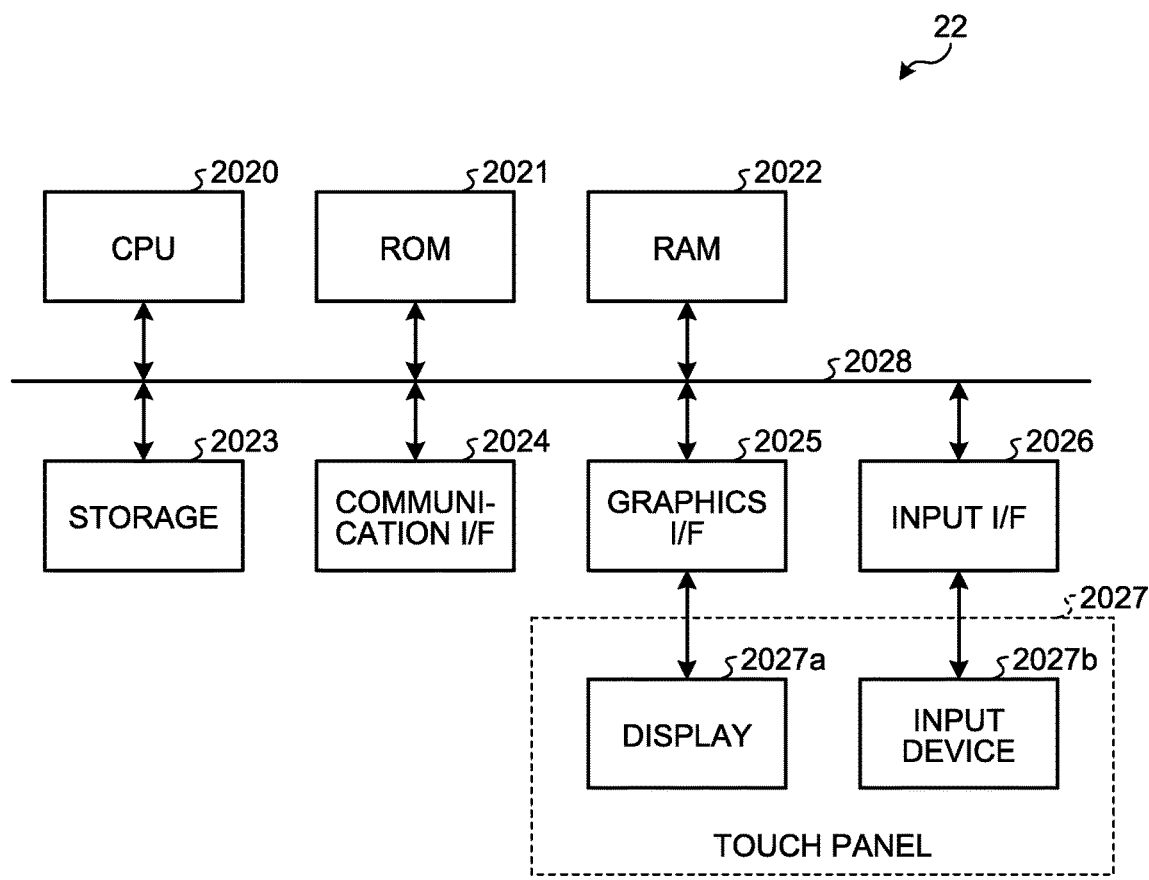
FIG. 3 is a block diagram illustrating an exemplary hardware configuration of an interactive whiteboard applicable to the embodiments.

FIG. 3 illustrates an exemplary hardware configuration of the interactive whiteboard 22 applicable to the embodiments. In FIG. 3, the interactive whiteboard 22 includes a CPU 2020, a ROM 2021, a RAM 2022, a storage 2023, a communication I/F 2024, a graphics I/F 2025, and an input I/F 2026, and these units are communicatively connected to each other over the bus 2028. In the manner described above, the interactive whiteboard 22 can be considered as a computer including the CPU 2020, the ROM 2021, and the RAM 2022.

The interactive whiteboard 22 also includes a display 2027a and an input device 2027b. The display 2027a and the input device 2027b are integrated into what is called a touch panel 2027.

The storage 2023 is provided as a hard disk drive or a non-volatile semiconductor memory, and stores therein various computer programs and data for allowing the CPU 2020 to operate. Computer programs and data allowing interactive whiteboard 22 to start and to operate are stored in the ROM 2021 in advance, for example. The CPU 2020 operates in accordance with a computer program stored in the storage 2023 or the ROM 2021, using the RAM 2022 as a working area, and controls the operations of the entire interactive whiteboard 22. The communication I/F 2024 controls the communication over the network 12, in accordance with instructions issued by the CPU 2020.

The graphics I/F 2025 converts a display control signal generated by the CPU 2020 based on a computer program into a display signal that can be handled by the display 2027a, and supplies the converted signal to the display 2027a. The display 2027a includes a liquid crystal display (LCD) serving as a display device, and a driving circuit for driving the display device based on the display signal. The input I/F 2026 converts the signal output from the input device 2027b in response to a touch operation performed on the input device 2027b into a control signal that can be handled by the CPU 2020, for example, and outputs the control signal to the bus 2028.

Figure 4:
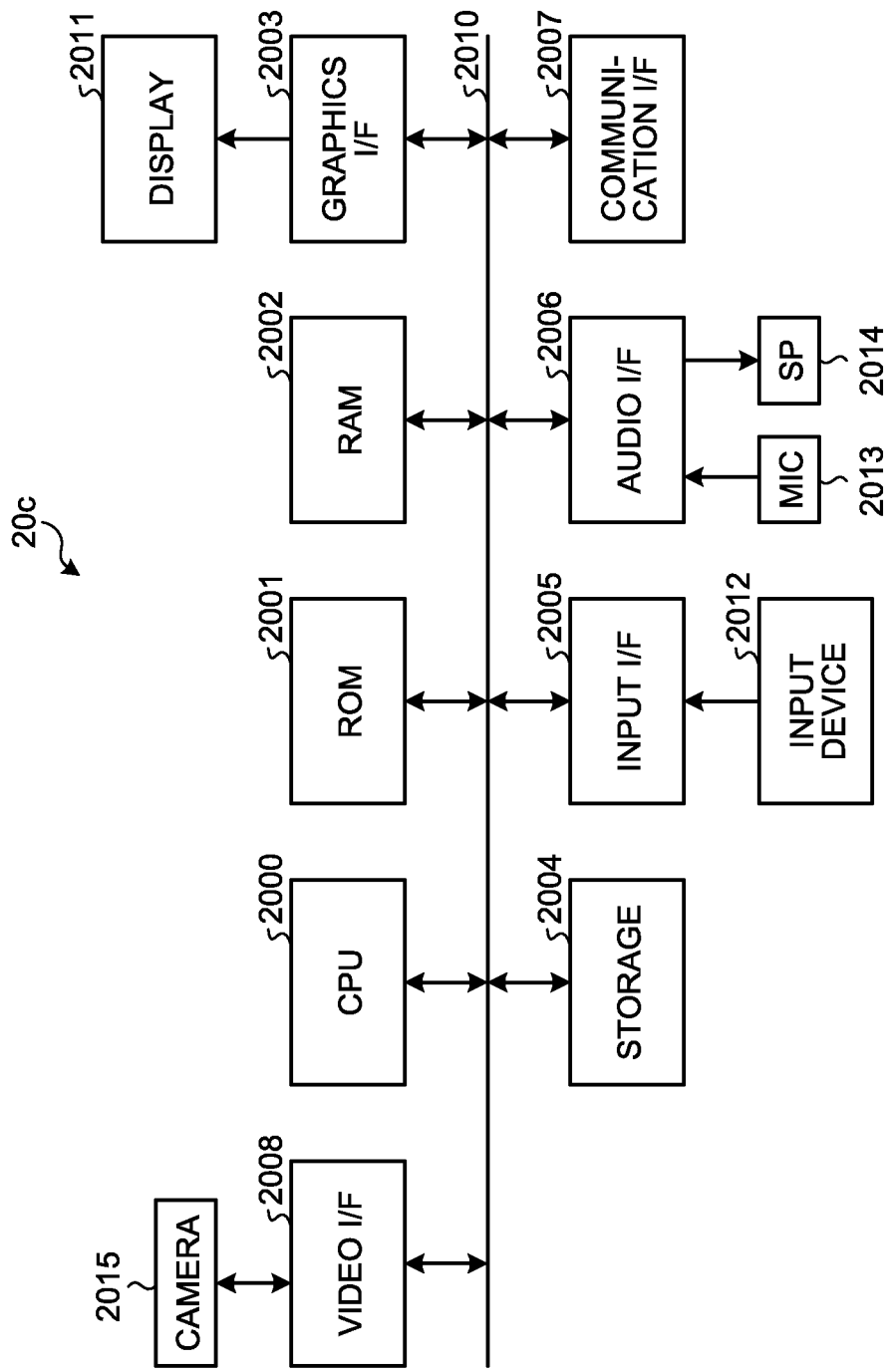
FIG. 4 is a block diagram illustrating an exemplary hardware configuration of a terminal device applicable to the embodiments.

FIG. 4 illustrates an exemplary hardware configuration of the terminal device 20c applicable to the embodiments. It is assumed herein that the terminal devices 20a and 20b have the same configuration as that of the terminal device 20c, and the explanations thereof are omitted herein.

In FIG. 4, the terminal device 20c includes a CPU 2000, a ROM 2001, a RAM 2002, a graphics I/F 2003, a storage 2004, an input I/F 2005, an audio I/F 2006, a communication I/F 2007, and a video I/F 2008, and these units are communicatively connected to each other over the bus 2010.

The storage 2004 is provided as a hard disk drive or a non-volatile semiconductor memory, and stores therein various computer programs and data for allowing the CPU 2000 to operate. Examples of the computer programs stored in the storage 2004 include an operating system (OS) that controls the basic operations of the terminal device 20c, and a browser application program (hereinafter, referred to as a browser) that presents a display based on hypertext markup language (HTML) data, or performing various controls. Computer programs and data allowing the terminal device 20c to start and to operate are stored in the ROM 2001 in advance. The CPU 2000 operates in accordance with a computer program stored in the storage 2004 or the ROM 2001, using the RAM 2002 as a working area, and controls the operations of the entire terminal device 20c.

The graphics I/F 2003 converts the display control signal generated by the CPU 2000 based on a computer program into a display signal that can be handled by a display 2011, and supplies the display signal to the display 2011. The display 2011 includes, for example, an LCD serving as a display device, and a driving circuit for driving the display device in response to the display signal.

Connected to the input I/F 2005 are a pointing device, such as a mouse, and an input device 2012, such as a keyboard. The input I/F 2005 converts a signal that is output from the input device, output in response to a user operation performed with the input device 2012, into a control signal that can be handled by the CPU 2000, and outputs the control signal to the bus 2010. Without limitation to the example explained above, the input I/F 2005 may also include a data I/F such as a universal serial bus (USB) for exchanging data with an external device.

The audio I/F 2006 converts an analog speech signal supplied from the microphone (MIC) 2013 into digital speech data, and outputs the digital speech data to the bus 2010, for example. The audio I/F 2006 converts the digital speech data supplied via the bus 2010 into an analog speech signal, and outputs the analog speech signal to the speaker (SP) 2014. The speaker 2014 reproduces the sound based on the speech signal output from and supplied by the audio I/F 2006.

The communication I/F 2007 controls the communication over the network 12, in accordance with instructions issued by the CPU 2000.

To the video I/F 2008, the camera 2015 capturing an image of a subject, and outputting the captured image data is connected. The camera 2015 can capture a video, and outputs a captured image data resultant of video capturing at a frame rate such as 60 frames per second. The video I/F 2008 outputs the captured image data output from the camera 2015 to the bus 2010.

Figure 5:
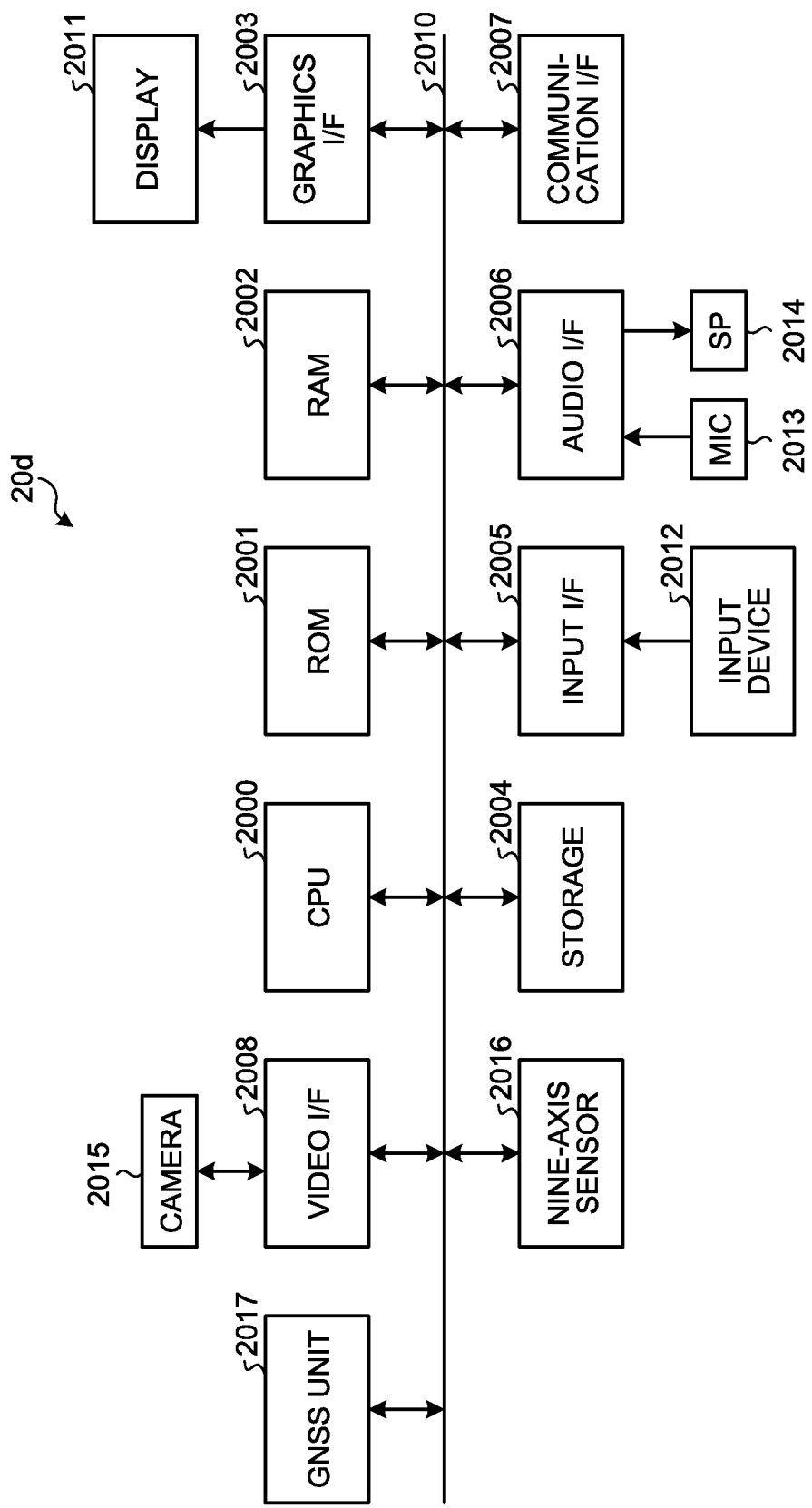
FIG. 5 is a block diagram illustrating an exemplary hardware configuration of a terminal device applicable to the embodiments.

FIG. 5 illustrates an exemplary hardware configuration of the terminal device 20d, configured as a tablet computer or a smartphone, applicable to the embodiments. In FIG. 5, parts that are the same as those in FIG. 4 described above are given the same reference numerals, and detailed explanations thereof are herein omitted.

In FIG. 5, the terminal device 20d is provided with a nine-axis sensor 2016 and a global navigation satellite system (GNSS) unit 2017, in addition to the elements included in the terminal device 20c. The nine-axis sensor 2016 includes a gyro sensor (angular velocity sensor) for performing detections in the three axes including the X, the Y, and the Z axes, an accelerometer, and a geomagnetic sensor, and outputs the orientation information indicating a change in the orientation of the terminal device 20d (nine-axis sensor 2016), and outputs the information to the bus 2010.

The GNSS unit 2017 supports the GNSS, and receives electric waves from a satellite in the GNSS, and acquires position information indicating the current position based on the information included in the received electric waves. The GNSS unit 2017 is also capable of acquiring time information indicating the current time, as well as the position information. The GNSS unit 2017 outputs the acquired position information and time information to the bus 2010.

Figure 6:
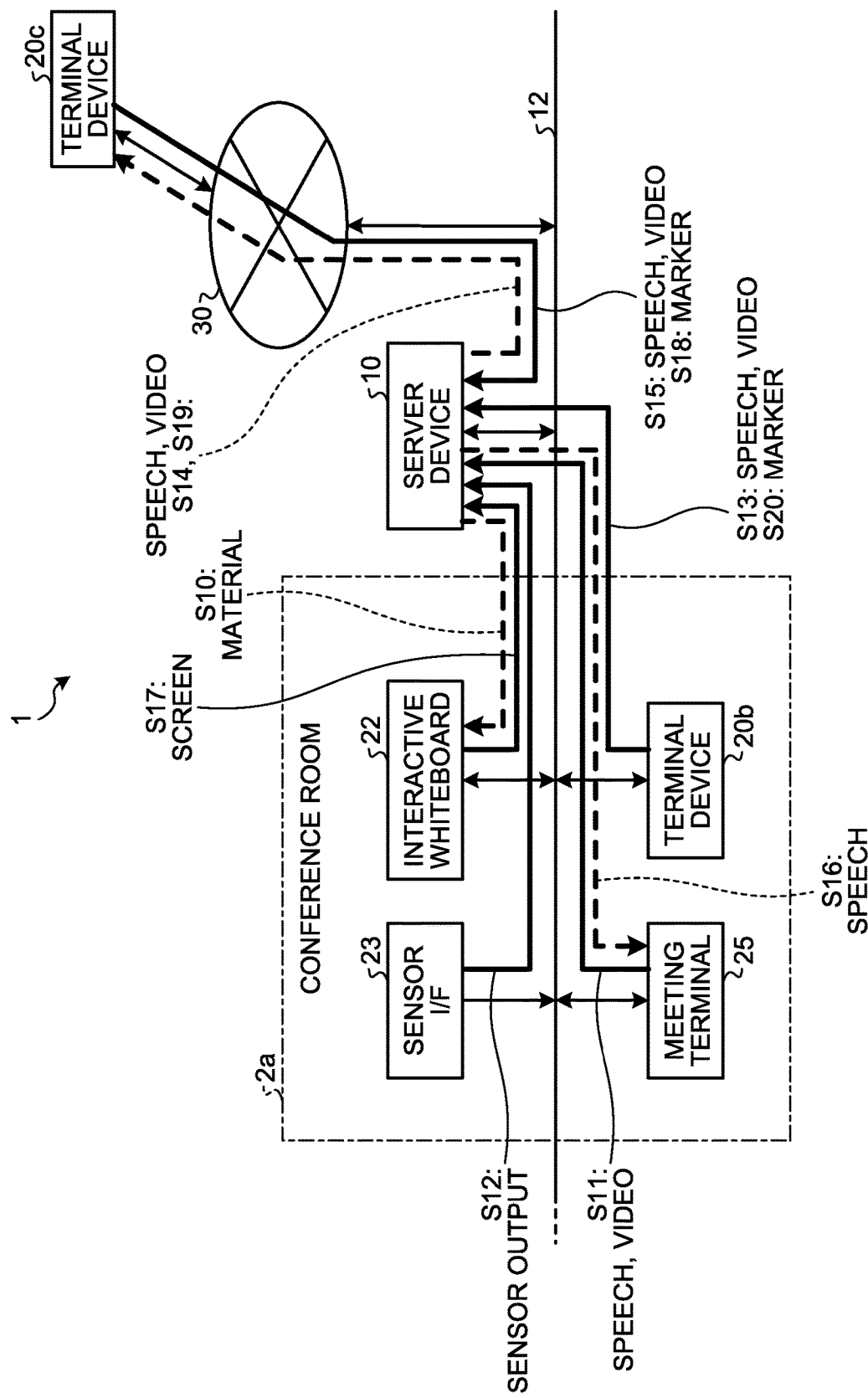
FIG. 6 is a schematic for generally explaining how pieces of information are exchanged in the information processing system applicable to the embodiments.

Overview of Process Performed in Information Processing System Applicable to Embodiments Explained now briefly with reference to FIG. 6 is how pieces of information are exchanged in the information processing system 1 applicable to the embodiments. In FIG. 6, parts that are the same as those in FIG. 1 described above are given the same reference numerals, and detailed explanations thereof are herein omitted.

Explained now is an example in which a meeting is held using the interactive whiteboard 22 in the conference room 2a. The organizer of the meeting finds out the participants who are to participate in the meeting, and registers the material data to be used in the meeting to the server device 10, in advance. It is assumed herein that, there are two participants, in addition to the organizer, one of whom is a participant participating in the meeting using the terminal device 20b in the conference room 2a (referred to as an onsite participant), and the other is a participant participating in the meeting using the terminal device 20c over the network 30 (referred to as a remote participant).

For example, the organizer of the meeting registers the material data to be used in the meeting to the server device 10, and stores the data in the storage 1003, for example, in advance, before the meeting is started. The organizer then takes out the material data stored in the server device 10 from the server device 10 before the meeting is started or during the meeting, and transfers the data to the interactive whiteboard 22 (Step S10). The interactive whiteboard 22 stores the material data received from the server device 10 in the storage 2023, for example, so that a screen that is based on the material data can be displayed on the display 2027a of the touch panel 2027.

When the meeting is started in response to a predetermined operation performed on the interactive whiteboard 22, for example, the server device 10 is notified of the start. Upon receiving the notification indicating the start of the meeting, the server device 10 defines a timeline related to the meeting. For example, the server device 10 defines a timeline with reference to the time at which the notification of the start of the meeting is received, and manages the time elapsed in the meeting based on the defined timeline. When the server device 10 receives the notification of the start of a meeting from the conference rooms 2a and 2b, respectively, the server device 10 defines timelines for the respective meetings held in the conference rooms 2a and 2b, respectively, with reference to the times at which the respective notifications are received. In other words, the server device 10 manages the time elapsed using different timelines for the respective meetings.

Once the meeting is started, the meeting terminal 25 starts recording the speech and capturing a video of the meeting using the microphone 25b and the camera 25c, respectively. The meeting terminal 25 transmits the captured video data and the recorded speech data to the server device 10 (Step S11). When the meeting is started, the sensor I/F 23 is also caused to transmit the detection results from the sensors $24_1$, $24_2$, ... to the server device 10 (Step S12).

The terminal device 20b transmits the speech data that is based on the speech recorded with the internal microphone to the server device 10, for example (Step S13). When the terminal device 20b has an internal camera, the terminal device 20b can transmit video data that is based on the captured video captured with the camera to the server device 10.

The server device 10 receives the speech data and the video data from the meeting terminal 25, and the speech data from the terminal device 20b. The server device 10 transmits the received video data and speech data to the terminal device 20c (Step S14). The server device 10 also stores the received speech data and video data sequentially in the storage 1003, for example, in a manner mapped to the timeline of the meeting.

Figure 7:
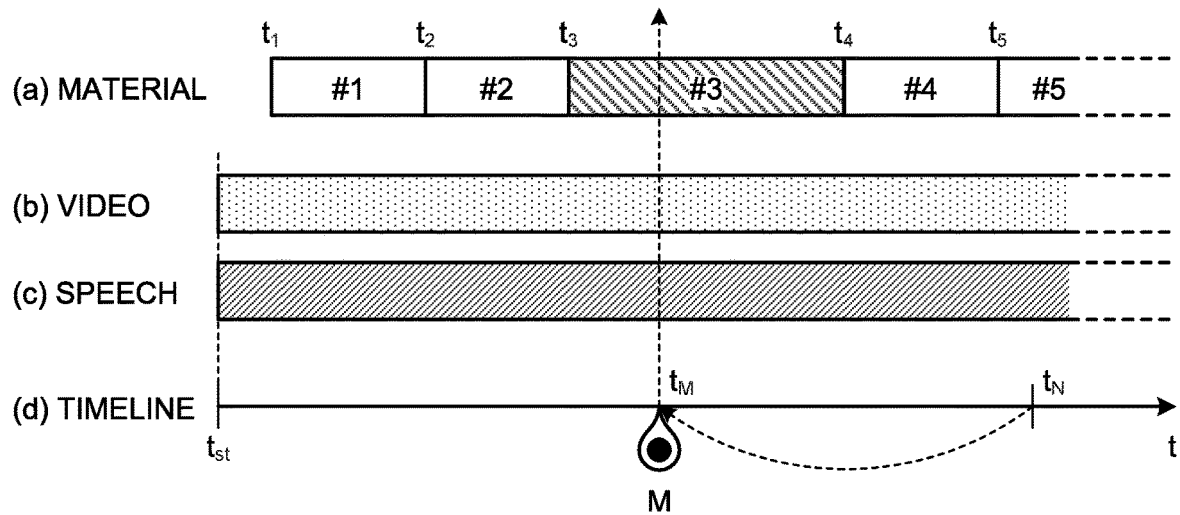
FIG. 7 schematically illustrates a timeline applicable to the embodiments.

FIG. 7 schematically illustrates a timeline applicable to the embodiments. The server device 10 defines the timeline with reference to the time $t_{st}$, which is the time at which the notification of the start of the meeting has been received from the interactive whiteboard 22, as illustrated in (d) of FIG. 7. The server device 10 maps the time in the timeline to the video data (video) and the speech data (speech), as illustrated in (b) and (c) of FIG. 7, received from the meeting terminal 25. In this example, the head of the video data and speech data is mapped to the time $t_{st}$. For the time subsequent thereto, the server device 10 manages the video data and the speech data, as the time on the timeline elapses.

When the server device 10 transmits the speech data to the terminal device 20c at Step S14, the server device 10 also transmits selection information for allowing a user to select which piece of speech data to be replayed, among pieces of speech having been received, to the terminal device 20c. For example, the server device 10 assigns a different channel to each of a plurality of received pieces of speech data. In this example, the server device 10 assigns a channel ch#1 to the speech data received from the meeting terminal 25, and a channel ch#2 to the speech data received from the terminal device 20b.

The terminal device 20c then causes the display 2011 to display a selection screen that is based on selection information for allowing a user to select which one of the pieces of speech data received from the server device 10, either the speech data received over the channel ch#1 or over the channel ch#2, is to be replayed. In response to a user operation made on the selection screen, the terminal device 20c determines the channel of the speech data to be replayed via the speaker 2014, and transmits the channel selection information specifying the determined channel to the server device 10. The server device 10 selects the speech data over the channel specified in the channel selection information received from the terminal device 20c, among the pieces of speech data received from the meeting terminal 25 and the terminal device 20b, and transmits the speech data to the terminal device 20c. The user using the terminal device 20c (the remote participant) can select the speech data allowing the user to better understand the meeting by listening, from the pieces of speech data.

The server device 10 can also transmit material data to the terminal device 20c in response to a request from the terminal device 20c, for example. In the same manner, the server device 10 can transmit material data to the terminal device 20b, in response to a request from the terminal device 20b.

The terminal device 20c transmits the speech data that is based on the speech recorded with the microphone 2013 that is internalized in or connected to the terminal device 20c to the server device 10 (Step S15). In addition, when the camera 2015 that is internalized in or connected to the terminal device 20c is capturing a video, the terminal device 20c may also transmit the video data that is based on the captured video captured by the camera 2015 to the server device 10.

The server device 10 receives the pieces of speech data from the terminal device 20c, stores the pieces of speech data sequentially in the storage 1003 in a manner mapped to the time information on the timeline, and transmits the received speech data to the meeting terminal 25 (Step S16). The meeting terminal 25 receives the speech data recorded in the terminal device 20c from the server device 10, and replays the speech that is based on the received speech data via the speaker 25a.

The interactive whiteboard 22 can store the information displayed on the touch panel 2027 (screen information) in the storage 2023, for example, in response to a user operation. The screen information to be stored includes a drawn image that is drawn, and a material image that is based on the material data displayed on the display 2027a of the touch panel 2027. The interactive whiteboard 22 then transmits the stored screen information to the server device 10 (Step S17). The server device 10 receives the screen information from the interactive whiteboard 22, and stores the received screen information in the storage 1003, for example, in the manner mapped to the time information on the timeline.

The interactive whiteboard 22 can swap the material data to be displayed on the display 2027a or the entire screen to be displayed on the display 2027a, in response to a user operation. The interactive whiteboard 22 can transmit the history of such swaps in the material data or the screen to the server device 10. In FIG. 7, (a) illustrates how the material data is changed in the order of the materials #1, #2, #3, #4, #5, . . . at the time $t_1$, $t_2$, $t_3$, $t_4$, $t_5$, . . . , respectively, along the timeline.

When the material #1 is displayed on the display 2027a at the time $t_1$, for example, the interactive whiteboard 22 transmits information indicating the material #1 and information indicating the time $t_1$ to the server device 10. Once the server device 10 receives the information indicating the material #1 and the information indicating the time $t_1$, the server device 10 stores the information indicating the material #1 and the information indicating the time $t_1$ in the storage 1003, for example, in a manner mapped to each other.

The server device 10 can store therein specific time on the timeline. For example, when the terminal device 20c receives a user operation for assigning a marker performed at some timing, the terminal device 20c transmits a marker assignment request, including the time information indicating the time at which the marker assigning operation is received, to the server device 10 (Step S18). In response to this request, the server device 10 sets marker information including the time information that is included in the request, and stores the set marker information in the storage 1003, for example. In FIG. 7, (d) illustrates how a marker M that is based on the marker information is set at time $t_M$.

When the server device 10 receives, for example, a replay request based on the assigned marker from the terminal device 20c subsequently (at time $t_N$ in (d) of FIG. 7, for example), the server device 10 transmits the speech data and the video data subsequent to the position corresponding to the time $t_M$, to which the marker is mapped, to the terminal device 20c (Step S19). The terminal device 20c then receives the speech data and the video data from the server device 10. The user using the terminal device 20c can then listen to the speech and watch the video from the timepoint to which the marker is assigned by the user him/herself, for example. In the same manner, the user of the terminal device 20b can also cause the terminal device 20b to transmit a marker assignment request to the server device 10 (Step S20), and listen to the speech and watch the video from the marked timepoint.

Functional Configuration for Implementing Information Processing System According to Embodiment An exemplary functional configuration for implementing the information processing system 1 according to the embodiment will now be explained.

Figure 8:
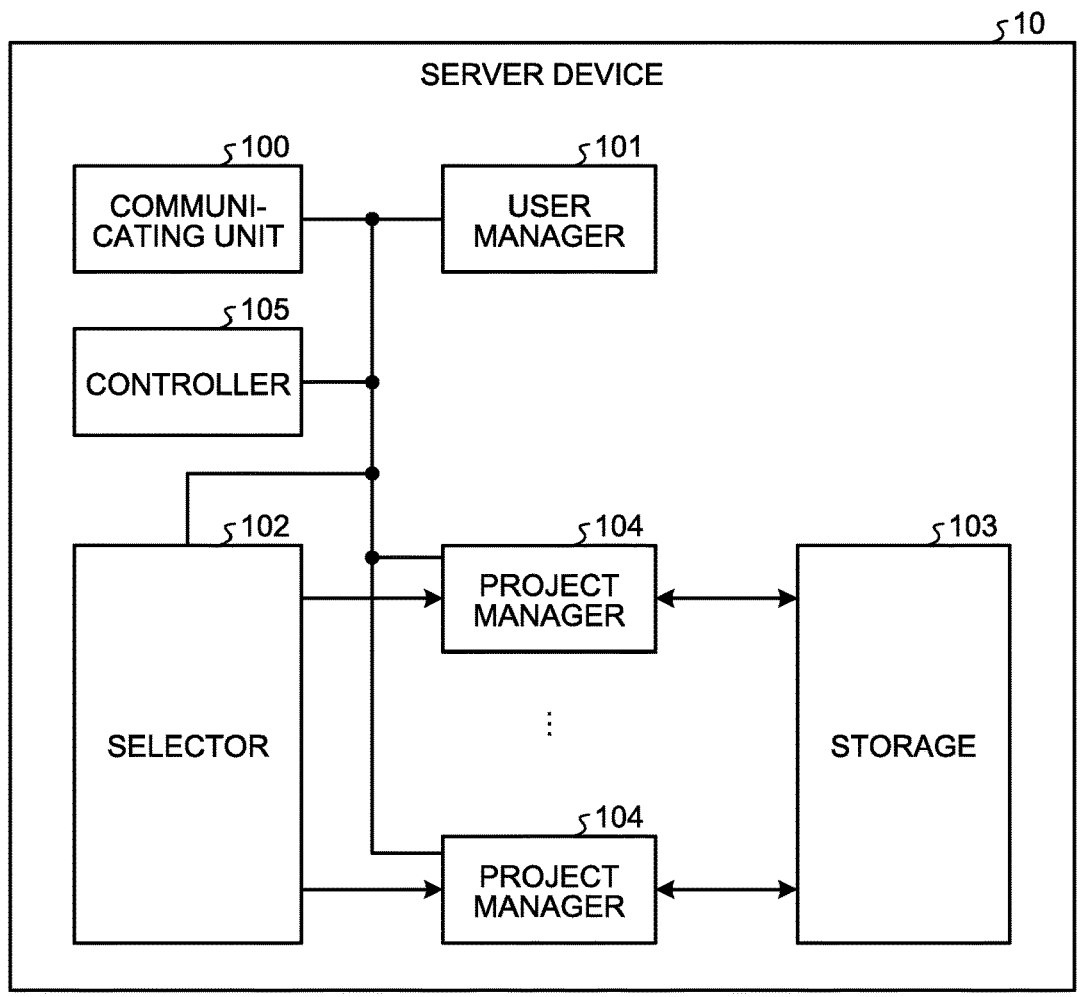
FIG. 8 is an exemplary functional block diagram for explaining the functions of the server device illustrated in FIG. 1.

FIG. 8 is an exemplary functional block diagram for explaining the functions of the server device 10 illustrated in FIG. 1. In FIG. 8, the server device 10 includes a communicating unit 100, a user manager 101, a selector 102, a storage 103, one or more project managers 104, and a controller 105. The communicating unit 100, the user manager 101, the selector 102, the storage 103, the project managers 104, and the controller 105 are implemented by a computer program running on the CPU 1000. Without limitation to the example explained above, the communicating unit 100, the user manager 101, the selector 102, the storage 103, the project managers 104, and the controller 105 may be configured as, partly or entirely, hardware circuits operating in cooperation with one another.

In the server device 10, the controller 105 controls the overall operation of the server device 10. The communicating unit 100 performs communications over the network 12. The communicating unit 100 receives accesses from the terminal devices 20a, 20b, 20c, and 20d running a browser, for example. The server device 10 then provides information requested by the terminal devices 20a, 20b, 20c, and 20d to the terminal devices 20a, 20b, 20c, and 20d, respectively.

The user manager 101 manages information related to users who are permitted to access the server device 10. Table 1 gives an example of a user managing table used by the user manager 101 managing the user information. The user managing table is stored in the storage 1003, for example.

In Table 1, the user managing table has one or more records each of which includes items "user ID", "user name", "password", "email address", and "destination information".

TABLE 1

| User ID | User name | Password | Email address | Destination information |
|---------|-----------|----------|---------------|-------------------------|
| user001 | OOO | 123abc | mail1@example.com | 1234wxyz |
| user002 | XXX | 234dfe | mail2@example.com | 5678abcd |
| ... | ... | ... | ... | ... |

The item "user ID" stores therein a user ID that is identification information for identifying a user who is specified in the record. The item "user name" stores therein the user name of the user corresponding to the record. The item "password" stores therein a password used in authenticating the user corresponding to the record when the user accesses the server device 10. The server device 10 authenticates a user using combination of the user ID and the password, for example. The item "email address" stores therein an email address owned by the user corresponding to the record. The item "destination information" stores therein the destination information (such as a media access control (MAC) address) of the terminal device mainly used by the user corresponding to the record.

In the server device 10, each of the one or more project managers 104 manages a project. A project forms a group of a plurality of users, and the server device 10 implements the communications among the users belonging to the group, for each of such projects.

In each of the conference rooms 2a, 2b, ..., a meeting is assumed to be held by members who are users belonging to one project. The meeting is, however, not limited to such an example, and a meeting may be held in one conference room with users across a plurality of projects attending as members, or users belonging to one project may be scattered across the meetings held in a plurality of conference rooms. In the explanation hereunder, it is assumed that one project corresponds to one meeting.

As a method for participating in a meeting according to the embodiment, the following three participation methods are defined:

(1) Onsite participation;

(2) Remote participation; and (3) Semi-participation.

(1) Onsite participation is a participation method in which a participant is in the same room as the organizer of the meeting, for example, and can make discussions directly. In the example illustrated in FIG. 1, it is assumed that a participant participating with the onsite participation (referred to as an onsite participant) uses the terminal device 20b in the conference room 2a. It is also assumed that the onsite participant is a full-time participant, participating from the start to the end of the meeting.

(2) Remote participation is a participation method in which a participant is at a different place (room) from the organizer, and participates in the meeting over the network 30, for example. In the example illustrated in FIG. 1, it is assumed that a participant participating with the remote participation (referred to as a remote participant) uses one of the terminal devices 20c and 20d that are connected to the server device 10 over the network 30. It is also assumed that the remote participant is a full-time participant participating from the start to the end of the meeting, but may also participate in a part of the meeting during some period from the start to the end of the meeting, without limitation to the full-time participation.

(3) Semi-participation is a participation method assuming that a participant only observes the meeting, but does not make any action, such as speaking up, during the meeting. In the example illustrated in FIG. 1, it is assumed that a participant participating with the semi-participation (referred to as a semi-participant) uses one of the terminal devices 20c and 20d that are connected to the server device 10 over the network 30. It is also assumed that the semi-participant is a part-time participant of the meeting, participating partly from the start to the end of the meeting, but the semi-participant may also be a full-time participant, without limitation to being a part-time participant.

Going back to the explanation of FIG. 8, the selector 102 has a project managing table for managing projects. When there is an access from the terminal device 20a having completed the user authentication, for example, the selector 102 provides a project selection screen 400, such as that illustrated in FIG. 9, to the terminal device 20a based on the project managing table, and causes the display 2011 of the terminal device 20a to display the screen. The project selection screen 400 is a screen for allowing the terminal device 20a to select at least one of the projects managed in the project managing table.

Table 2 gives an example of the project managing table applicable to the embodiments. In Table 2, the project managing table has one or more records each of which includes items "project ID", "member user ID", "project name", and "regular time".

TABLE 2

| Project ID | Member user ID | Project name | Regular time |
|---|---|---|---|
| pro001 | user001, user002, . . . | XXX | Weekly, Mon. AM 10 |
| pro002 | user101, user102, . . . | YYY | Weekly, Thu. AM 11 |
| . . . | . . . | . . . | . . . |

The item "project ID" stores therein identification information of a project. The identification information of a project is generated uniquely by the server device 10, when the project is newly created. The item "member user ID" contains a list of the user IDs of the users participating in the project. For the user IDs, the value stored in the item "user ID" in the user managing table presented in Table 1 is used. The item "project name" stores therein the name of the project corresponding to the record. The value stored in the item "project name" is displayed in the project selection screen 400. The item "regular time" stores therein time of an event (such as a meeting) that is regularly held in the project corresponding to the record.

When one of the projects is selected by a user (organizer), the terminal device 20a transmits the selection information indicating the selected project to the server device 10. The selector 102 selects the project in which the terminal device 20a participates, based on the selection information received from the terminal device 20a. The selector 102 calls the project manager 104 corresponding to the selected project based on the selection information received from the terminal device 20a, and enables the project manager 104 to exchange information with the terminal device 20a.

Each of the project managers 104 receives accesses from the terminal devices 20a, 20b, 20c, and 20d participating in the project corresponding to the project manager 104. Each of the project managers 104 also executes various information processes related to the project corresponding to the project manager 104.

The storage 103 causes the storage 1003, for example, to store therein the data managed by each of the project managers 104, in units of the project.

Figure 10:
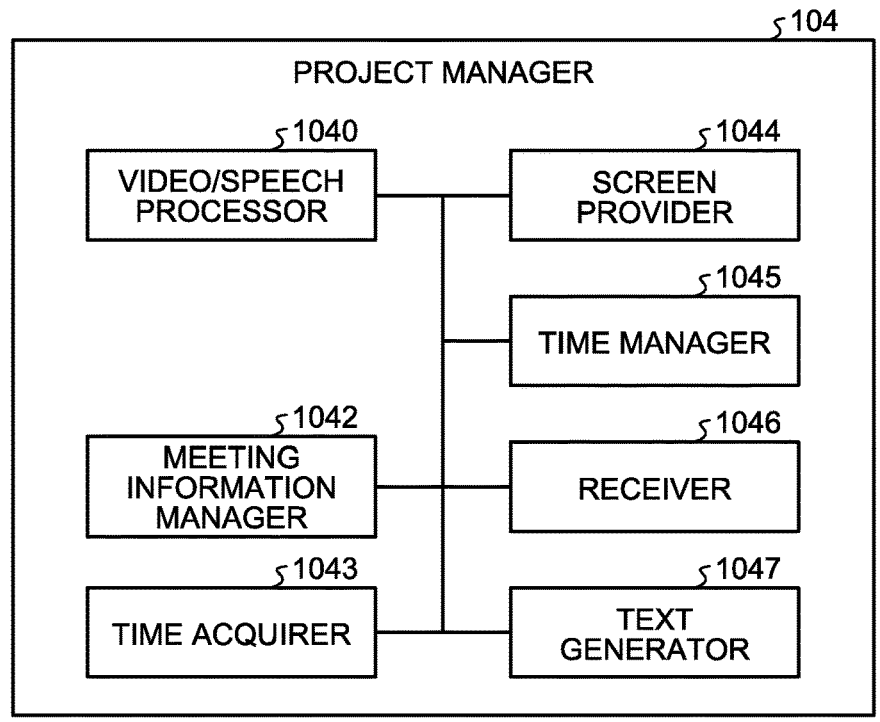
FIG. 10 is an exemplary functional block diagram for explaining the functions of a project manager according to the embodiment.

FIG. 10 is an exemplary functional block diagram for explaining the functions of the project manager 104 according to the embodiment. The project manager 104 includes a video/speech processor 1040, a meeting information manager 1042, a time acquirer 1043, a screen provider 1044, a time manager 1045, a receiver 1046, and a text generator 1047.

In the project manager 104, the video/speech processor 1040 performs a process to the video data and the speech data that are received by the server device 10, and related to the project managed by the project manager 104. For example, the video/speech processor 1040 controls processes such as a process of transmitting and receiving video data and speech data from or at the server device 10, and a process of storing the video data and the speech data in the storage 1003.

To explain using an example of speech data with reference to FIG. 1, the video/speech processor 1040 receives pieces of speech data from the meeting terminal 25, and from the terminal devices 20a to 20d, respectively, and stores the pieces of speech data sequentially in the storage 1003, for example. The video/speech processor 1040 then selects pieces of speech data from the received pieces of speech data based on pieces of channel selection information received from the terminal devices 20c and 20d, respectively, and transmits the selected pieces of speech data to the terminal devices 20c and 20d, respectively, for example.

For the video data, the video/speech processor 1040 receives the video data from the meeting terminal 25, and stores the video data in the storage 1003. The video/speech processor 1040 also transmits the received video data to the terminal devices 20c and 20d, for example, in response to the requests received from the terminal devices 20c and 20d.

The video/speech processor 1040 also reads the video data and the speech data stored in the storage 1003, for example, from a position (time) designated in the timeline, and outputs the data. For example, the video/speech processor 1040 can output the video data and the speech data stored in the storage 1003 from a position designated with the marker information described above.

The meeting information manager 1042 manages information of the meeting held in the project managed by the corresponding project manager 104. Table 3 gives an example of the meeting managing table used by the meeting information manager 1042 managing the meeting information. In Table 3, the meeting managing table has one or more records each of which includes items "project ID", "meeting ID", "meeting name", "participants", "place", "date and time", and "meeting terminal information".

TABLE 3

| Project ID | Meeting ID | Meeting name | Participants | Place | Date and time | Meeting terminal information |
|---|---|---|---|---|---|---|
| pr0001 | mt100 | OOO | user001, user002, . . . | Conference Room A | Jul. 30, 2016 | ABC111 |
| pr0002 | mt200 | XXX | user101, user102, . . . | Conference Room A | Aug. 11, 2016 | FGH222 |
| . . . | . . . | . . . | . . . | . . . | . . . | . . . |

The item "project ID" stores therein the identification information of the project to which the meeting belongs. As the value to be stored in the item "project ID", the value in the item "project ID" in the project managing table in Table 2 is used. The item "meeting ID" stores therein the identification information for identifying the meeting. The identification information of the meeting is generated uniquely by the server device 10, when the meeting is newly created. The item "meeting name" stores therein the name set to the meeting. The item "participants" stores therein user IDs of the participants who participate in the meeting. As the user IDs, the value stored in the item "user ID" in the user managing table presented in Table 1 is used. Selected as the user IDs are those of the users participating in the project that is identified by the value of the item "project ID". The item "place" stores therein information for identifying the place (room) where the meeting is held. The item "date and time" stores therein the time and the date on which the meeting is held. The item "meeting terminal information" stores therein the identification information for identifying the meeting terminal 25 used in the meeting.

The meeting information manager 1042 also manages, for each of the meeting IDs, the material data used in the meeting. The meeting information manager 1042 also manages a drawn image drawn on the interactive whiteboard 22. When something is drawn on the material data displayed on the interactive whiteboard 22 in an overlapping manner, for example, the meeting information manager 1042 manages the drawn image and the material data in a manner mapped to each other. The meeting information manager 1042 also provides a meeting management screen, which is described later, to the terminal device 20*a*, for example.

The time acquirer 1043 acquires time information indicating the current date and time.

The screen provider 1044 provides the screens for the terminal devices 20*a*, 20*b*, 20*c*, and 20*d*. For example, the screen provider 1044 stores display control information for displaying a screen as a Web page described in the hypertext markup language (HTML), for example, in a location specified by a predetermined uniform resource locator (URL). Each of the terminal devices 20*a*, 20*b*, 20*c*, and 20*d* can display the screen provided by the screen provider 1044 by accessing the URL via the browser installed on the terminal device. The HTML has a mechanism for determining the type of device having accessed the Web page (e.g., a desktop computer, a tablet computer, or a smartphone), and can provide a screen suitable for the type of device having accessed.

The screen provider 1044 may provide the screen to each of the terminal devices 20*a*, 20*b*, 20*c*, and 20*d* using any method, without limitation to the method using a Web page. For example, an application program specialized for the information processing system 1 may be installed on each of the terminal devices 20*a*, 20*b*, 20*c*, and 20*d*, and the screen provider 1044 may transmit predetermined display control information for controlling screen display via the specialized application program, to each of the terminal devices 20*a*, 20*b*, 20*c*, and 20*d*.

The time manager 1045 manages the timeline of a meeting held in a project managed by the corresponding project manager 104. For example, the time manager 1045 manages the time acquired from the time acquirer 1043, as time on the timeline with reference to the time at which the meeting is started, that is, as time elapsed from the time at which the meeting is started. The time manager 1045 also manages pieces of marker information specified by the terminal devices 20*a* to 20*d* and transmitted to the server device 10 during the meeting, in a manner mapped to the time with on the timeline (elapsed time).

The time manager 1045 also stores the information that indicates each action performed on the interactive whiteboard 22 and the terminal devices 20*a* to 20*d* (e.g., an operation of displaying material data on the interactive whiteboard 22, or a response from the terminal devices 20*a* to 20*d*), and is received from the interactive whiteboard 22 and the terminal devices 20*a* to 20*d*, in an accumulative manner on the timeline, and records an action log. The log is stored in the storage 1003, for example, in a manner mapped to the meeting identification information (meeting ID).

The receiver 1046 receives marker assignment request transmitted from each of the terminal devices 20*a*, 20*b*, 20*c*, and 20*d*, and detection results transmitted from the sensor I/F 23. The text generator 1047 analyzes the speech data acquired by the video/speech processor 1040, and generates text data from the speech data using an existing technology (e.g., speech recognition). Without limitation to the example explained above, the text generator 1047 may also generate text data from the speech data using an external service that can be connected over the network 30, for example.

An information processing program for implementing the functions of the server device 10 is provided in a manner recorded in a computer-readable recording medium such as a compact disc (CD), a flexible disk (FD), or a digital versatile disc (DVD), as a file in an installable or executable format. Without limitation to the example explained above, the information processing program may be stored in a computer that is connected to a network such as the Internet, and made available for download over the network. The information processing program may also be provided or distributed over a network such as the Internet.

The information processing program has a modular structure including the units described above (the video/speech processor 1040, the meeting information manager 1042, the time acquirer 1043, the screen provider 1044, the time manager 1045, the receiver 1046, and the text generator 1047). As the actual hardware, by causing the CPU 1000 to read the information processing program from a storage medium such as the storage 1003, and to execute the information processing program, the units described above are loaded onto a main memory such as the RAM 1002, and the video/speech processor 1040, so that the meeting information manager 1042, the time acquirer 1043, the screen provider 1044, the time manager 1045, the receiver 1046, and the text generator 1047 are generated on the main memory.

Figure 11:
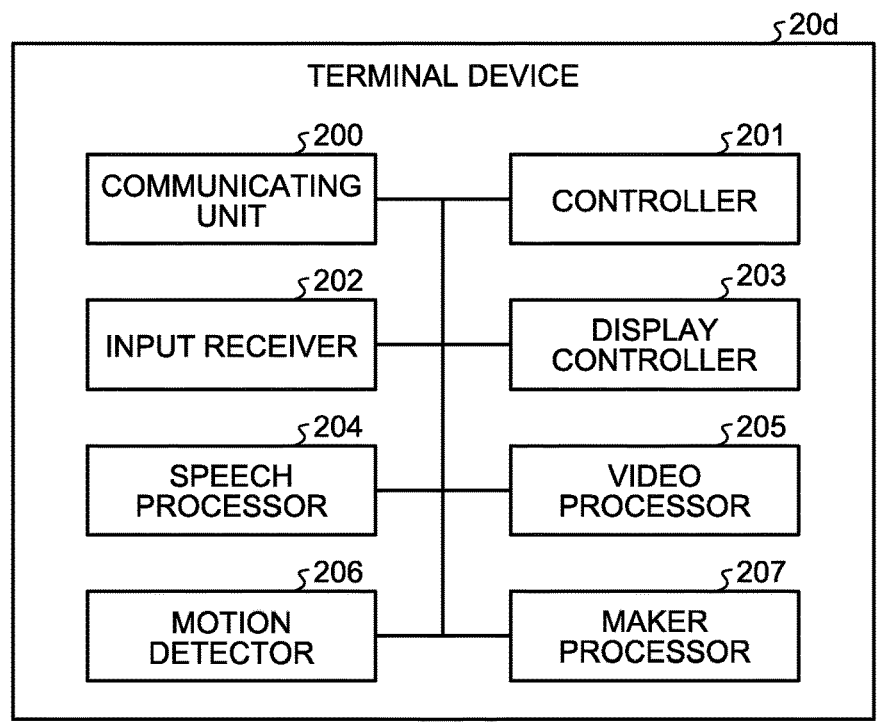
FIG. 11 is an exemplary functional block diagram for explaining the functions of the terminal device applicable to the embodiments.

FIG. 11 is an exemplary functional block diagram for explaining the functions of the terminal device 20*d* applicable to the embodiments. The terminal device 20*d* includes a communicating unit 200, a controller 201, an input receiver 202, a display controller 203, a speech processor 204, a video processor 205, a motion detector 206, and a marker processor 207. The terminal devices 20*a*, 20*b*, and 20*c* have the configuration illustrated in FIG. 11, but with the motion detector 206 removed. The terminal device 20*d* is used as a representative example for explaining the terminal devices 20*a*, 20*b*, 20*c*, and 20*d*.

The communicating unit 200, the controller 201, the input receiver 202, the display controller 203, the speech processor 204, the video processor 205, the motion detector 206, and the marker processor 207 are implemented by a computer program running on the CPU 2000. Without limitation to the example explained above, the communicating unit 200, the controller 201, the input receiver 202, the display controller 203, the speech processor 204, the video processor 205, the motion detector 206, and the marker processor 207 may be configured as, partly or entirely, hardware circuits operating in cooperation with one another.

The communicating unit 200 controls the communication I/F 2007, and performs communication over the network 12 or the network 30. The controller 201 controls the operations of the entire terminal device 20*d*. The input receiver 202 controls the input I/F 2005, and receives inputs of user operations performed on the input device 2012. The display controller 203 generates a display control signal based on the display control information, controls the graphics I/F 2003 based on the display control signal, and causes the display 2011 to display a predetermined screen.

The speech processor 204 applies a predetermined process to speech data. For example, the speech processor 204 applies a predetermined process to digital speech data that is a conversion of the analog speech signal collected by the microphone 2013 and converted by the audio I/F 2006, and passes the speech data to the communicating unit 200. The communicating unit 200 transmits the speech data passed from the speech processor 204 to the server device 10. As another example, the speech processor 204 can also analyze the speech data that is based on the speech signal resultant of the voice of users recorded with the microphone 2013 using an existing voice recognition technology, and extract a specific word included in the speech, for example.

The video processor 205 applies a predetermined process to video data. For example, the video processor 205 applies a predetermined process to the video data captured by the camera 2015 and output from the video I/F 2008, and passes the resultant video data to the communicating unit 200. The communicating unit 200 transmits the video data passed from the video processor 205 to the server device 10. As another example, the video processor 205 can also analyze the video data including, for example, a video of a user captured by the camera 2015, using an existing video analyzing technology, and extract a user taking a specific pose from the video.

The motion detector 206 analyzes the output from the nine-axis sensor 2016, and detects the orientation and a change in the orientation of the terminal device 20d. The marker processor 207 creates marker information, in response to an input received by the input receiver 202.

The functional units included in the terminal device 20d, except for the controller 201 (the communicating unit 200, the input receiver 202, the display controller 203, the speech processor 204, the video processor 205, the motion detector 206, and the marker processor 207) are implemented as a Web application program, for example, that is acquired from the server device 10 by the terminal device 20d over the network 30 (by the terminal device 20b over the network 12) using a browser, and executed by the CPU 2000.

Specific Example of Process Applicable to Embodiments

A process applicable to the embodiments will now be explained more specifically. In the process explained with reference to FIG. 1 below, it is assumed that a meeting is held using the interactive whiteboard 22 in the conference room 2a. It is also assumed that the organizer of the meeting uses the terminal device 20a, and the onsite participant uses the terminal device 20b. Each of the remote participant and the semi-participant may use any one of the terminal device 20c and the terminal device 20d, but in the explanation herein, it is assumed that the remote participant uses the terminal device 20c, and the semi-participant uses the terminal device 20d.

Figure 12:
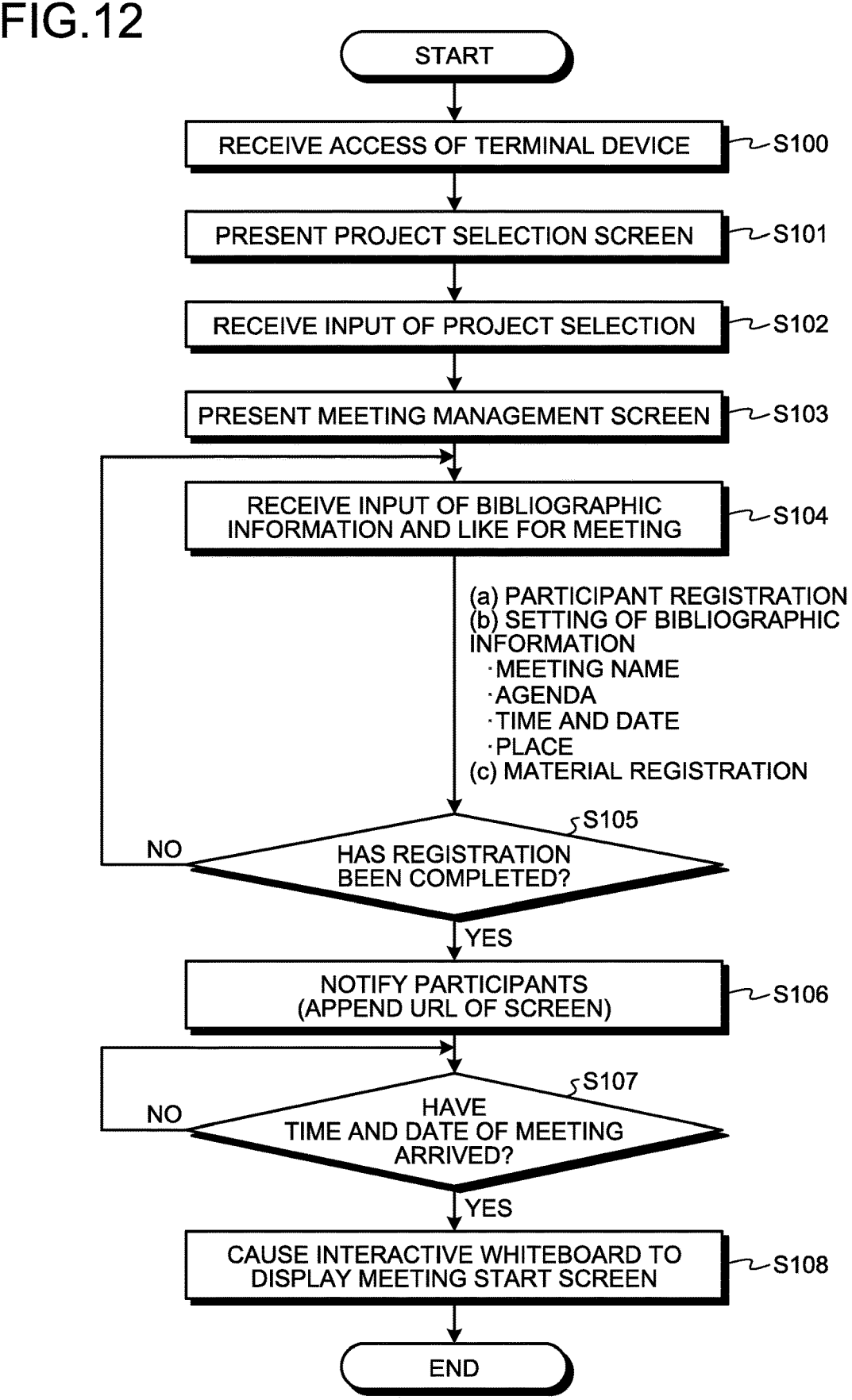
FIG. 12 is an exemplary flowchart illustrating a process performed by the server device during a preparation phase of a meeting, which is an example applicable to the embodiments.

FIG. 12 is an exemplary flowchart illustrating a process performed by the server device 10 during the preparation phase of a meeting applicable to the embodiments. For example, the organizer of the meeting accesses the server device 10 using the terminal device 20a. At Step S100, the server device 10 is accessed by the terminal device 20a. The server device 10 causes the user manager 101 to present a log-in screen that includes an area for entering a user ID and a password to the terminal device 20a, for example, in response to the access of the terminal device 20a. In the server device 10, when the user ID and the password entered via the log-in screen are received from the terminal device 20a, the user manager 101 performs the authentication process by referring to the user managing table, for example, and if the authentication succeeds, the user manager 101 permits the access of the terminal device 20a.

Figure 9:
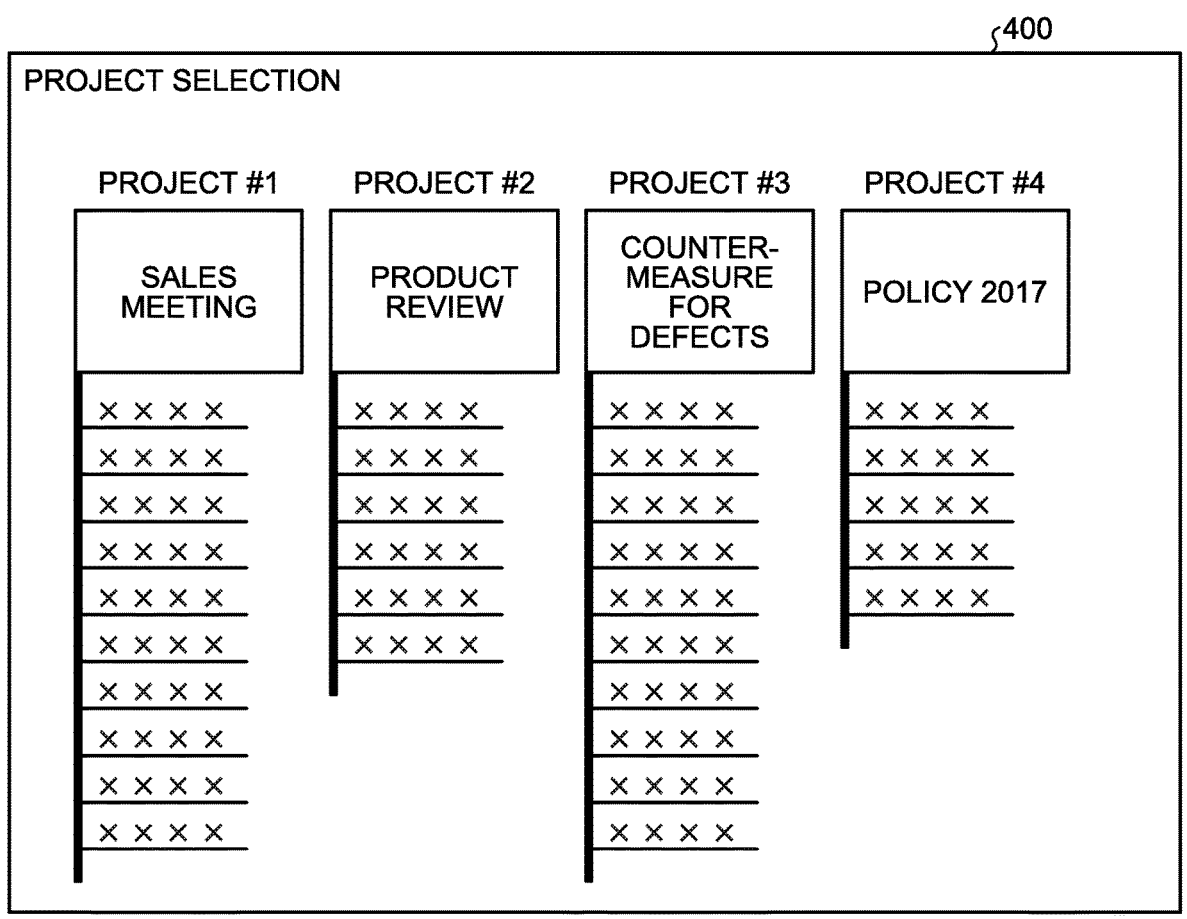
FIG. 9 is a schematic illustrating an example of a project selection screen applicable to the embodiments.

At Step S100, once the access of the terminal device 20a is permitted, at subsequent Step S101, the server device 10 presents the project selection screen 400 illustrated in FIG. 9 to the terminal device 20a, based on the project managing table. For example, the organizer of the meeting operates the terminal device 20a, and designates the project for which a meeting is to be held, by inputting a selection of a project on the project selection screen 400. The terminal device 20a transmits the input result of project selection to the server device 10.

The organizer of the meeting may newly create a project for which a meeting is to be held. In such a case, the selector 102 in the server device 10 presents a project creation screen including the areas for inputting the items of the project managing table, presented in Table 2, to the terminal device 20a, in response to a request for creating a new project from the terminal device 20a, for example. The selector 102 creates a new project by adding a record to the project managing table based on the information of the items input via the project creation screen from the terminal device 20a.

At the next Step S102, the server device 10 receives an input of a project selection via the project selection screen 400 from the terminal device 20a, and acquires the input result. The server device 10 acquires the project ID of the project designated by the terminal device 20a based on the result of the acquired project selecting input. The server device 10 identifies the project manager 104 corresponding to the project ID acquired at Step S102, from the project managers 104 provided in plurality.

At the next Step S103, the server device 10 causes the screen provider 1044 included in the project manager 104 identified at Step S102 to present a meeting management screen to the terminal device 20a.

At the next Step S104, in the server device 10, the meeting information manager 1042 receives an input of bibliographic information and the like for the meeting, via the meeting management screen. At Step S104, (a) information related to the members participating in the meeting (participant) is registered; (b) bibliographic information of the meeting is set; and (c) the material data to be used in the meeting is registered. The bibliographic information of the meeting includes information such as the name of the meeting, the agenda, the time, the date, and the place of the meeting.

Figure 13:
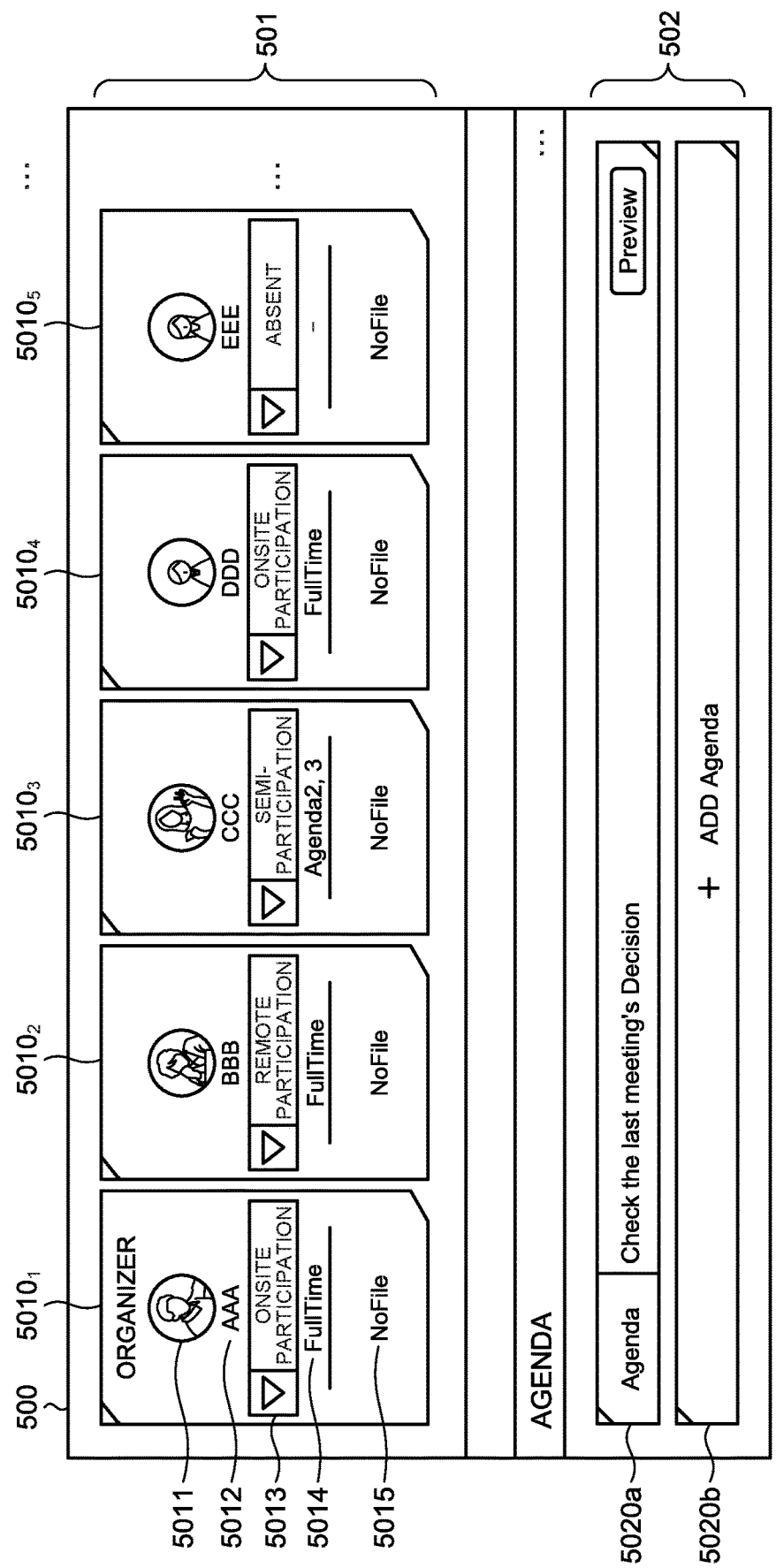
FIG. 13 is a schematic illustrating an example of a meeting management screen applicable to the embodiments.

FIG. 13 illustrates an example of the meeting management screen presented to the terminal device 20a by the screen provider 1044 applicable to the embodiments. In FIG. 13, the meeting management screen 500 includes a member display area 501 in which information of the members participating in the project is displayed, and an agenda setting area 502 for setting the agenda.

In the member display area 501, pieces of member information $5010_1$, $5010_2$, $5010_3$, . . . of the respective members participating in the project are displayed as a list. When the member display area 501 is incapable of displaying the entire information of all of the members participating in the project, the information of the members not being displayed is caused to appear in the member display area 501 when the member display area 501 is scrolled (scrolled in the horizontal direction, in this example) by performing a predetermined operation on the terminal device 20a, for example.

For example, the member information $5010_1$ displays an icon image 5011 indicating the member displayed in the member information $5010_1$, and includes display areas 5012 to 5015 in which attribute information of this member is displayed. The display area 5012 presents the name of the member. The screen provider 1044 acquires the names of the members participating in the project based on the user managing table and the project managing table, for example.

The display area 5013 presents the participation method of the corresponding member. The types of participation include onsite participation, remote participation, and semi-participation corresponding to the types of participants (1) to (3) described above, and absent indicating that the member does not participate in the meeting, for example. In the example illustrated in FIG. 13, the members with the member information $5010_1$ and $5010_4$ participate via the onsite participation, the member with the member information $5010_2$ participates via the remote participation, the member with the member information $5010_3$ participates via the semi-participation, and the member with the member information $5010_5$ is absent.

The display area 5014 presents the participation period of the corresponding member. In the example illustrated in FIG. 13, the members with the member information $5010_1$, $5010_2$ and $5010_4$ are full-time participants, and the member with the member information $5010_3$ participates partly only for the agendas 2 and 3.

The meeting information manager 1042 manages the participation type and the participation period for each member, using a participation method table presented in Table 4, for example. In Table 4, the participation method table has records in a number equal to the number of members participating in the meeting, with each of the recording including "user ID", "participation method", and "participation period" that correspond to the user ID, the participation method, and the participation period, respectively, for example. The participation method table is stored in the storage 1003, for example, in a manner mapped to the meeting ID. The information stored in the participation method table is registered by the organizer of the meeting, for example, in advance.

TABLE 4

Meeting ID: mt100

| user ID | participation method | participation period |
|---------|----------------------|----------------------|
| user001 | onsite participation | full-time |
| user002 | onsite participation | full-time |
| user003 | remote participation | full-time |
| user004 | semi-participation | part-time (agendas 2, 3) |
| . . . | . . . | . . . |

The display area 5015 presents a list of material data registered for the meeting by the corresponding member, to the server device 10. In the example illustrated in FIG. 13, the display areas 5015 in the member information $5010_1$ to $5010_5$ are specified as "No File", indicating that no material data has been registered by the members.

The organizer of the meeting, for example, can edit the information presented in the display areas 5012 to 5015 included in the meeting management screen 500 displayed on the terminal device 20a, from the terminal device 20a. The members of the project can also edit their attribute information by accessing the meeting management screen 500 from their terminal devices 20b, 20c, and 20d. The information presented in the display areas 5012 to 5015 is transmitted to the server device 10, as the information is edited, for example, and the meeting information manager 1042 reflects and registers the edited information to the corresponding items in the meeting managing table and the participation method table.

Figure 14:
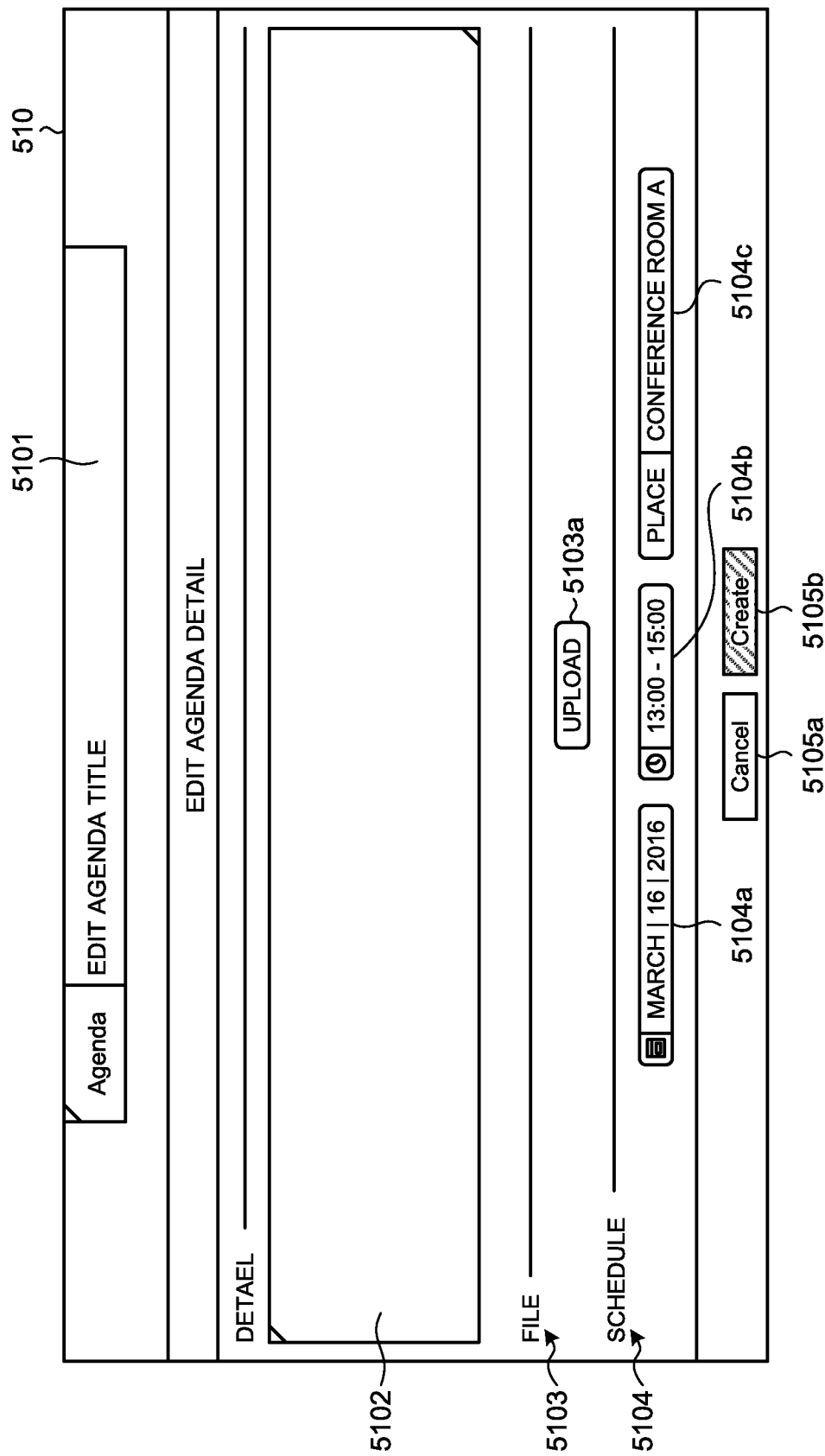
FIG. 14 is a schematic illustrating an example of an agenda setting screen applicable to the embodiments.

In FIG. 13, an agenda setting area 502 includes an agenda area 5020a for checking for the decisions made in the past meetings, for example, and an agenda area 5020b for adding an agenda to the meeting. FIG. 14 illustrates an example of the agenda setting screen displayed on the terminal device 20a, being displayed in response to an operation to the agenda area 5020b, which is an example applicable to the embodiments. The agenda setting screen 510 illustrated in FIG. 14 is displayed based on the user ID of a user having a predetermined privilege (for example, the organizer of the meeting).

In FIG. 14, the agenda setting screen 510 includes input areas 5101 to 5104, and buttons 5105a and 5105b. The input area 5101 is an area for entering the title of the meeting (meeting name). The input area 5102 is an area for entering the agenda of the meeting.

The input area 5103 is an area for uploading the material data to be used in the meeting. For example, the terminal device 20a displays a file selection screen for selecting a file on the terminal device 20a, in response to an operation of the button 5103a provided to the input area 5103. The terminal device 20a displays a list of files to be uploaded in the input area 5103, in response to a file selecting operation performed on the file selection screen.

The input area 5104 includes input areas 5104a, 5104b, and 5104c. The input area 5104a is an area for entering the date of the meeting. The input area 5104b is an area for entering the time at which the meeting is started and the time at which the meeting is ended. The input area 5104c is an area for entering the place of the meeting. The user can enter values to these input areas 5104a, 5104b, and 5104c by referring to a scheduler application program that is separately provided, for example.

The button 5105a is a button for discarding the information input to the input areas 5101 to 5104. The button 5105b is a button for committing the information input to the input areas 5101 to 5104, and registering the information to the server device 10. When the button 5105b is operated, the terminal device 20a transmits the information input to the input areas 5101 to 5104 to the server device 10. The terminal device 20a also transmits the files displayed in the input area 5103 to the server device 10.

In the server device 10, the meeting information manager 1042 registers the bibliographic information by reflecting the title of the meeting input to the input area 5101 to the item "meeting name" in the meeting managing table, and reflecting the pieces of information input to the input area 5104 to the items "date and time" and "place" in the meeting managing table, respectively, among the information received from the terminal device 20a. The meeting information manager 1042 also stores the file uploaded from the terminal device 20a in the storage 1003, for example, in a manner mapped to the meeting ID and the user IDs. The meeting information manager 1042 also stores the agenda of the meeting input to the input area 5102 and received from the terminal device 20a, in a predetermined storage such as the storage 1003, in a manner mapped to the meeting ID, thereby adding the information to the bibliographic information.

The members participating in the meeting can edit their meeting participation methods and participation periods displayed in the input areas 5013 and 5014, respectively, by accessing the meeting management screen 500 from their terminal devices 20b, 20c, and 20d, respectively, for example. The members can also upload files as the material data in the input area 5103, by accessing the meeting management screen 500 from their terminal devices 20b, 20c, and 20d. The meeting information manager 1042 then stores the uploaded files in the storage 1003 in a manner mapped to the meeting ID and the user ID.

Figure 15:
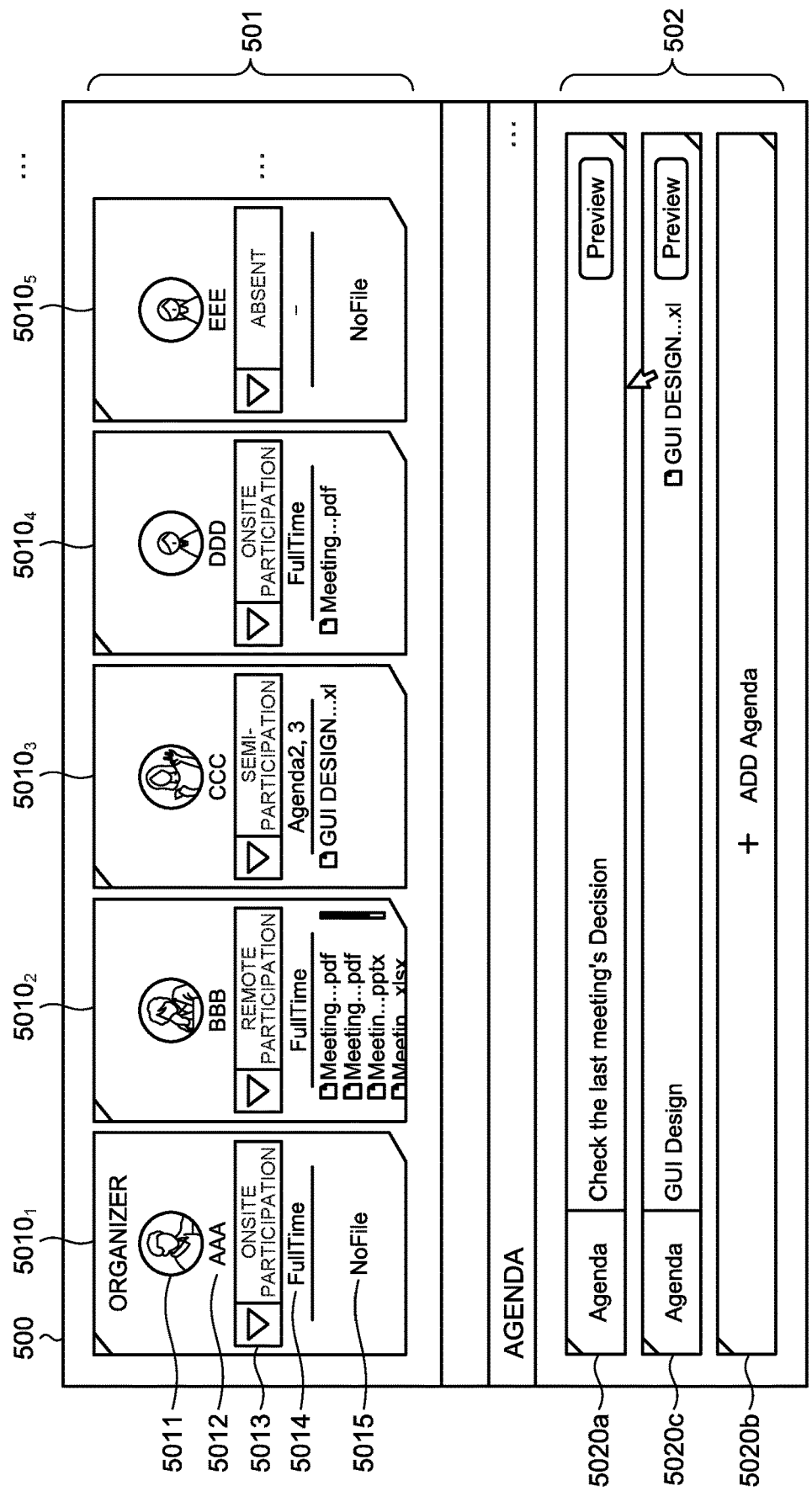
FIG. 15 is a schematic illustrating an example of the meeting management screen with inputs of information and the like completed, which is an example applicable to the embodiments.

FIG. 15 illustrates an example of the meeting management screen 500, which is an example applicable to the embodiments, after the inputs of information and the upload of the files have been completed. In the example illustrated in FIG. 15, the information of uploaded files is displayed in the member information $5010_2$, $5010_3$, and $5010_4$. An agenda area 5020c including newly set agenda information is added to the agenda setting area 502.

Going back to the explanation of FIG. 12, the meeting information manager 1042 determines whether the registration of the information based on the meeting management screen 500 has been completed at Step S105. The meeting information manager 1042 determines that the registration has not been completed yet (No at Step S105), the process is returned to Step S104. If the meeting information manager 1042 determines that the registration has been completed (Yes at Step S105), the process is shifted to Step S106. The meeting information manager 1042 may determine that the registration of information has been completed based on a predetermined operation performed on the meeting management screen 500, for example.

At Step S106, the server device 10 causes the meeting information manager 1042 to notify the participants participating in the meeting, who have been registered in the member display area 501 in the meeting management screen 500, of the scheduled meeting. The participants are notified of the scheduled meeting via emails transmitted to the participants based on the meeting managing table and the user managing table, for example. Before the emails notifying the scheduled meeting are transmitted to the participants, the meeting information manager 1042 appends a URL for causing the screen provider 1044 to display a meeting screen on the terminal devices 20*b*, 20*c*, and 20*d* to the emails.

At the next Step S107, the meeting information manager 1042 determines whether now is the time and the date at and on which the meeting is to be held, specified in the input areas 5104*a* and 5104*b*, respectively, on the agenda setting screen 510. If the meeting information manager 1042 determines that now is not the time and the date at and on which the meeting is to be held (No at Step S107), the meeting information manager 1042 shifts the process back to Step S107, and waits for the time and the date at and on which the meeting is to be held.

Figure 16:
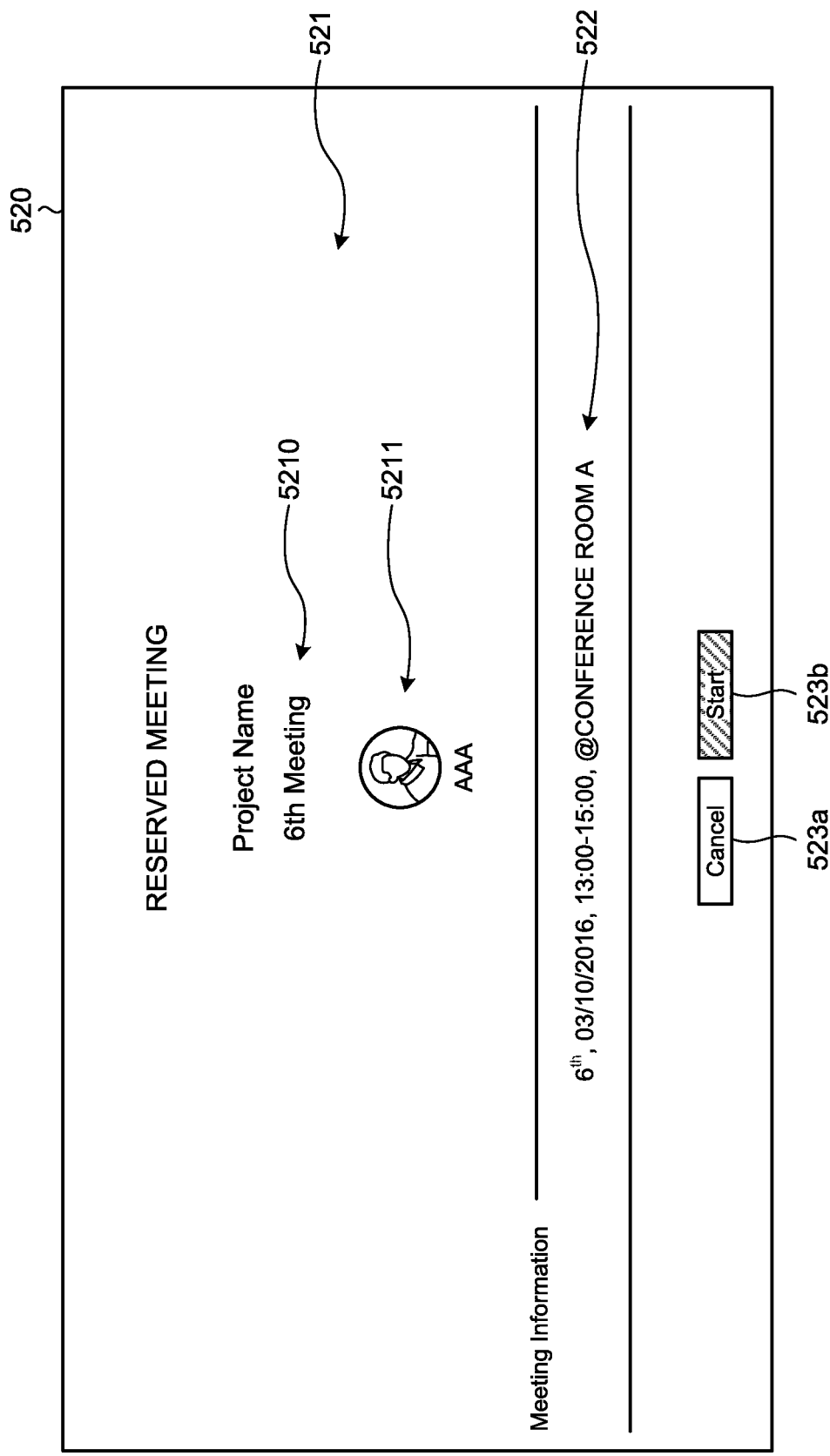
FIG. 16 is a schematic illustrating an example of a meeting start screen displayed on an interactive whiteboard applicable to the embodiments.

If the meeting information manager 1042 determines that now is the time and the date at and on which the meeting is to be held (Yes at Step S107), the process is shifted to Step S108. At Step S108, the meeting information manager 1042 instructs the interactive whiteboard 22 to display a meeting start screen. FIG. 16 illustrates an example of the meeting start screen displayed on the interactive whiteboard 22, which is an example applicable to the embodiments. In FIG. 16, the meeting start screen 520 includes display areas 521 and 522 and buttons 523*a* and 523*b*.

The display area 521 includes a meeting name 5210 of the meeting to be started, and information 5211 indicating the organizer of the meeting. In this example, the information 5211 includes an icon image of and the name of the organizer of the meeting. The display area 522 presents the bibliographic information of the meeting. In this example, the displayed bibliographic information includes information indicating the time and the date at and on which the meeting is held, and information indicating the place where the meeting is held.

The button 523*a* is a button for cancelling the start of the meeting. The button 523*b* is a start button for instructing to start the meeting.

Figure 17:
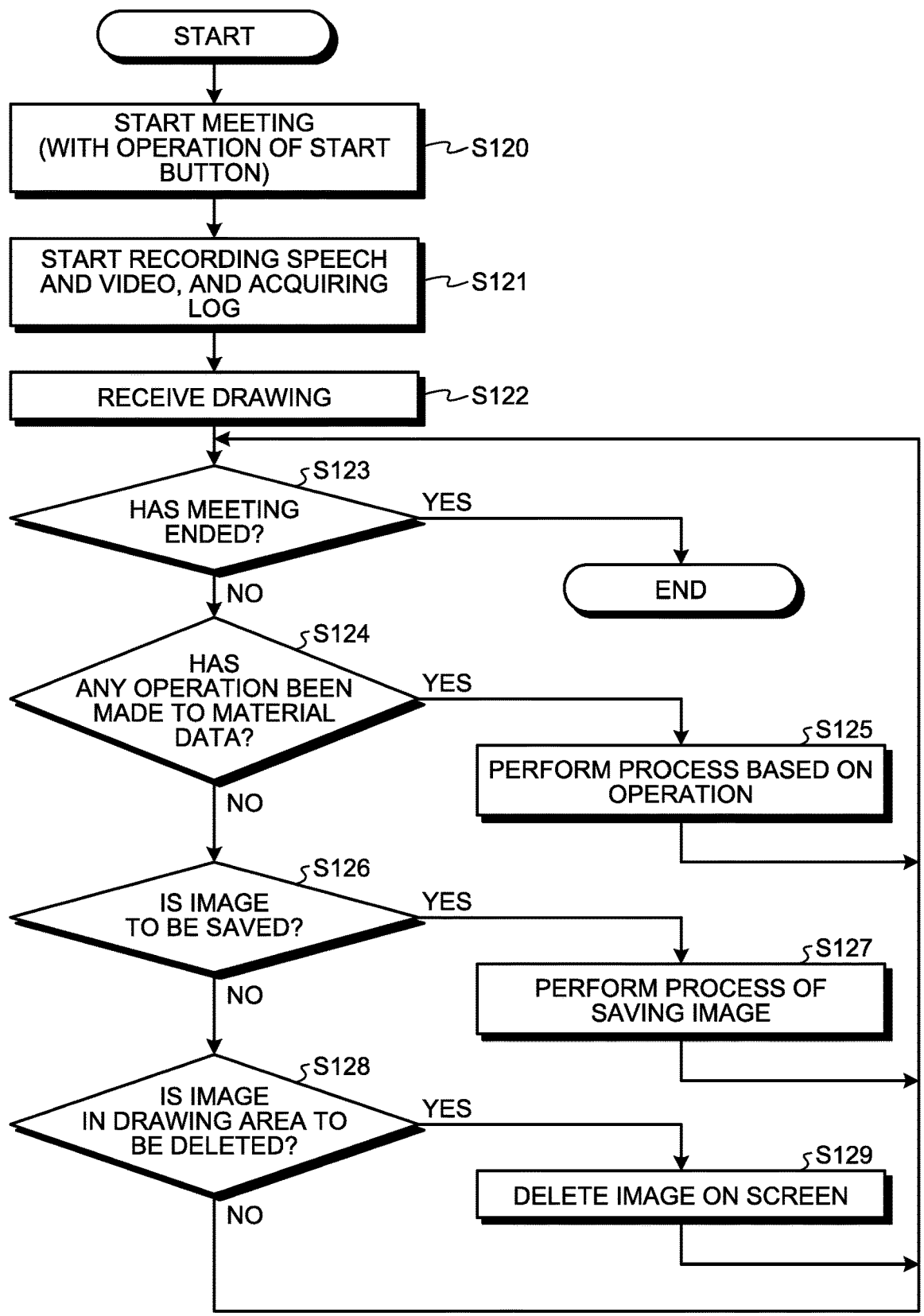
FIG. 17 is an exemplary flowchart generally illustrating a process performed by the interactive whiteboard applicable to the embodiments.

FIG. 17 is an exemplary flowchart generally illustrating a process performed by the interactive whiteboard 22 applicable to the embodiments. At Step S120, the button 523*b* in the meeting start screen 520 is operated on the interactive whiteboard 22, and the start of the meeting is instructed thereby. The interactive whiteboard 22 notifies the server device 10 of the instruction of the start of the meeting.

In response to the notification of the start of the meeting, the server device 10 notifies the terminal devices 20*c* and 20*d*, which are remotely located from the conference room 2*a* in which the meeting is held, that the meeting is started.

Figure 18:
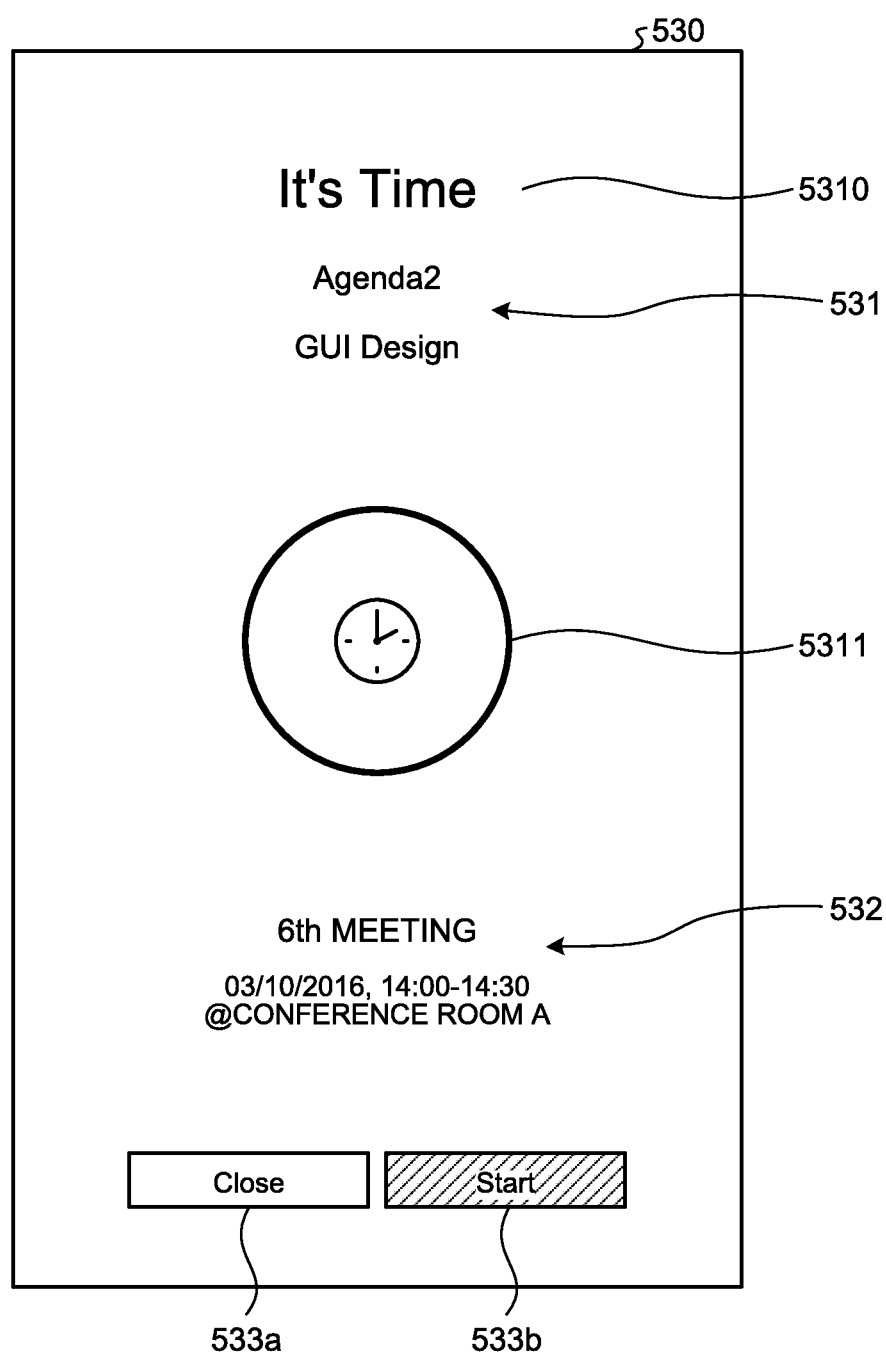
FIG. 18 is a schematic illustrating an example of a meeting start notification screen for notifying the start of a meeting, which is an example applicable to the embodiments.

FIG. 18 illustrates an example of the meeting start notification screen for notifying the start of the meeting, which is an example applicable to the embodiments. In the explanation hereunder, it is assumed that the terminal device 20*d* is a smartphone, and the participant displays the screen by holding the screen in a vertically long direction. It should be needless to say that the same elements can be used to display the screen even when the screen is held in a horizontally long direction, or when the terminal device 20*d* is a tablet computer, a desktop computer, or a laptop computer.

In FIG. 18, the meeting start notification screen 530 includes display areas 531 and 532 and buttons 533*a* and 533*b*. In the example illustrated in FIG. 18, the display area 531 presents the agenda of the meeting, and the display area 532 presents information indicating the time and the date at and on which the meeting is held, and the place in which the meeting is held, as the bibliographic information of the meeting. In the example illustrated in FIG. 18, the meeting start notification screen 530 includes indicators 5310 and 5311 for notifying the start of the meeting. The button 533*a* is a button for closing the meeting start notification screen 530, and the button 533*b* is a button for transitioning to a next screen.

At the next Step S121, when the server device 10 receives a notification of the instruction for starting the meeting from the interactive whiteboard 22, the server device 10 starts recording the speech and the video, and acquiring the log.

More specifically, for example, the server device 10 establishes the time at which the notification of the instruction for starting the meeting is received as the meeting start time, and defines a timeline with reference to such a meeting start time, as a timeline mapped to the meeting ID of this meeting. The server device 10 then stores the speech data and the video data received from the meeting terminal 25 in the storage 1003, for example, in the manner mapped to the meeting ID and a time in the timeline. In the same manner, when the speech data and the video data have been received from the terminal devices 20*b*, 20*c*, and 20*d*, the server device 10 also stores the speech data and the video data in the storage 1003, in the manner mapped to the meeting ID and a time in the timeline.

The server device 10 also controls the transmissions of the speech data and the video data to the meeting terminal 25 and to the terminal devices 20*b*, 20*c*, and 20*d*.

The server device 10 can also receive actions in the interactive whiteboard 22 and the terminal devices 20*a* to 20*d* from the interactive whiteboard 22 and the terminal devices 20*a* to 20*d*. When the actions are received from the interactive whiteboard 22 and the terminal devices 20*a* to 20*d*, the server device 10 accumulates and stores the received actions in the storage 1003, in the manner mapped to the meeting ID and to the time in the timeline, and records an action log.

At the next Step S122, the interactive whiteboard 22 causes the display 2027*a* to display a drawing screen, and starts receiving drawings on the touch panel 2027. This enables the user to draw things freely on the touch panel 2027, and to display the drawn image on the display 2027*a* of the touch panel 2027.

Figure 19:
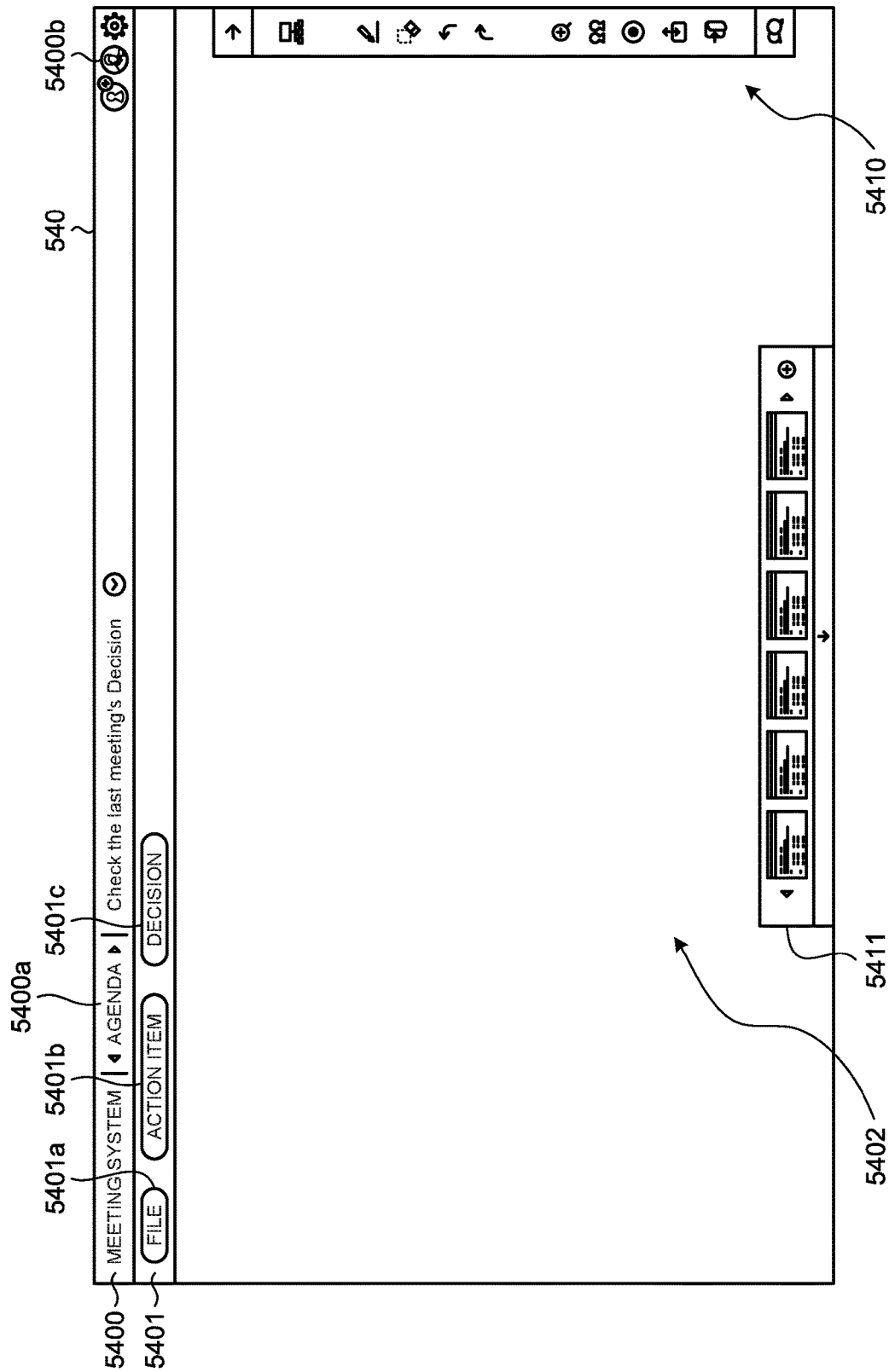
FIG. 19 is a schematic illustrating an example of a drawing screen applicable to the embodiments.

FIG. 19 illustrates an example of the drawing screen applicable to the embodiments. In FIG. 19, the drawing screen 540 includes a display area 5400, a menu area 5401, and a drawing area 5402. The display area 5400 includes a button 5400*a* for switching the agenda, and an icon image 5400*b* indicating the user having logged into the server device 10.

The menu area 5401 includes buttons 5401*a*, 5401*b*, and 5401*c*. The button 5401*a* is a button for displaying a file list of the material data files having been registered in the server device 10 in advance. The buttons 5401*b* and 5401*c* are buttons for setting an important notice marker and a decision marker, respectively, which will be described later.

The drawing area 5402 is an area on which the users are permitted to draw by contacting the area. The drawing area 5402 includes a tool icon unit 5410 and a screen switching section 5411. The tool icon unit 5410 includes icon images for designating the functions of the interactive whiteboard 22. For example, the tool icon unit 5410 includes icon images representing the drawing tools to be used in drawing. A user can reflect the effect of a drawing tool to the drawing area 5402, by touching the icon image representing a desirable drawing tool and then touching the drawing area 5402.

The tool icon unit 5410 also includes function buttons for enlarging or reducing the size of, copying, pasting, saving, and deleting an image displayed in the drawing area 5402. When the enlarging or reducing function button is designated, the image in the drawing area 5402 is displayed in a manner having its size enlarged or reduced. When a copy function button is designated, the image in the drawing area 5402 is temporarily stored in the RAM 2022, for example. When the paste function button is designated, the image having been stored by designating the copy function button is pasted in the drawing area 5402. When a save function button is designated, the image in the drawing area 5402 is saved in the storage 2023, for example. When the delete function button is designated, the image in the drawing area 5402 is deleted.

The screen switching section 5411 presents the thumbnail images of the images saved by designating the save function button in the tool icon unit 5410, as a list, for example. When one of the thumbnail images presented in the screen switching section 5411 is designated, the interactive whiteboard 22 can read the image corresponding to the designated thumbnail image from the storage 2023, and display the image in the drawing area 5402.

At the next Step S123, the interactive whiteboard 22 determines whether the meeting started at Step S120 has been ended. The interactive whiteboard 22 determines whether the meeting has been ended based on whether a predetermined operation for instructing to end the meeting has been performed on the touch panel 2027, for example. If an operation instructing to end the meeting has been performed on the touch panel 2027, the interactive whiteboard 22 determines that the meeting has been ended (Yes at Step S123), notifies the server device 10 of the end of the meeting, and ends the series of process illustrated in the flowchart in FIG. 17.

In response to the notification of the end of the meeting from the interactive whiteboard 22, the server device 10 ends recording the speech data and the video data, for example, and recording the log.

If the interactive whiteboard 22 determines that the meeting has not been ended (No at Step S123), the process is shifted to Step S124. At Step S124, the interactive whiteboard 22 determines whether any operation has been made on the material data having been registered in advance. If the interactive whiteboard 22 determines that an operation has been made on the material data (Yes at Step S124), the process is shifted to Step S125. The interactive whiteboard 22 then performs a process based on the operation made at Step S125, and shifts the process back to Step S123.

An example of the process performed to the material data includes a process of displaying an image that is based on the material data having been registered in advance to the server device 10 on the display 2027*a* of the interactive whiteboard 22. In response to an operation of the button 5401*a* on the drawing screen 540 illustrated in FIG. 19, the interactive whiteboard 22 displays a list of files allowing a user to designate a file of material data having been registered in advance to the server device 10.

Figure 20A:
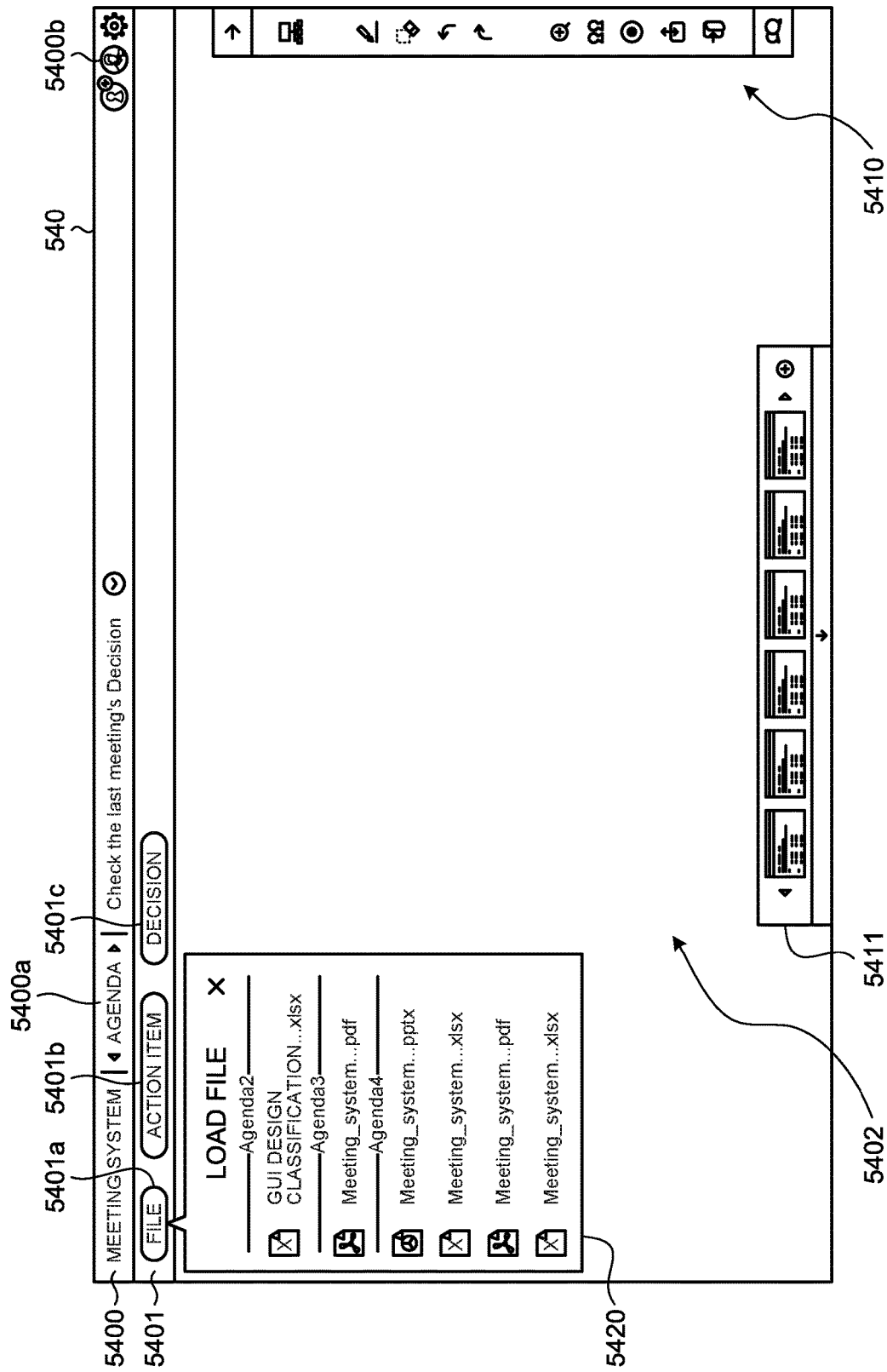
FIG. 20A is a schematic illustrating an example of the drawing screen displaying a file list, which is an example applicable to the embodiments.

FIG. 20A illustrates an example in which a file list 5420 is displayed in response to an operation of the button 5401*a*, which is an example applicable to the embodiments. For example, when the button 5401*a* is operated, the interactive whiteboard 22 requests the files of the material data mapped to the meeting ID of this meeting and stored in the server device 10 from the server device 10. In response to the request, the server device 10 reads the requested files, as well as the user IDs mapped to the respective files, from the storage 1003, and transmits the files to the interactive whiteboard 22.

Figure 20B:
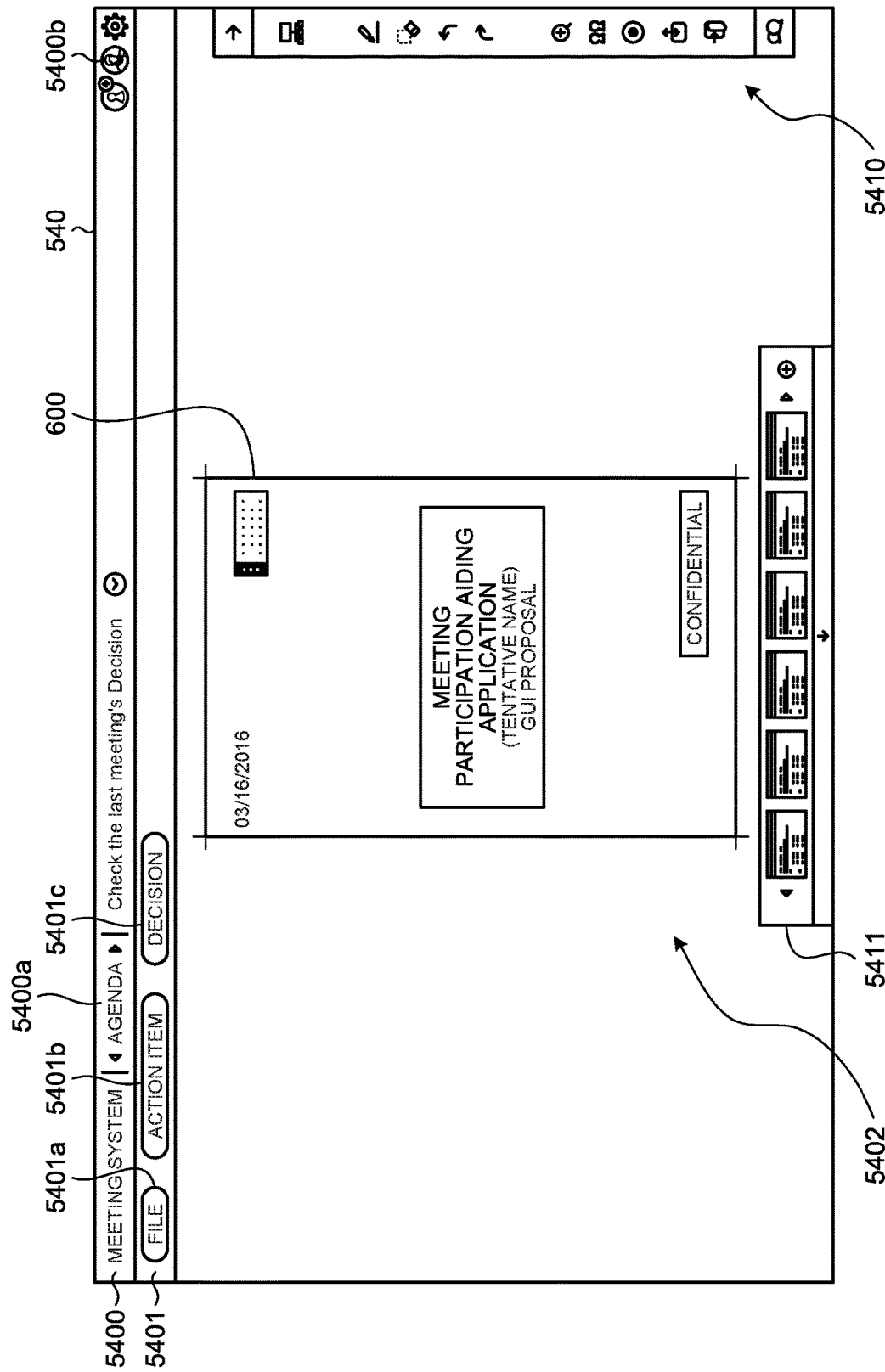
FIG. 20B is a schematic illustrating an example including a drawing area in which an image based on a file is displayed, which is an example applicable to the embodiments.

Upon receiving the files from the server device 10, the interactive whiteboard 22 stores the received files in the storage 2023, for example, and displays a file list 5420 based on the information indicating the file names of the respective files. In response to an operation made on the file list 5420, the interactive whiteboard 22 reads the selected file from the storage 2023, and displays an image that is based on the read file in the drawing area 5402. FIG. 20B illustrates an example in which an image 600 that is based on a file is displayed in the drawing area 5402.

Based on the user ID mapped to the selected file, the interactive whiteboard 22 notifies the user corresponding to the user ID that the file has been selected and displayed, via an email address, for example, mapped to the user ID in the server device 10. The interactive whiteboard 22 also transmits information indicating the selected file and the user ID mapped to the file, and the time at which the file is selected in the timeline to the server device 10. The server device 10 records the file information, the user ID, and the time received from the interactive whiteboard 22, as a log, in a manner mapped to one another.

Figure 21:
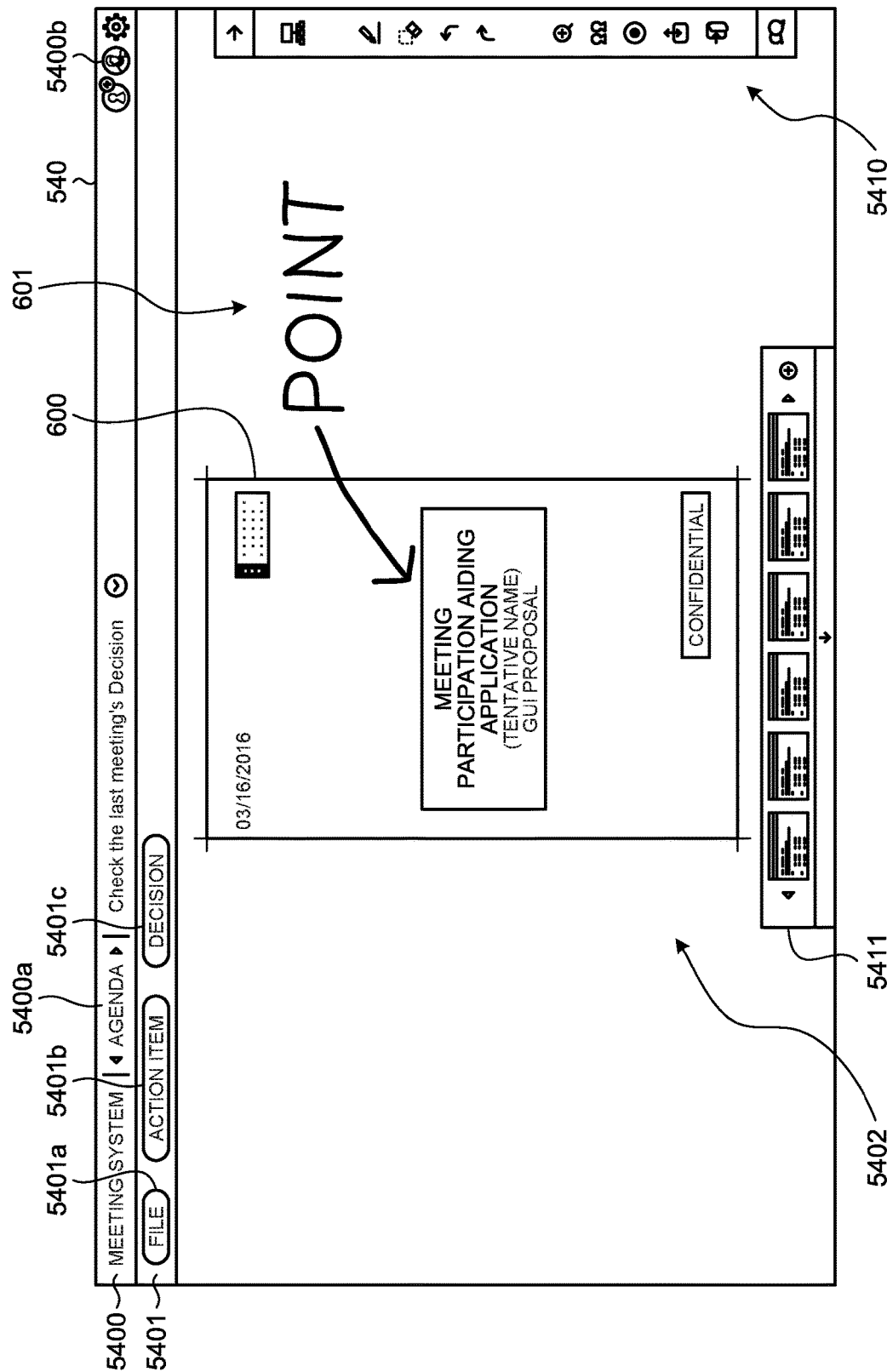
FIG. 21 is a schematic illustrating an example in which a drawn image is displayed in a manner superimposed over another image that is based on material data, which is an example applicable to the embodiments.

The interactive whiteboard 22 can receive a drawing that is based on a user operation, even while the image 600 that is based on a file is being displayed. FIG. 21 illustrates an example in which a drawing is made in the drawing area 5402 in which the image 600 that is based on the material data is displayed, and a drawn image 601 is displayed in a manner superimposed over the image 600 of the material data, which is an example applicable to the embodiments.

Going back to the explanation of the flowchart in FIG. 17, if the interactive whiteboard 22 determines that no operation has been performed on the material data at Step S124 described above (No at Step S124), the process is shifted to Step S126. At Step S126, the interactive whiteboard 22 determines whether the image in the drawing area 5402 is to be stored. For example, the interactive whiteboard 22 determines whether the image in the drawing area 5402 is to be stored based on whether the save function button in the tool icon unit 5410 has been operated. Without limitation to the presence of any operation of the save function button, the interactive whiteboard 22 may also be caused to store the image in the drawing area 5402 automatically at a predetermined time interval, for example.

Figure 22:
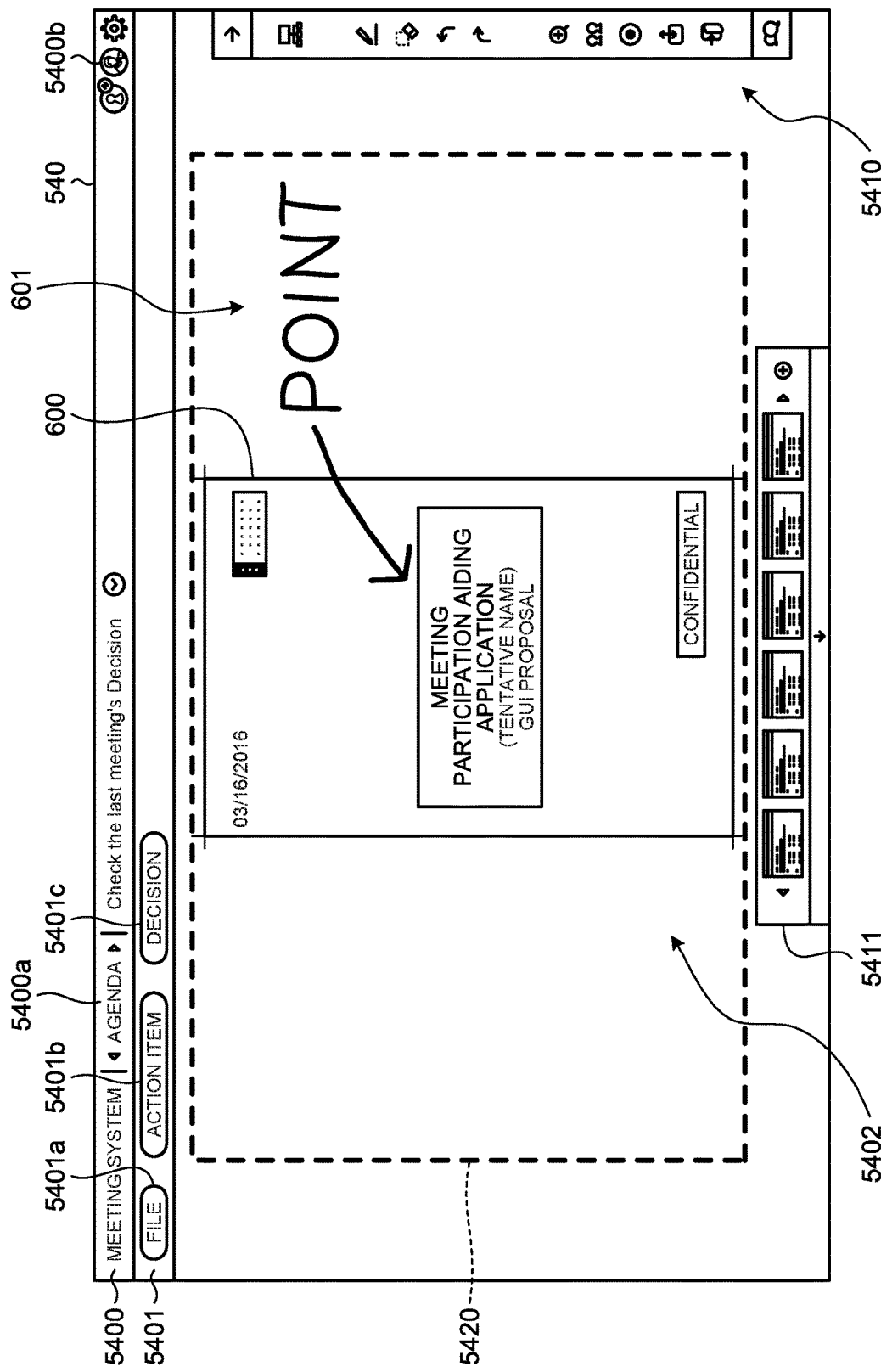
FIG. 22 is a schematic illustrating an example in which the image displayed on a predetermined area of the drawing area is stored, which is an example applicable to the embodiments.

If the interactive whiteboard 22 determines that the image in the drawing area 5402 is to be stored (Yes at Step S126), the process is shifted to Step S127. At Step S127, the interactive whiteboard 22 executes a process of saving the image in the drawing area 5402. For example, the interactive whiteboard 22 stores the image displayed in a predetermined area 5420 of the drawing area 5402, as illustrated in FIG. 22. If there is any image 600 that is based on the material data is included in the area 5420, the interactive whiteboard 22 may establish a mapping relation between the image to be saved and the information indicating the file of the material data based on which the image 600 is displayed.

Once the image is saved, the interactive whiteboard 22 transmits information indicating the saved image (e.g., file information), the time at which the image is saved in the timeline, and information indicating that the image has been saved, to the server device 10. The server device 10 then records the file information, the time, and information indicating that the image has been saved, all of which are received from the interactive whiteboard 22, as a log, in a manner mapped to one another.

If the interactive whiteboard 22 determines that the image in the drawing area 5402 is not to be saved at Step S126 described above (No at Step S126), the process is shifted to Step S128. At Step S128, the interactive whiteboard 22 determines whether the image in the drawing area 5402 is to be deleted. For example, the interactive whiteboard 22 determines whether the image in the drawing area 5402 is to be deleted based on whether the delete function button in the tool icon unit 5410 has been operated. If the interactive whiteboard 22 determines that the image in the drawing area 5402 is not to be deleted (No at Step S128), the process is shifted back to Step S123.

If the interactive whiteboard 22 determines that the image in the drawing area 5402 is to be deleted (Yes at Step S128), the process is shifted to Step S129. At Step S129, the interactive whiteboard 22 deletes the entire image in the drawing area 5402, and shifts the process back to Step S123. The interactive whiteboard 22 then transmits the time at which the image is deleted in the timeline, and information indicating the deletion of the image to the server device 10. The server device 10 records the time and information indicating the deletion of the image, both of which are received from the interactive whiteboard 22, as a log, in a manner mapped to each other.

The process from Steps S123 to S129 described above is repeated until it is determined that the meeting has been ended at Step S123.

Important Notice Marker and Decision Marker Applicable to Embodiments

Setting of an important notice marker and a decision marker, set through the operations of the buttons 5401b and 5401c in the menu area 5401 described above, respectively, will now be explained. The important notice marker and the decision marker are used to keep a record of some information such as speech during the meeting.

Figure 23:
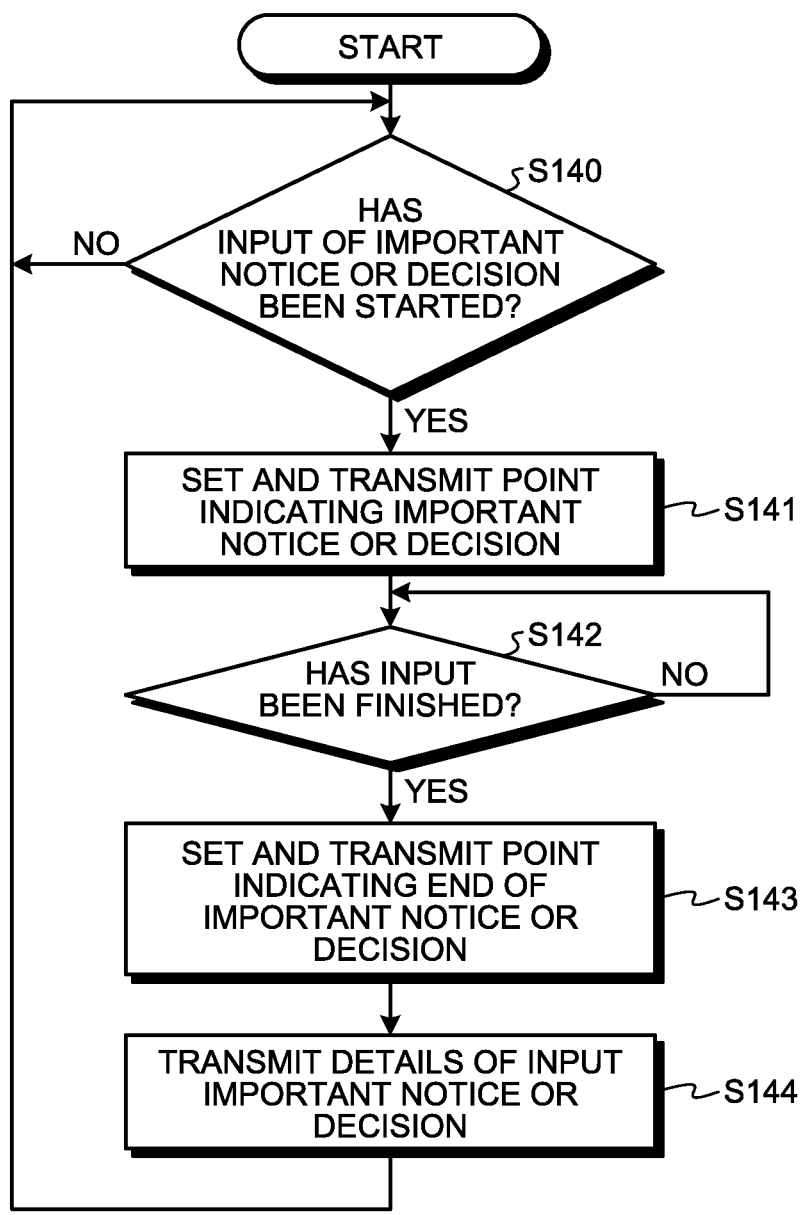
FIG. 23 is an exemplary flowchart illustrating a process for setting an important notice marker and a decision marker, which is an example applicable to the embodiments.

FIG. 23 is an exemplary flowchart illustrating a process for setting the important notice marker and the decision marker applicable to the embodiments. At Step S140, the interactive whiteboard 22 determines whether an input of any important notice or decision has been started. For example, the interactive whiteboard 22 determines that any input of an important notice or a decision has been started based on an operation made on one of the buttons 5401b and 5401c in the menu area 5401.

More specifically, in response to an operation of the button 5401b or 5401c, the interactive whiteboard 22 displays an input screen for entering the details of the important notice or the decision.

Figure 24:
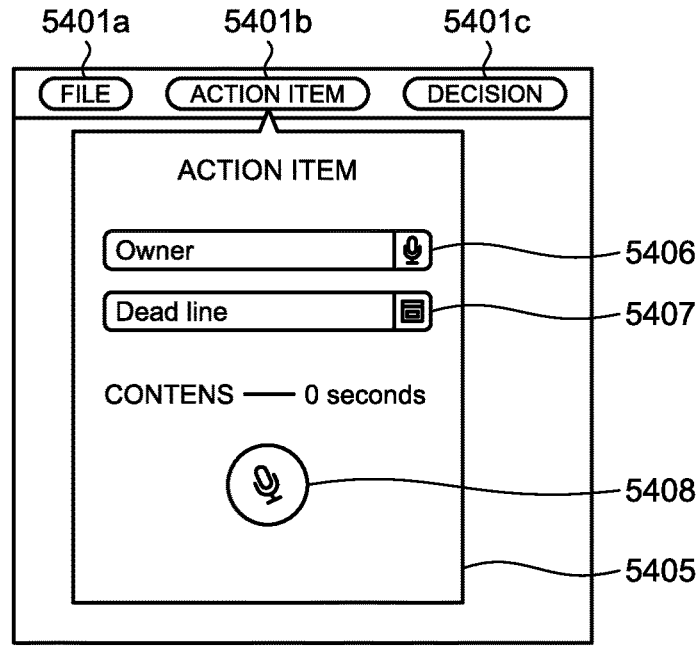
FIG. 24 is a schematic illustrating an example of an important notice input screen applicable to the embodiments.

FIG. 24 illustrates an example of an important notice input screen for entering an important notice that is displayed in response to an operation of the button 5401b, which is an example applicable to the embodiments. In FIG. 24, the important notice input screen 5405 includes input areas 5406 and 5407, and a recording start button 5408. The input area 5406 is an area for entering the owner of the important notice, and is enabled to select an owner from the members of the meeting. The input area 5407 is an area for entering the type of important notice, and is enabled to select one from a plurality of important notice types having been prepared in advance.

The recording button 5408 is a button for instructing to start or to end recording, by a toggle operation. In response to an operation of the recording button 5408, the interactive whiteboard 22 acquires a time in the timeline, sets a point indicating the start or the end of the input of the important notice, by mapping the point to the acquired time, and transmits the set point and the time mapped to the point to the server device 10. For example, the interactive whiteboard 22 sets a point indicating the start of the important notice input, in response to a first operation performed on the recording button 5408, and sets a point representing the end of the important notice input in response to a second operation performed on the recording button 5408, such operations being the first and the second from when the important notice input screen 5405 has been displayed.

Figure 25:
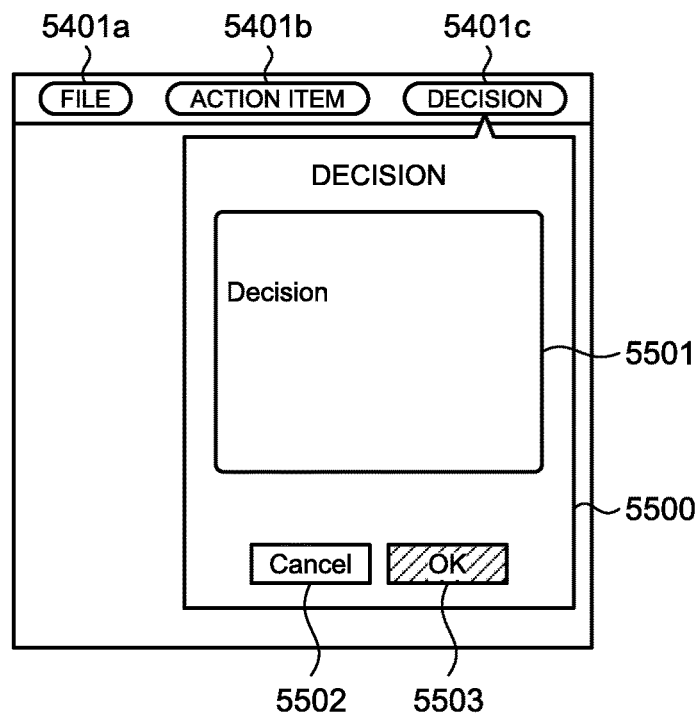
FIG. 25 is a schematic illustrating an example of a decision input screen applicable to the embodiments.

FIG. 25 illustrates an example of a decision input screen for entering a decision that is displayed in response to an operation of the button 5401c. In FIG. 25, the decision input screen 5500 includes an input area 5501 and buttons 5502 and 5503. The interactive whiteboard 22 displays the decision input screen 5500, and acquires a time in the timeline in response to an operation of the button 5401c, and sets a point indicating the start of the input of the decision, in a manner mapped to the acquired time. The interactive whiteboard 22 then transmits the set point, and the time mapped to the point, to the server device 10.

The input area 5501 is an area for entering the details of the decision, as text information. The button 5502 is a button for cancelling the decision input operation. In response to an operation of the button 5502, for example, the interactive whiteboard 22 discards the text information entered in the input area 5501, and requests the server device 10 to delete the point set when the decision input screen 5500 is displayed.

The button 5503 is a button for committing the text information entered in the input area 5501. For example, in response to an operation of the button 5503, the interactive whiteboard 22 transmits the text information entered in the input area 5501 to the server device 10. At the same time, the interactive whiteboard 22 acquires a time in the timeline, and sets a point at which the input of the decision is completed, in a manner mapped to the acquired time. The interactive whiteboard 22 then transmits the set point, and the time mapped to the point, to the server device 10.

Going back to the explanation of the flowchart in FIG. 23, at Step S140, if the interactive whiteboard 22 determines that the input of an important notice or a decision has not been started (No at Step S140), the interactive whiteboard 22 shifts the process back to Step S140, and waits for an operation of any one of the buttons 5401b and 5401c.

If the interactive whiteboard 22 determines that the input of an important notice or a decision has been started (Yes at Step S140), the process is shifted to Step S141. At Step S141, in response to an operation of one of the buttons 5401b and 5401c, the interactive whiteboard 22 acquires a time in the timeline, and sets a point indicating the start of the input of the important notice or the decision in a manner mapped to the acquired time. The interactive whiteboard 22 then transmits the set point, and the time mapped to the point to the server device 10.

At the next Step S142, the interactive whiteboard 22 determines whether the user has finished entering the important notice or the decision in the important notice input screen 5405 or the decision input screen 5500. If the interactive whiteboard 22 determines that the user has not finished yet (No at Step S142), the process is shifted back to Step S142. If the interactive whiteboard 22 determines that the user has not finished (Yes at Step S142), the process is shifted to Step S143.

At Step S143, the interactive whiteboard 22 acquires a time in the timeline, and transmits the point indicating the end of the input of the important notice or the decision to the server device 10, in a manner mapped to the acquired time. At the next Step S144, the interactive whiteboard 22 transmits the details entered in the important notice input screen 5405 or the decision input screen 5500 to the server device 10. The server device 10 stores these input details received from the interactive whiteboard 22, in a manner mapped to the point indicating the start, for example.

Figure 26:
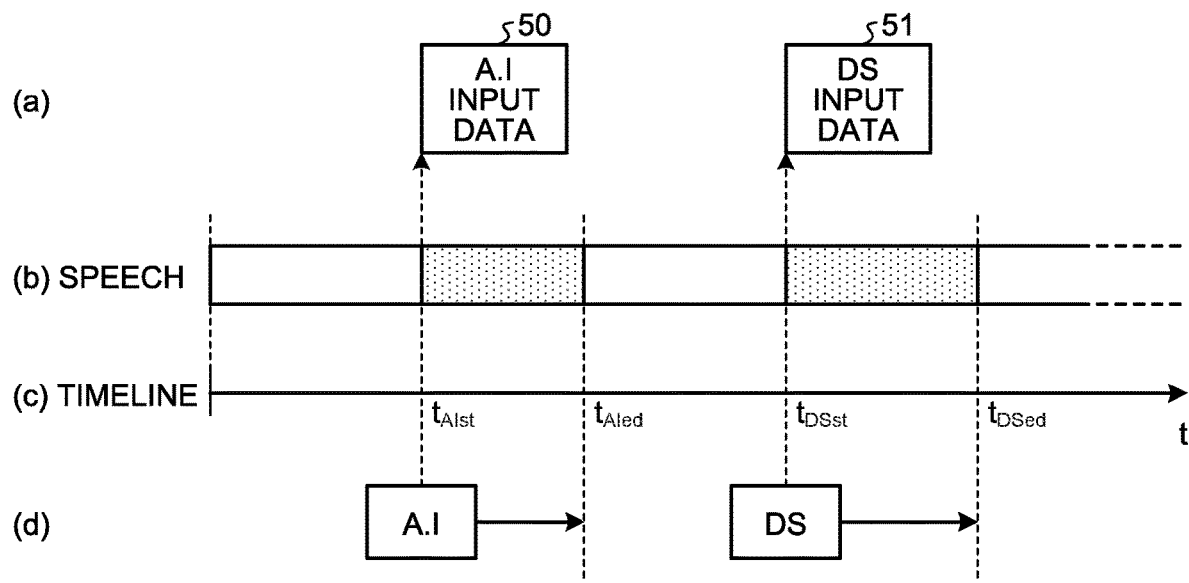
FIG. 26 schematically illustrates marker information related to an important notice and a decision applicable to the embodiments.

FIG. 26 schematically illustrates marker information related to an important notice and a decision applicable to the embodiments. In FIG. 26, (c) illustrates a timeline with reference to the time at which the meeting is started. In this example, the points indicating the start and the end of the input of the important notice are set as the time $t_{AIst}$ and $t_{AIed}$, respectively, to the timeline. The points indicating the start and the end of the input of the decision are also set as time $t_{DSst}$ and $t_{DSed}$, respectively to the timeline.

In the embodiment, for example, among the points indicating the start and the end of the input of the important notice, marker information representing an important notice (a fifth type of semantic information) is set to the point indicating the start. In the explanation hereunder, the marker information representing an important notice is referred to as "action item A.I", as appropriate, and is denoted as "A.I".

In the same manner, among the points indicating the start and the end of the input of the decision, marker information representing a decision (the fifth type of semantic information) is set to the point indicating the start. In the explanation hereunder, the marker information representing a decision is referred to as "decision DS", as appropriate, and the marker is denoted as "DS". In FIG. 26, (d) illustrates how the marker "A.I" representing the action item A.I is set to the time $t_{AIst}$ that is the starting point of the important notice, and how the marker "DS" representing the decision DS is set to time $t_{DSst}$ that is the starting point of the decision.

In the example illustrated in (a) of FIG. 26, A.I input data 50 that is the input information entered in the input areas 5406 and 5407 of the important notice input screen 5405 is mapped to the action item A.I. In the same manner, DS input data 51 that is the input information entered in the input area 5501 of the decision input screen 5500 is mapped to the decision DS.

As illustrated in (b) of FIG. 26, speech data is recorded along the timeline, regardless of the settings of the action item A.I and the decision DS. For example, the terminal device 20d can replay the speech data between the time $t_{AIst}$ and the time $t_{AIed}$, selectively, in response to a designation of the action item A.I in a timeline screen, which is described later. In the same manner, the terminal device 20d can replay the speech data between the time $t_{DSst}$ and time $t_{DSed}$, selectively, in response to a designation of the decision DS in the timeline screen.

Without limitation thereto, the terminal device 20d may also newly create speech data using the action item A.I, by duplicating the speech data between time $t_{AIst}$ and time $t_{AIed}$ included in the speech data, for example.

Figure 27:
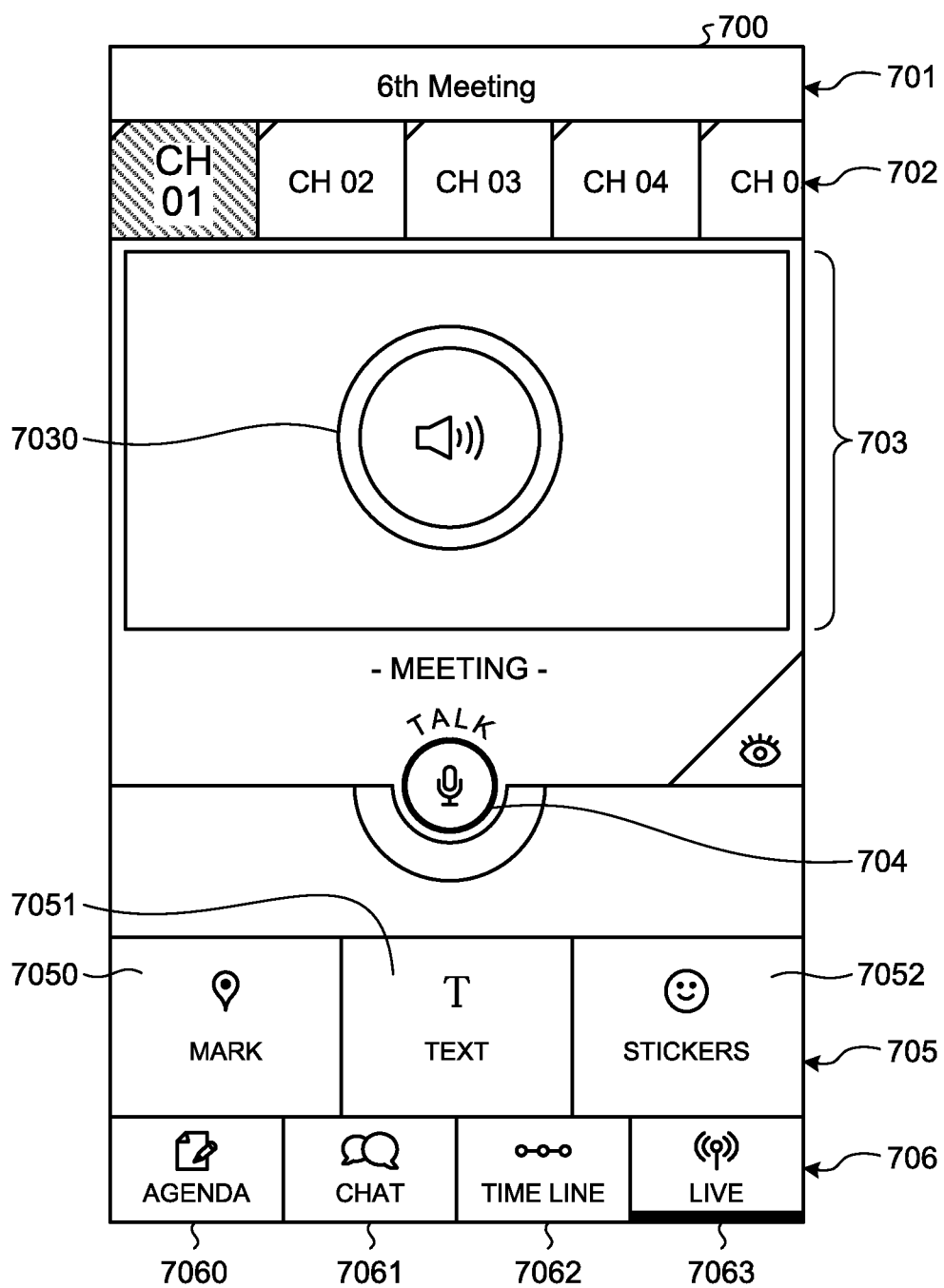
FIG. 27 is a schematic illustrating an example of a meeting view screen on the terminal device, which is an example applicable to the embodiments.

Example of Presentation of Meeting Information to Terminal Device Applicable to Embodiments The server device 10 can present a scene and the like of the meeting being held in the conference room 2a to the terminal devices 20c and 20d that are in remote locations from the conference room 2a. FIG. 27 illustrates an example of the meeting view screen on the terminal device 20d that is a smartphone, for example, which is an example applicable to the embodiments.

In the example illustrated in FIG. 27, the meeting view screen 700 includes a meeting name display section 701, a channel selecting section 702, a meeting information display section 703, a talk button 704, a function designating section 705, and a screen switching section 706. Even when the terminal device 20d is held in a direction in which the screen is horizontally long, or when the terminal device 20d is a tablet computer, a desktop computer, or a laptop computer, the meeting view screen 700 can display a screen including the same elements.

The screen switching section 706 includes buttons 7060, 7061, 7062, and 7063 for switching a screen display mode. The button 7060 switches the screen display mode to an agenda display mode for displaying information related to agenda. The button 7061 switches the screen display mode to a chat display mode for displaying a chat screen for chatting. For example, in response to an operation of the button 7061, the terminal device 20d issues a request for participating in the chat to the server device 10. Once the participation in the chat is permitted in response to the chat request, a chat screen is displayed in the meeting view screen 700.

The button 7062 switches the screen display mode to a timeline display mode for displaying the timeline indicating the time elapsed on the timeline, during the meeting. The button 7063 switches the screen display mode to a live-streaming mode for displaying live streaming of the meeting. Illustrated in FIG. 27 is an example of the live-streaming mode.

In the example illustrated in FIG. 27, the meeting name display section 701, included in the meeting view screen 700 in the live-streaming mode, displays the meeting name of the meeting currently being watched. The channel selecting section 702 is an operation section for designating a channel of speech data to be replayed in the terminal device 20d. The terminal device 20d can select and replay desirable one of the speech data based on the speech recorded by the meeting terminal 25, and the speech data based on the speech recorded by the terminal device 20b, for example, either one of which is transmitted from the server device 10 in response to an operation of the channel selecting section 702.

The meeting information display section 703 displays or presents how the meeting is taking place in the conference room 2a. In the example illustrated in FIG. 27, the meeting information display section 703 displays an icon image 7030 indicating that the speech is being replayed, indicating that the speech based on the speech data over the channel designated in the channel selecting section 702 is being replayed.

The talk button 704 is a button for transmitting the speech data that is based on the speech recorded on the terminal device 20d to the server device 10. For example, in response to an operation of the talk button 704, the terminal device 20d transmits the speech data that is based on the speech recorded with the microphone 2013 of the terminal device 20d, to the server device 10. Upon receiving the speech data from the terminal device 20d, the server device 10 stores the received speech data in the storage 1003, for example, transmits the speech data to the meeting terminal 25, and causes the meeting terminal 25 to reproduce the speech data.

The function designating section 705 includes buttons 7050, 7051, and 7052. The button 7050 is a button for setting a marker depending on the time at which the button 7050 is operated. The button 7051 is a button for entering text on the terminal device 20d. In response to an operation of the button 7051, information of the entered text is transmitted to and stored in the server device 10, and the server device 10 transmits the information to the interactive whiteboard 22. On the interactive whiteboard 22, the information is displayed in a predetermined area of the drawing area 5402.

The button 7052 is a button for transmitting a response in the meeting, from the user using the terminal device 20d. In response to an operation of the button 7052, the terminal device 20d displays a submenu of icon images representing various responses, and transmits the information corresponding to the icon images displayed in the submenu to the server device 10. The server device 10 stores this information in a manner mapped to time in the timeline, and transmits the information to the interactive whiteboard 22. Based on the information received from the server device 10, the interactive whiteboard 22 displays an icon image in a predetermined position of the display 2027a, for example.

Figure 28:
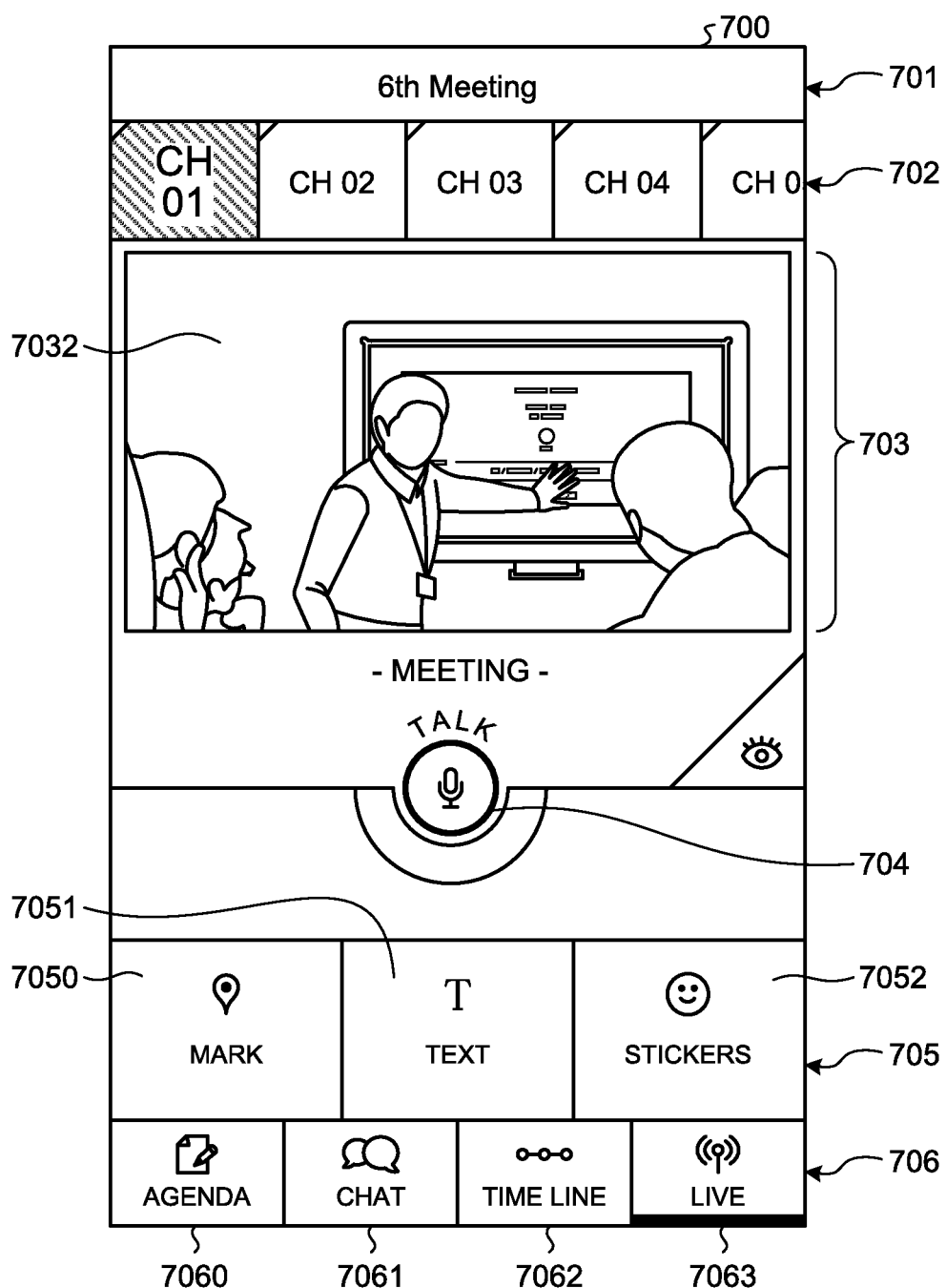
FIG. 28 is a schematic illustrating an example in which a video captured with a camera on the meeting terminal is displayed in the meeting view screen on the terminal device, which is an example applicable to the embodiments.

In the example illustrated in FIG. 27, in the meeting view screen 700 in the live-streaming mode, the meeting information display section 703 displays the icon image 7030 indicating that the speech is being replayed, and the speech that is based on the speech data designated in the channel selecting section 702 is being replayed on the terminal device 20d, but the example is not limited thereto. For example, as illustrated in FIG. 28, a video 7032 that is based on the video data captured by the camera 25c provided to the meeting terminal 25 may be displayed in the meeting information display section 703.

Figure 29:
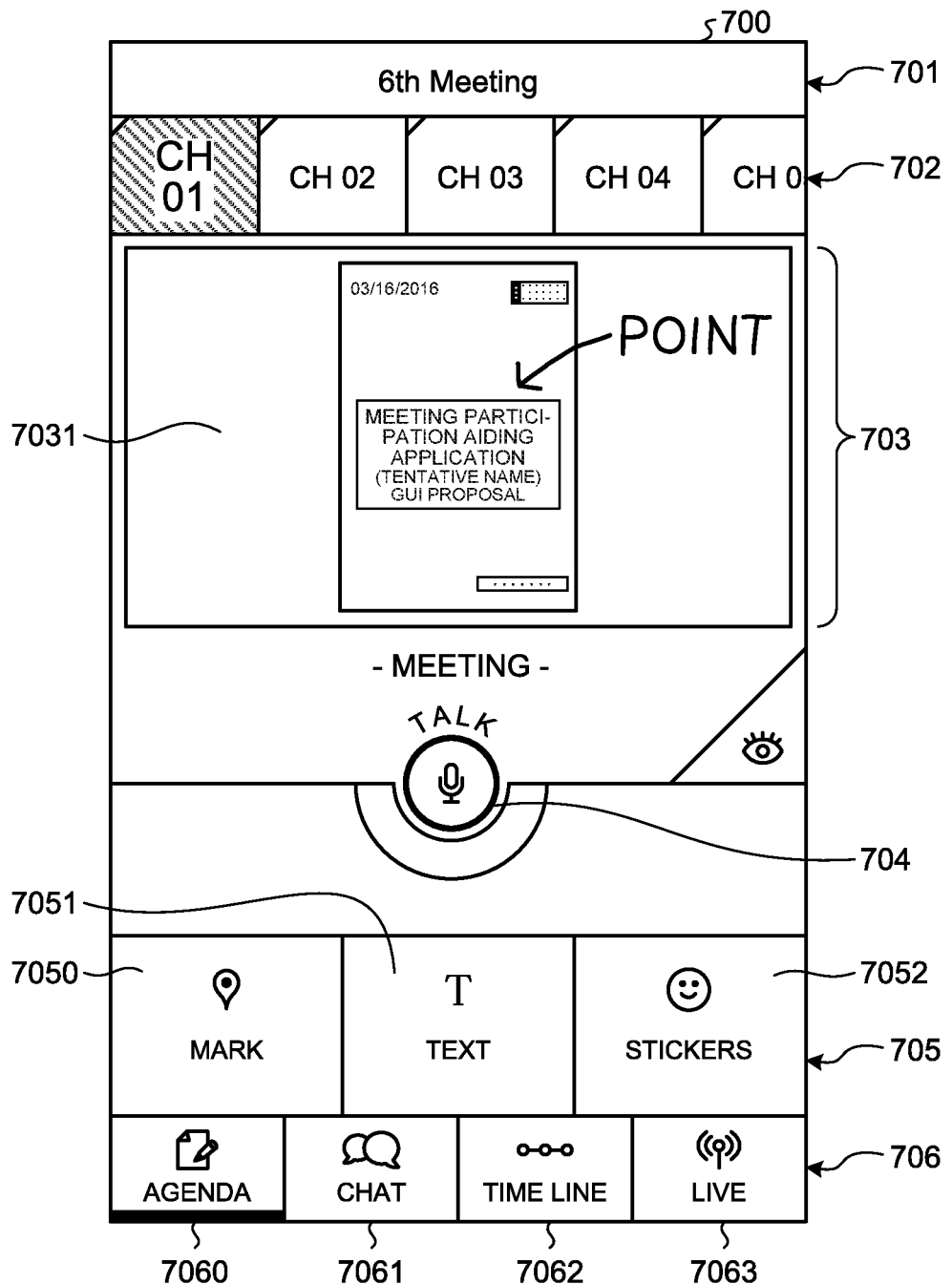
FIG. 29 is a schematic illustrating an example of a screen in a drawing area display mode applicable to the embodiments.

FIG. 29 illustrates an example of the drawing area display mode, resultant of the button 7060 in the meeting view screen 700 illustrated in FIG. 27 being operated, causing the display mode of the meeting view screen 700 to be switched, which is an example applicable to the embodiments. In this display mode, the image in the drawing area 5402 of the interactive whiteboard 22 is displayed in the meeting information display section 703. The interactive whiteboard 22 may, for example, transmit the image in the drawing area 5402 to the server device 10 at a predetermined time interval, and the terminal device 20d may be caused to acquire and to display the image.

Figure 30:
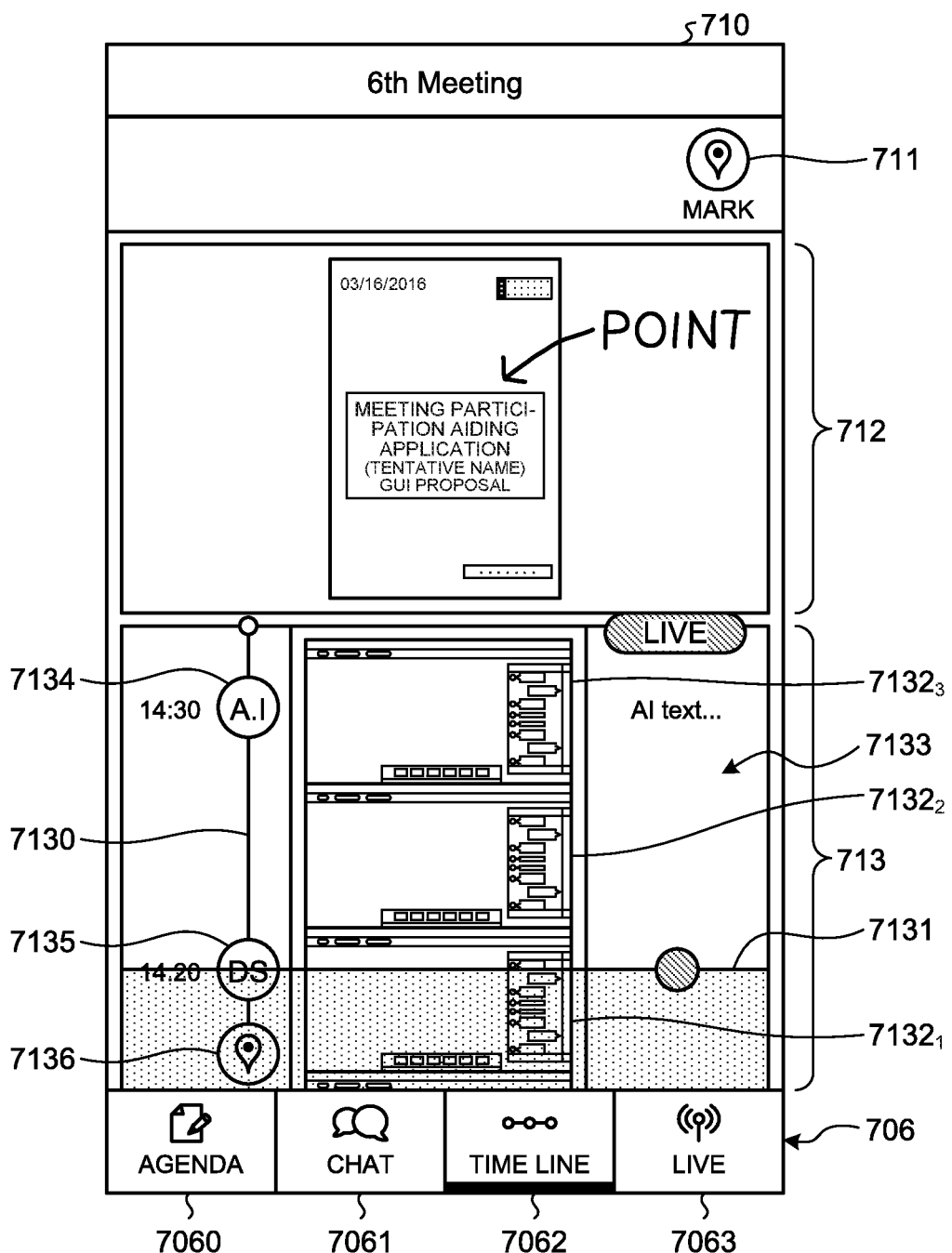
FIG. 30 is a schematic illustrating an example of a timeline display screen applicable to the embodiments.

FIG. 30 illustrates an example of the timeline display screen in the timeline display mode, which is an example applicable to the embodiments. As mentioned earlier, the terminal device 20d switches the screen display to the timeline display screen, in response to an operation of the button 7062 in the screen switching section 706. In FIG. 30, a timeline display screen 710 includes a marker button 711 (described later), an image display area 712, a timeline display area 713, and a screen switching section 706.

The timeline display area 713 displays a timeline 7130 indicating the time elapsed on the timeline. In this example, the timeline 7130 displays the time as elapsing from the bottom to the top of the screen. The timeline is, however, not limited to this example, and, the timeline 713 may display the time as elapsing from the top to the bottom of the screen, or may display the time as elapsing in the horizontal direction of the screen.

In the example illustrated in FIG. 30, markers 7134, 7135, and 7136 are plotted to the timeline 7130. The markers 7134 and 7135 correspond to the markers "A.I" and "DS", respectively, that are based on the action items A.I and decision DS, respectively, described above, and are markers based on marker information designated on the interactive whiteboard 22. The marker 7136 is a marker that is based on marker information designated by the user on the terminal device 20d, for example. These markers 7134, 7135, and 7136 are plotted to the positions on the timeline 7130, correspondingly to the time designated on the timeline.

In the timeline display area 713, a time designation line 7131 indicates a time currently being designated on the timeline 7130. The time designation line 7131 allows a user to change the time designated with the time designation line 7131 on the timeline 7130, through a user operation. In the example illustrated in FIG. 30, the image in the drawing area 5402 of the interactive whiteboard 22 at the time corresponding to the time designated with the time designation line 7131 is displayed in the image display area 712. When the marker 7134 corresponding to the action item A.I or the marker 7135 corresponding to the decision DS is set to the time designated with the time designation line 7131, for example, the text information entered for the action item A.I or the decision DS is displayed in the text display area 7133.

In FIG. 30, the images in the drawing area 5402 of the interactive whiteboard 22 at a plurality of respective time points on the timeline 7130 are displayed, as thumbnail images $7132_1$, $7132_2$, $7132_3$, respectively, in the middle portion of the timeline display area 713 (on the right side of the timeline 7130). By designating a desirable one of the thumbnail images $7132_1$, $7132_2$, $7132_3$, a user can display the image in the drawing area 5402 of the interactive whiteboard 22 corresponding to the designated thumbnail image, in the image display area 712.

Figure 31:
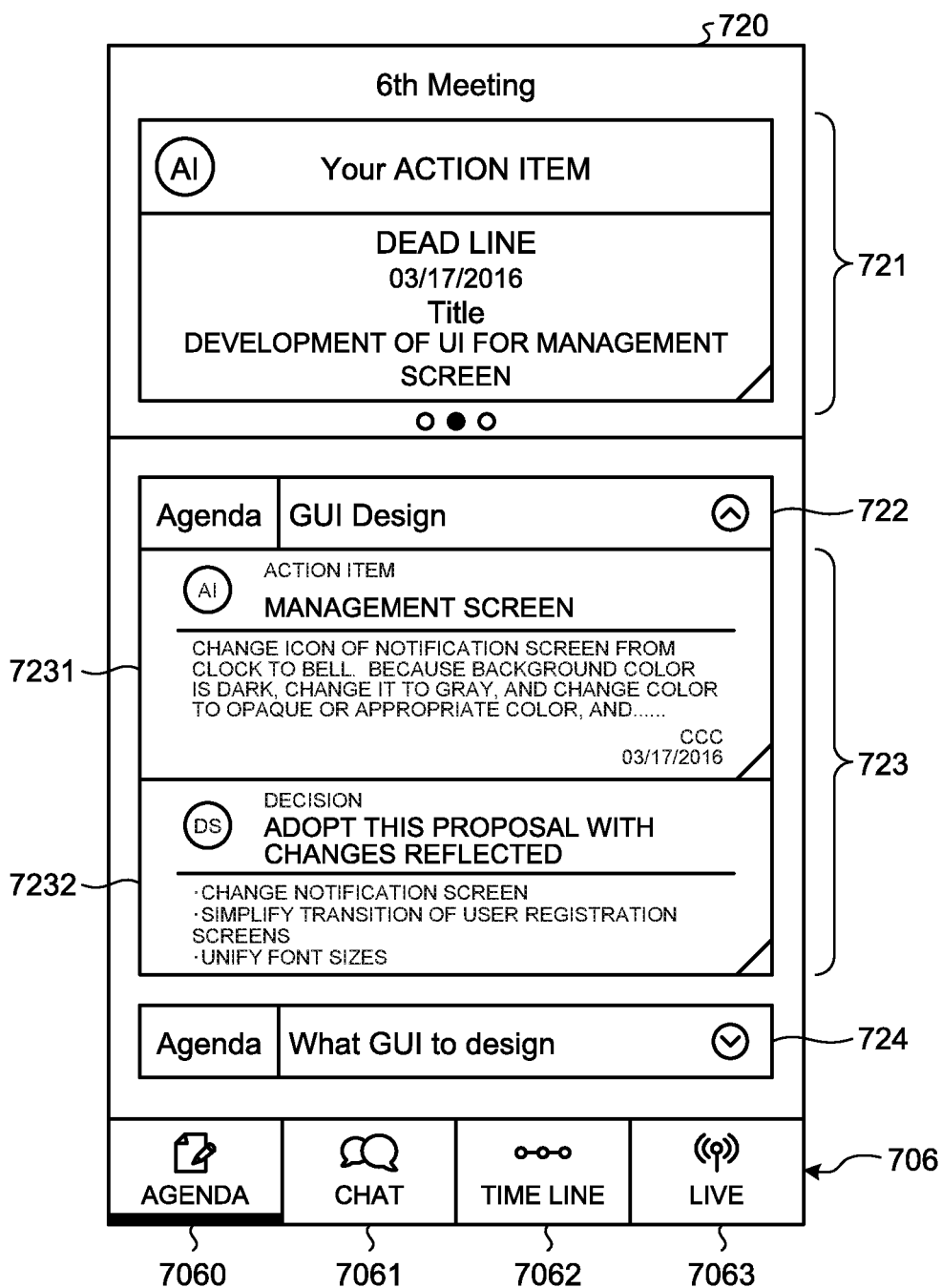
FIG. 31 is a schematic illustrating an example of an agenda display screen applicable to the embodiments.

FIG. 31 illustrates an example of the agenda display screen presented in the agenda display mode, which is an example applicable to the embodiments. As mentioned earlier, the terminal device 20d switches the screen display to the agenda display screen, in response to an operation of the button 7060 in the screen switching section 706. In FIG. 31, the agenda display screen 720 includes display areas 721, 722, 723, and 724.

The display areas 723 and 724 are areas for displaying the details of the agenda. In the example illustrated in FIG. 31, the display area 724 only displays the agenda. This area is expanded when the icon provided to the right end is designated, so that the details of the agenda become visible. The display area 723, illustrated as its area expanded, displays information 7231 indicating the specifics of the action item A.I, and information 7232 indicating the specifics of the decision DS, both of which are designated based on this agenda, as the details of the agenda.

Figure 32:
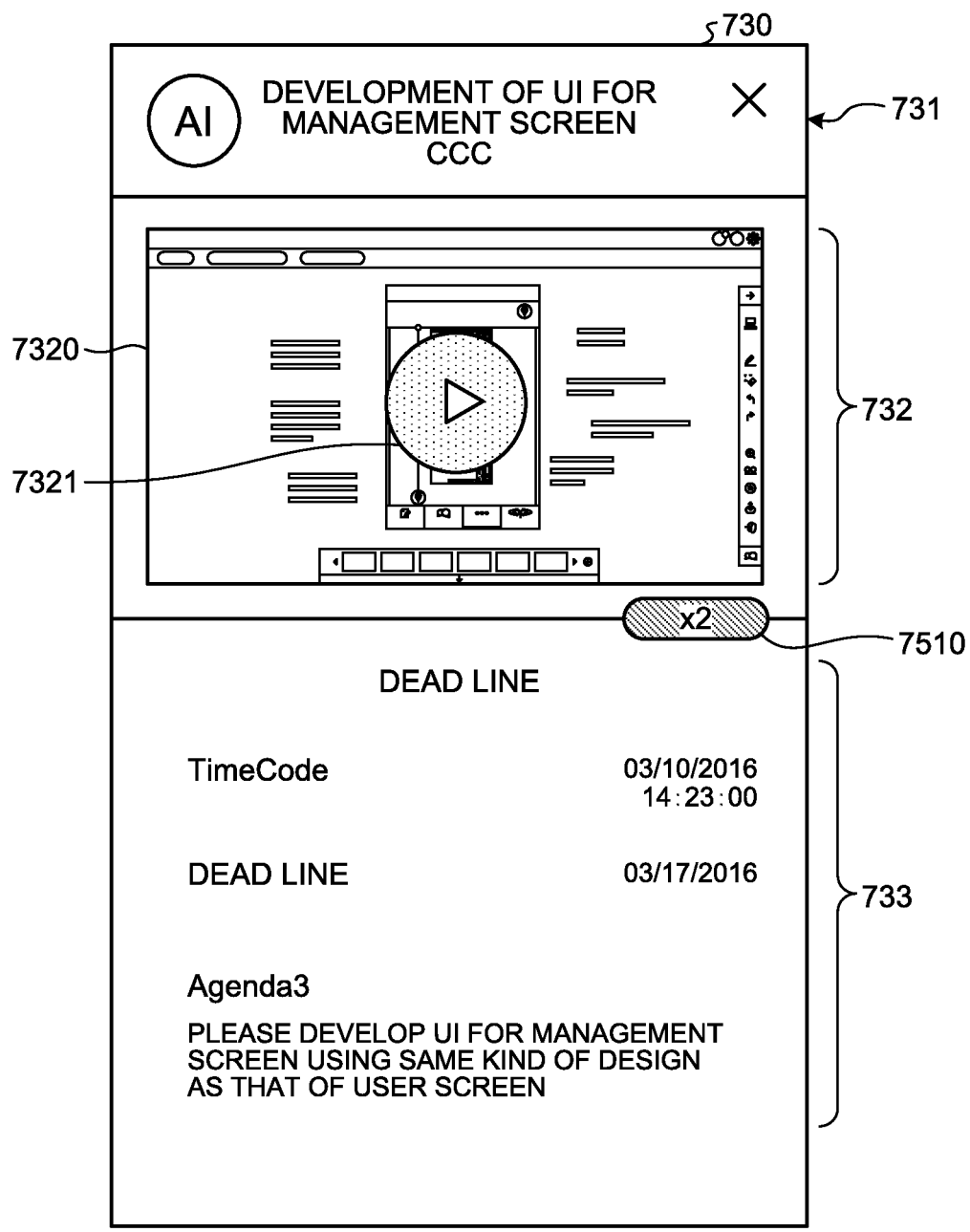
FIG. 32 is a schematic illustrating an example of the screen in which more specific details of action items are displayed, which is an example applicable to the embodiments.

In this example, the display area 721 displays the outline of the action item A.I entered by the user using the terminal device 20d. When a predetermined position in the display area 721 (e.g., lower right corner) is designated, more detailed information of the action item A.I is displayed, as illustrated in FIG. 32. In FIG. 32, the action item display screen 730 includes display areas 731, 732, and 733.

In the display area 731, the agenda of the meeting to which the action item A.I is related is displayed. The display area 731 displays an image 7320 in the drawing area 5402 of the interactive whiteboard 22 at the time at which the action item A.I is designated on the timeline, and is provided with a replay button 7321 for replaying the speech data. The replay button 7321 is a button for replaying the speech data recorded in the server device 10, starting from the time at which the action item A.I is designated to the timeline (the time $t_{AIst}$, in the example illustrated in (c) of FIG. 26).

The button 7510 is a button for designating the speed for replaying the replayed speech data, being replayed in response to an operation of the replay button 7321. In the example illustrated in FIG. 32, "×2" is displayed on the button 7510, indicating that double speed replay, at which the speech data is replayed at a speed double the recorded speed, has been designated. The server device 10 can replay the speech data at a speed different from that at which the speech data is recorded, by applying processes such as sub-sampling and interpolation, or resampling of the speech data to be replayed, depending on the replay speed designated with the button 7510.

The display area 733 displays the time and the specifics designated in relation to the action item A.I.

Marker Process Applicable to Embodiments

A marking process applicable to the embodiments will now be explained. To begin with, a basic marking process will now be explained with reference to FIGS. 33 to 36. In the meeting view screen 700 illustrated in FIG. 33, for example, a user can set a marker corresponding to the current time by designating the button 7050 with a pointer 7070 via a user operation, and by moving the pointer 7070 to the button 7062 for switching the screen display mode to the timeline display mode, as indicated by the arrow 7071 (dragging operation). The terminal device 20d then stores information indicating the set marker in the RAM 2002, in a manner mapped to information indicating the time, for example.

Figure 34:
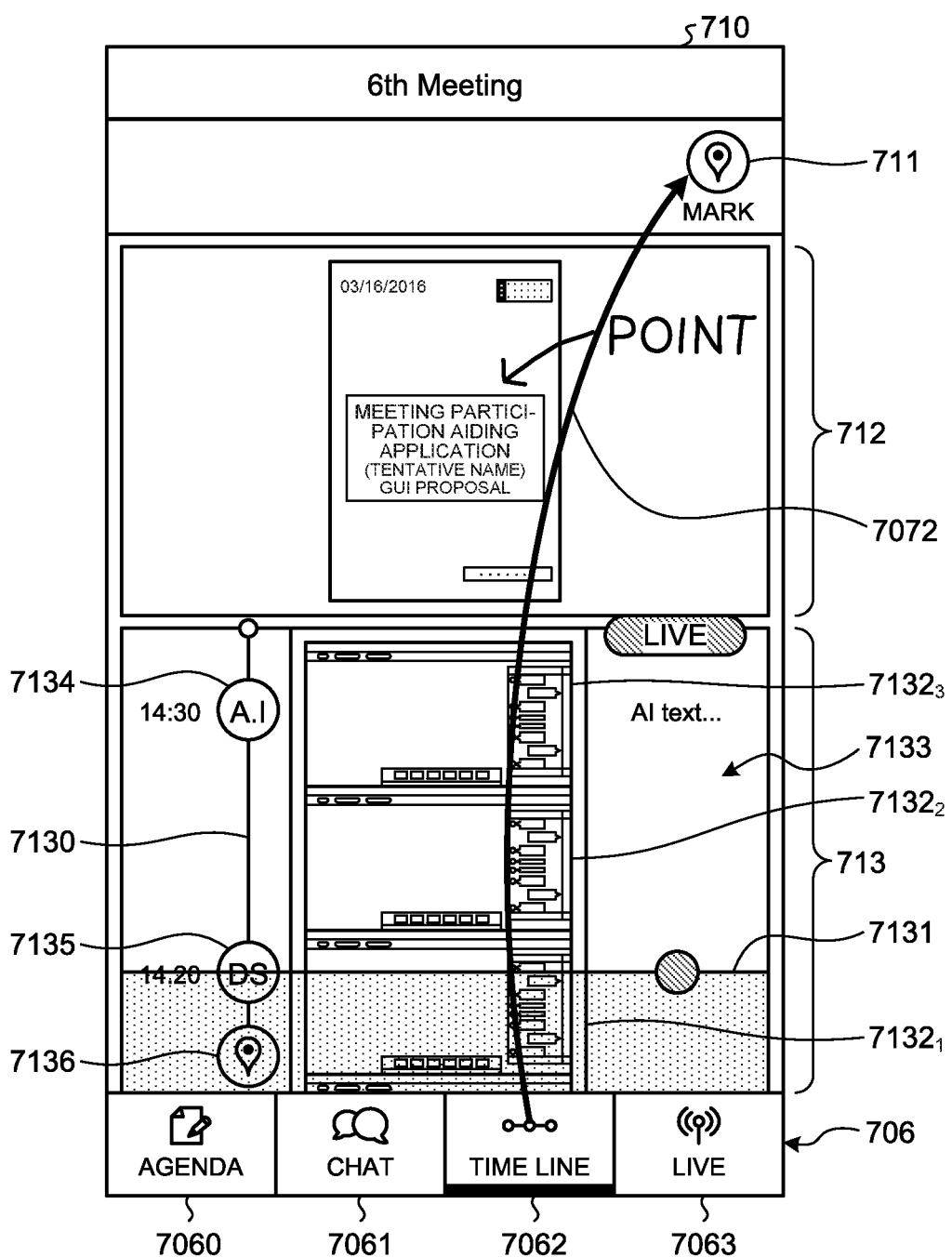
FIG. 34 is a schematic for explaining the marking process applicable to the embodiments.

To display the information recorded at the time to which the marker designated by the user is mapped, as illustrated in FIG. 34, the user switches the display mode to the timeline display mode, by operating the button 7062, to begin with, and operates the marker button 711, as indicated by the arrow 7072. In response to an operation of the marker button 711, the terminal device 20d then switches the screen display to a marker list screen 740 illustrated in FIG. 35.

Figure 35:
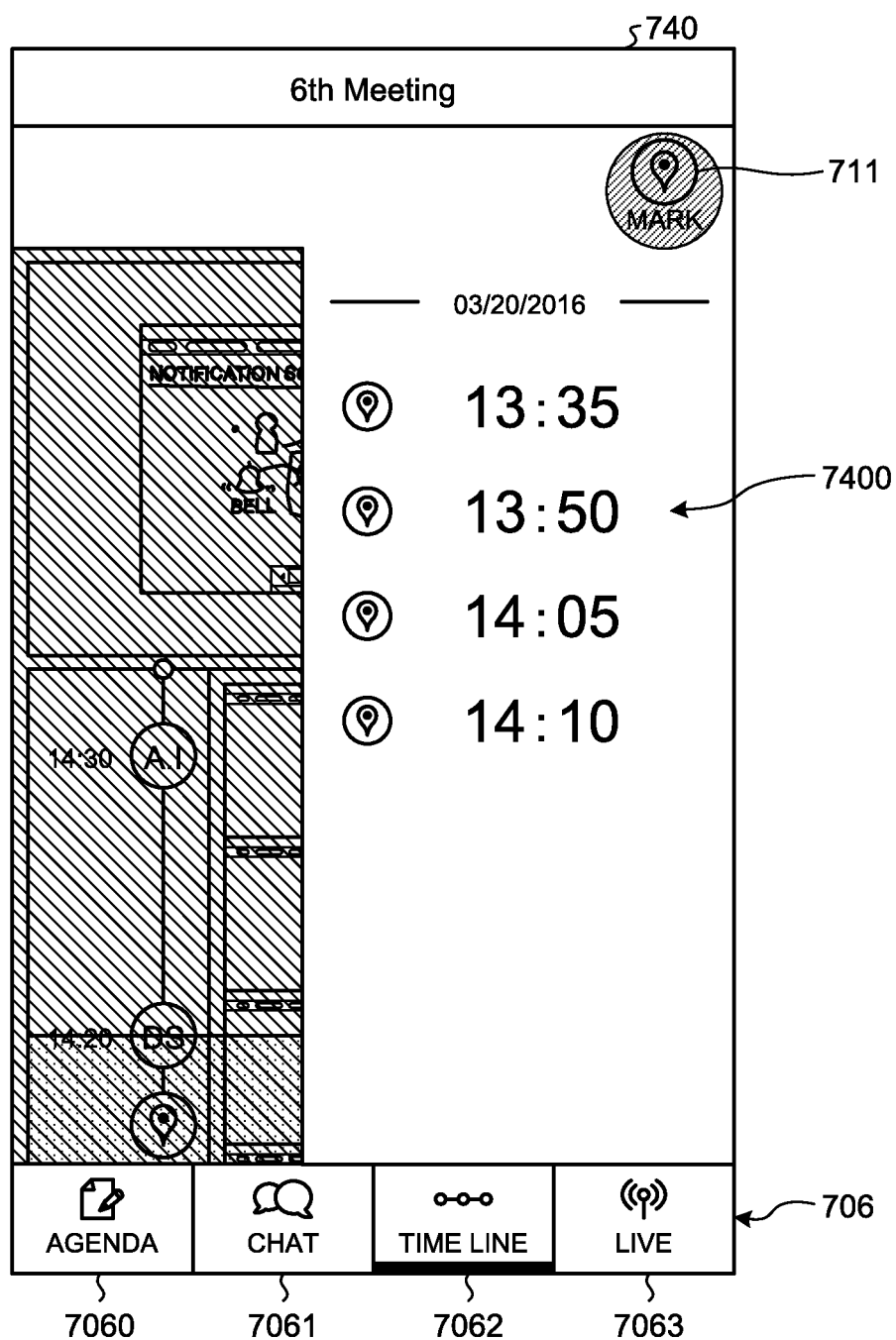
FIG. 35 is a schematic for explaining the marking process applicable to the embodiments.

In FIG. 35, the marker list screen 740 displays the markers set to the timeline of the meeting in the display area 7400, as a list. In the example illustrated in FIG. 35, the markers are displayed as a list, using the information indicating the time at which the markers are set. When a user performs an operation designating a marker from the list of information representing the markers in the display area 7400, the terminal device 20d transmits the information indicating the time mapped to the marker information of the marker to the server device 10, and requests the information mapped to the time from the server device 10.

In response to the request, the server device 10 transmits the information mapped to the time to the terminal device 20d. The information transmitted by the server device 10 to the terminal device 20d is, for example, an image in the drawing area 5402 of the interactive whiteboard 22, a stream of the recorded speech data or video data having the time as a starting point, or material data presented on the interactive whiteboard 22 at the time.

Figure 36:
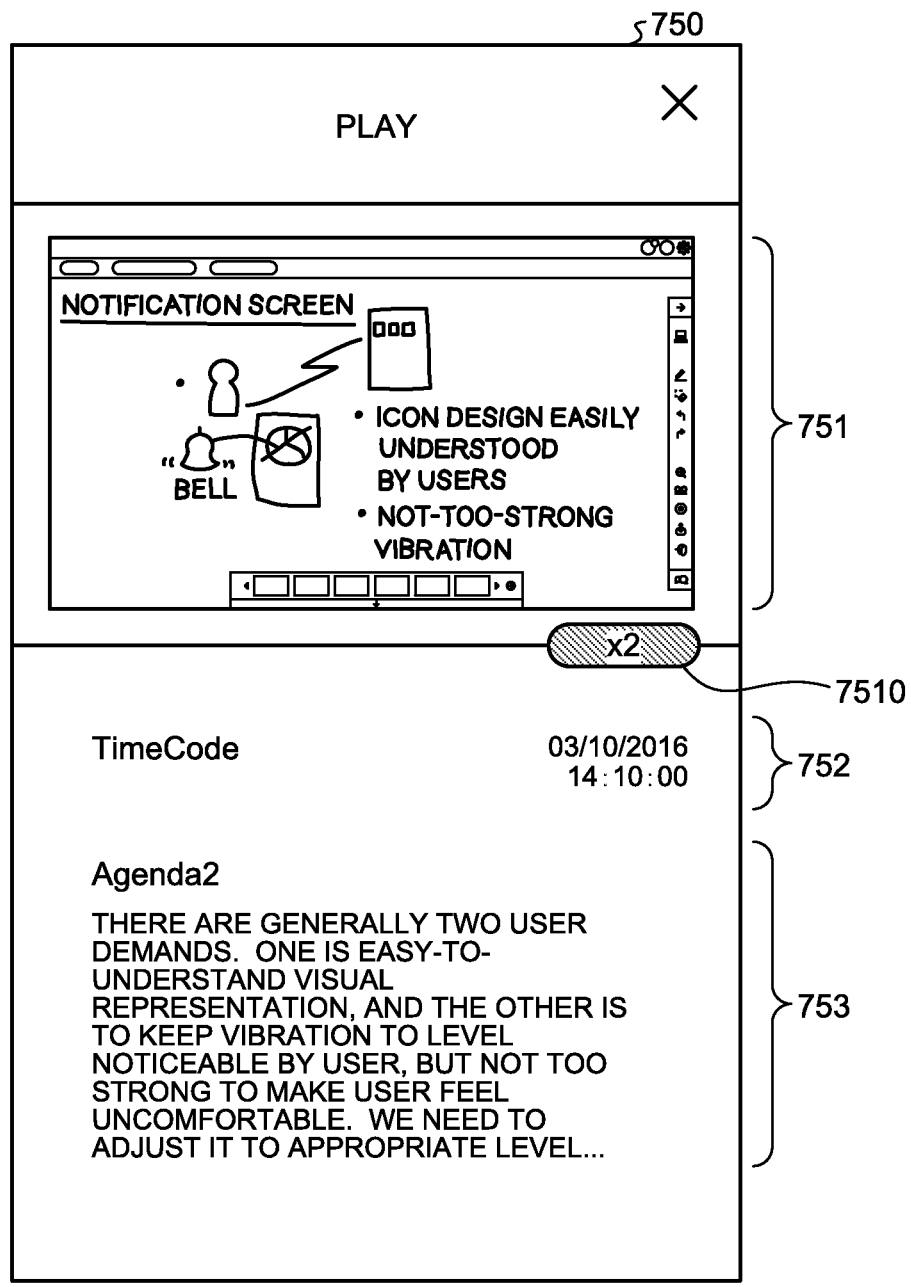
FIG. 36 is a schematic for explaining the marking process applicable to the embodiments.

In response to the operation of designating a marker, the terminal device 20d switches the screen display to an information display screen for presenting the information received from the server device 10, correspondingly to the designated marker. FIG. 36 illustrates an example of the information display screen applicable to the embodiments. In FIG. 36, the information display screen 750 includes display areas 751, 752, and 753. In the display area 751, the image having been displayed in the drawing area 5402 of the interactive whiteboard 22 at the time corresponding to the marker is displayed. In the display area 752, information indicating the time at which the marker is set is displayed. In this example, the server device 10 has a function for sequentially converting the speech data into text information, and storing therein the text information, for example. The display area 753 displays text information within a predetermined time range, including the time corresponding to the marker, among the text information converted by the server device 10.

In the example illustrated in FIG. 36, the information display screen 750 is provided with the button 7510 for designating the replay speed, in the same manner as the action item display screen 730, explained above with reference to FIG. 32. In this example in which the text information converted from the speech data is displayed in the display area 753, the text information displayed in the display area 753 is updated, based on the timing of the arrival of the text information corresponding to the speech data for which the replay speed has been changed in response to an operation of the button 7510, for example.

EMBODIMENTS

Some embodiments of the present invention will now be explained. Participants participating in the meeting may temporarily leave their seat during the meeting, regardless whether the type of participation is the onsite participation, the remote participation, or the semi-participation. When a participant leaves his/her seat during the meeting, it is preferable for the participant to be able to understand the discussions made during the time from when the participant has left to when the participant has returned. In the embodiment, the participant is enabled to acquire such information during the time of his/her temporary absence, easily.

Figure 33:
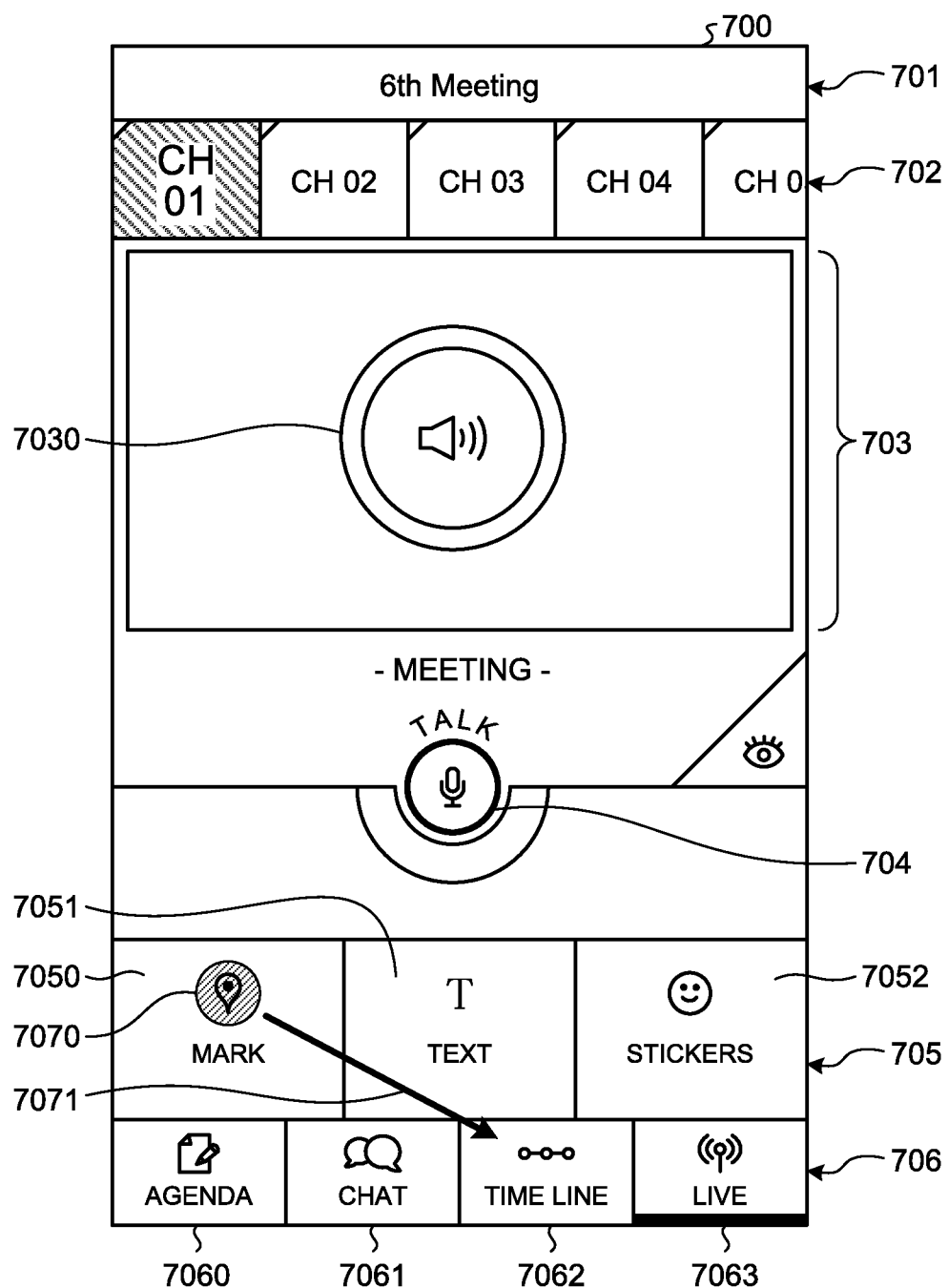
FIG. 33 is a schematic for explaining a marking process applicable to the embodiments.
Figure 37:
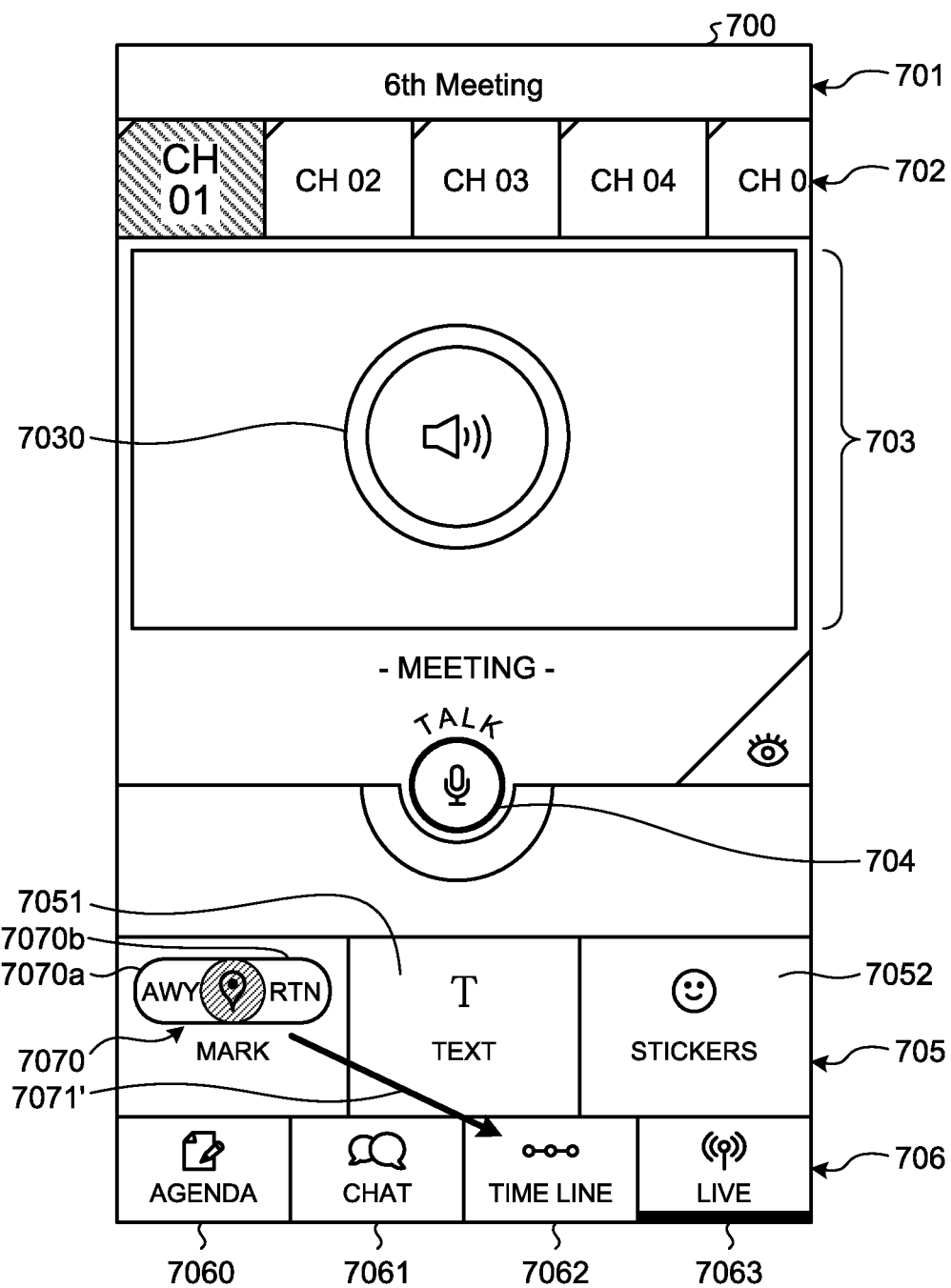
FIG. 37 is a schematic illustrating an example of the meeting view screen provided with a button for setting markers indicating a leave and a return of a user, according to an embodiment of the present invention.

The server device 10 sets the marker information indicating a leave and a return of a participant, in response to a request from each of the terminal devices 20a to 20d. FIG. 37 illustrates an example of the meeting view screen 700 illustrated in FIG. 33 provided with the buttons 7070a and 7070b for setting markers indicating a leave (AWY) and a return (RTN) of a user.

For example, the buttons 7070a and 7070b are expansible pointers that are displayed on both sides of the pointer 7070, by holding down the button 7050 for setting markers. Without limitation to the example explained above, the buttons 7070a and 7070b may be displayed as button images in advance. By designating the displayed button 7070a, and moving the designated position to the button 7062, in the direction of the arrow 7071' as illustrated in FIG. 37, for example, the information of the marker indicating a leave is stored in the RAM 2002 in a manner mapped to the information indicating the time at which the operation is made. The user operates the button 7070a indicating a leave, for example, when the user temporarily leaves his/her seat.

The same is applicable to the button 7070b indicating a return. For example, when the user returns from his/her leave, the user operates the button 7070b. In this manner, the information of the marker indicating a return is stored in the RAM 2002 in a manner mapped to the information indicating the time at which the operation is made. At this time, the terminal device 20d stores the marker information with a marker type indicating a leave, and the marker information with a marker type indicating a return in a manner mapped to each other, as a pair of pieces of marker information.

When the user operates the button 7070b, and sets the marker information indicating a return, the terminal device 20d transmits the marker information indicating a leave, paired with the marker information indicating a return to the server device 10, and requests the information corresponding to the period starting from when the user has left the seat, from the server device 10.

Explained now is a process performed by the server device 10 when the information corresponding to the period starting from when the user has left the seat is requested from the terminal device 20d.

Figure 38:
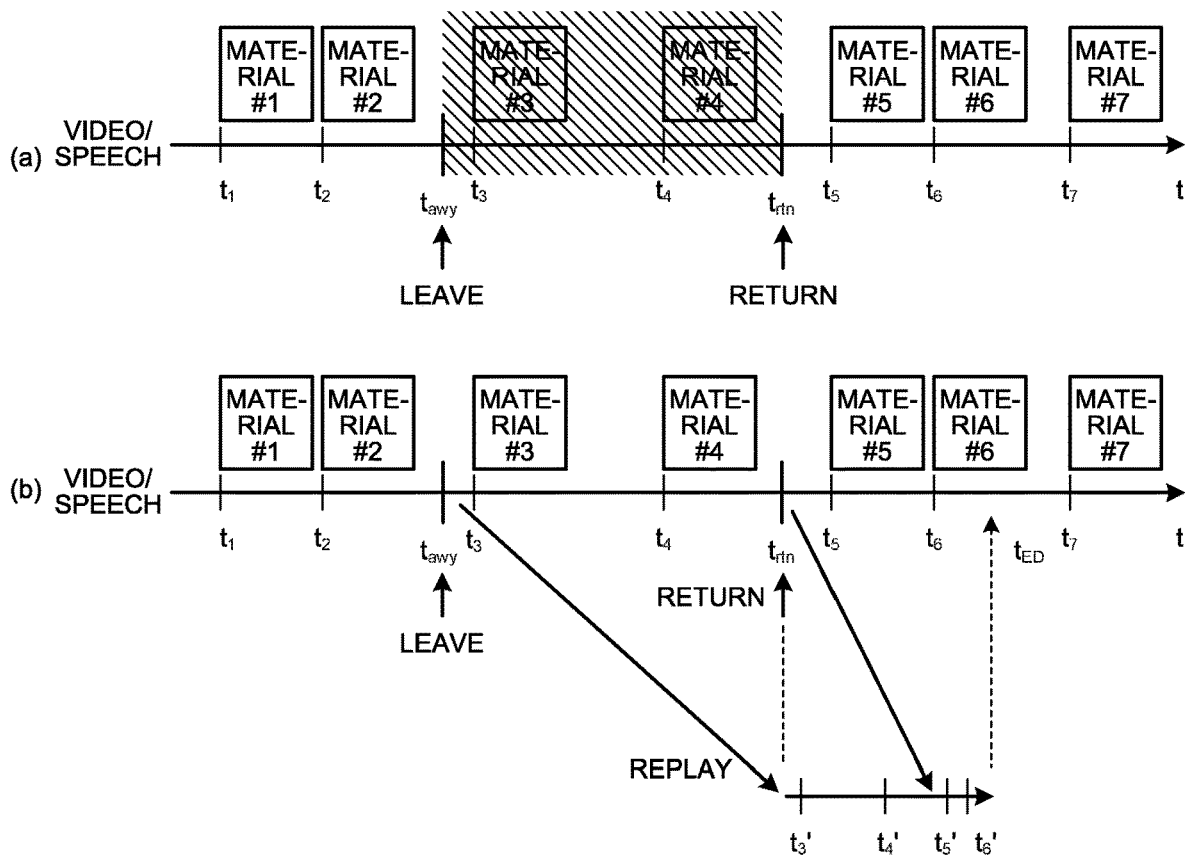
FIG. 38 schematically illustrates the progress of a meeting applicable to the embodiments.

FIG. 38 schematically illustrates the progress of a meeting. In FIG. 38, it is assumed that meeting progresses along the timeline from the left to the right. The server device 10 records speech and video as the meeting progresses, as illustrated in (a) of FIG. 38. The materials #1 to #7 are displayed on the interactive whiteboard 22, for example, at time $t_1$ to $t_7$, respectively. The server device 10 records the materials #1 to #7 in a manner mapped to the time $t_1$ to $t_7$, respectively, at which the materials #1 to #7 are displayed on the interactive whiteboard 22, in the log, for example.

In this example, it is assumed that, as an example, the user using the terminal device 20d temporarily leaves his/her seat at time $t_{awy}$ (first timepoint), and returns to the meeting at time $t_{rtn}$ (second timepoint). In such a case, the user is absent from the meeting between the time $t_{awy}$ and the time $t_{rtn}$ (the period illustrated as hatched). Therefore, for the user to participate in the meeting smoothly after his/her return, it is preferable for the user to check for the discussion from the time $t_{awy}$ by some means.

To achieve this objective, the user operates the button 7070a indicating a leave, when the user leaves the seat, on the terminal device 20d. In response to the operation of the button 7070a, the terminal device 20d creates marker information containing the time $t_{awy}$ at which the user has left the seat, and stores the marker information in the RAM 2002.

When the user returns to the meeting at the time $t_{rtn}$, for example, the user operates the button 7070b indicating a return on the terminal device 20d. In response to the operation of the button 7070b, the terminal device 20d transmits the marker information containing the time $t_{awy}$ at which the user has left the seat and stored in the RAM 2002, to the server device 10, and requests for the information corresponding to the period starting from the time $t_{awy}$, from the server device 10.

Based on the marker information indicating a leave received from the terminal device 20d, the server device 10 replays the recorded speech data and video data from the time $t_{awy}$ in the speech data and the video data, which is the time specified in the marker information indicating a leave, and transmits the replayed speech data and video data to the terminal device 20d as a stream. When there is any material data displayed on the interactive whiteboard 22 during the discussions of the meeting, for example, the server device 10 also transmits the material data to the terminal device 20d, in a manner mapped to the time at which the material data is displayed.

The terminal device 20d then causes the speaker 2014 to output the speech that is based on the speech data received from the server device 10, and causes the display 2011 to display the video that is based on the video data in the meeting view screen 700, for example. The terminal device 20d can also display the material data received from the server device 10. In this manner, the user can check the discussions made in the meeting from when the user has temporarily left the seat.

In this example, if the speech and the video are replayed at the same speed as that at which the speech and the video are recorded, however, the replay of the content might not catch up with the actual progress of the meeting, and the user may be incapable of understanding the content of the meeting. Therefore, in the embodiment, the server device 10 causes the speech data and video data to be replayed at a speed higher than the speed at which the pieces of data are recorded from $t_{awy}$, that is the time at which the user has left the seat, in response to a request from the terminal device 20d, as illustrated in (b) of FIG. 38.

More specifically, based on the marker information indicating the time at which the user has left the seat, the server device 10 starts replaying the speech data and the video data over a period starting from the time $t_{awy}$, which is the time at which the user has left the seat, at the time $t_{rtn}$, which is the time at which the button 7070b indicating a return is operated on the terminal device 20d, and at which the marker information is transmitted from the terminal device 20d, and transmits the replayed speech data and video data to the terminal device 20d.

At this time, the server device 10 replays the speech data and the video data over a period starting from the time $t_{awy}$, at a replay speed higher than the speed at which the data is recorded, and transmits the data to the terminal device 20d. In other words, the server device 10 replays a predetermined amount of information having been recorded with a first unit time, using a second unit time that is shorter than the first unit time.

The first timeline is created based on the first unit time, and the second timeline is created based on the second unit time. In the example illustrated in (b) of FIG. 38, the times $t_3$, $t_4$, $t_5$, and $t_6$ that are based on the first timeline correspond to the times $t_3'$, $t_4'$, $t_5'$, and $t_6'$ that are based on the second timeline, respectively.

Even while the information recorded based on the first unit time, that is, the information recorded between the time $t_{awy}$ and the time $t_{rtn}$ on the first timeline is being replayed based on the second unit time, that is, being replayed in accordance with the second timeline, the recording of information in accordance with the first timeline is continued. At time $t_{ED}$ at which the time on the second timeline matches the corresponding time on the first timeline, the speech and video data being replayed in accordance with the second timeline starts being replayed in accordance with the first timeline.

In the manner described above, by controlling replays of the speech data and the video data in which the meeting is recorded, when a user starts replaying the speech data recorded from a second time that is previous to a first time, from the first time, it is possible to allow a point currently being replayed to catch up with a point being currently recorded in the speech data. Therefore, when the user temporarily leaves the seat and returns during the meeting, the user can check what has been discussed during the time of his/her temporary absence from the meeting, and catch up with the discussions subsequent to the return, easily.

First Embodiment

Figure 39:
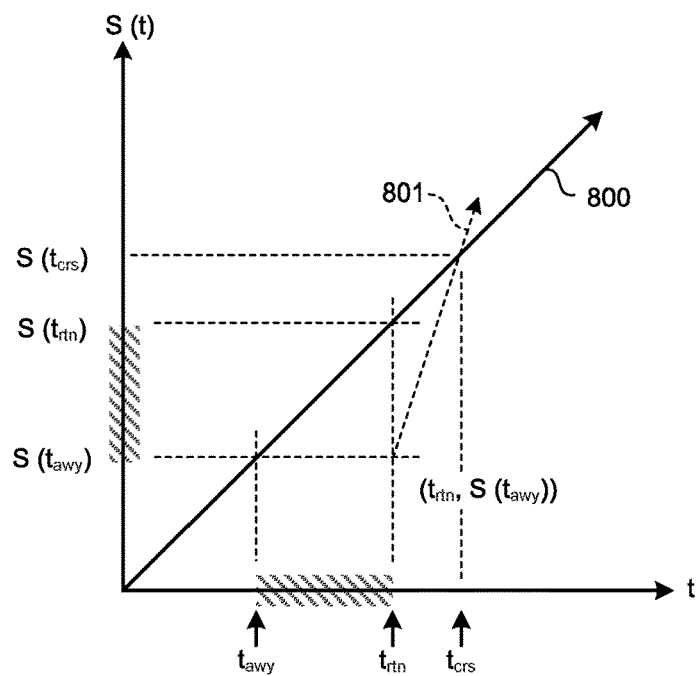
FIG. 39 is a schematic for generally explaining a process according to a first embodiment of the present invention.

A first embodiment of the present invention will now be explained. In the first embodiment, the speech data and the video data are replayed from the time $t_{awy}$, as described above, at a rate higher than the rate at which these pieces of data are recorded. FIG. 39 is a schematic for generally explaining a process according to the first embodiment. In FIG. 39, the horizontal axis represents the time, and the vertical axis represents data S(t) having time as a function. In the explanation herein, it is assumed herein that data S(t) is speech data, but the data S(t) may also be video data. The user is absent during the period between the time $t_{awy}$ and the time $t_{rtn}$, and is not aware of the information corresponding to the data $S(t_{awy})$ to $S(t_{rtn})$ during this period.

In FIG. 39, a line 800 indicates how the data S(t) is recorded in accordance with the first timeline. A line 801 represents how the data $S(t_{awy})$ to $S(t_{rtn})$ recorded during the period between the time $t_{awy}$ and the time $t_{rtn}$ is replayed from the time $t_{rtn}$ in accordance with the second timeline. Because the data is replayed at a rate n times higher than the rate at which the data is recorded (where n>1), the gradient of the line 801 is represented as steeper than that of the line 800, so that the line 801 intersects with the line 800 at time $t_{crs}$ (third timepoint), representing that the replaying catches up with the recording, at the time $t_{crs}$.

The value n is not particularly limited, as long as the value satisfies (n>1). However, considering that the highest replay speed at which people can understand the recorded speech is generally said to be 1.3 times the speed at which the speech is recorded, it is preferable to set the value n to a value ranging from 1.2 to 1.4, for example.

Figure 40:
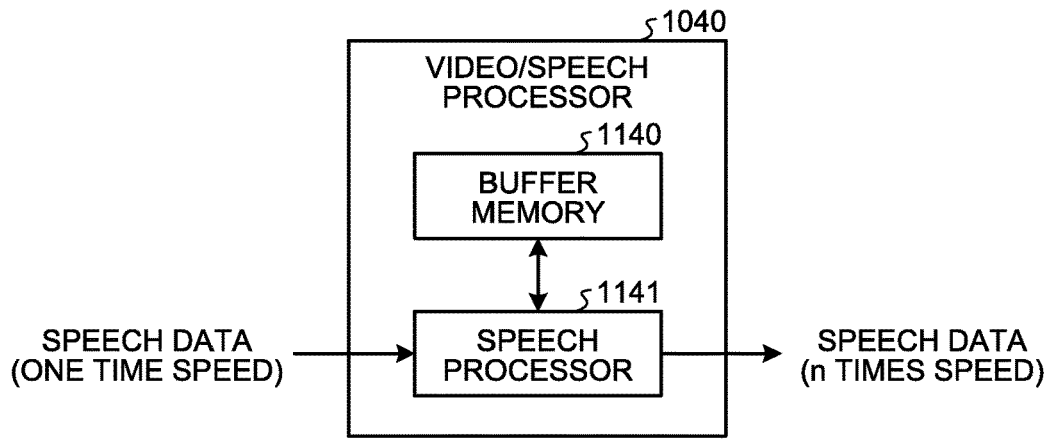
FIG. 40 is a block diagram illustrating an example of a configuration of a video/speech processor applicable to the first embodiment.

FIG. 40 illustrates an example of a configuration of the video/speech processor 1040 included in the server device 10 applicable to the first embodiment. FIG. 40 illustrates an example of a configuration for processing speech data. The video/speech processor 1040 includes, as elements for processing speech data, a buffer memory 1140 and a speech processor 1141.

The speech processor 1141 stores input speech data (which is at a speed of one time, with respect to the speed n times this speed) in the buffer memory 1140, in units of a predetermined amount. In this example, it is assumed that the sampling frequency of the input speech data is 48 kHz. The speech processor 1141 re-samples the speech data stored in the buffer memory 1140 at a sampling frequency of (48/n) kHz, based on the value n representing n-times speed, using an existing technology. The speech processor 1141 reads each sample from the re-sampled speech data in the buffer memory 1140, and outputs the samples in accordance with the sampling frequency of 48 kHz. In this manner, the speech processor 1141 converts the input speech data at a one-time speed into speech data at an n-times speed, and outputs the resultant data.

Explained herein is an example of speech data, but the same process can also be used for video data. For video data, video data at an n-times speed can be achieved by subsampling the frames using an existing technology, for example, based on the value n with respect to the video data at a one-time speed.

Figure 41:
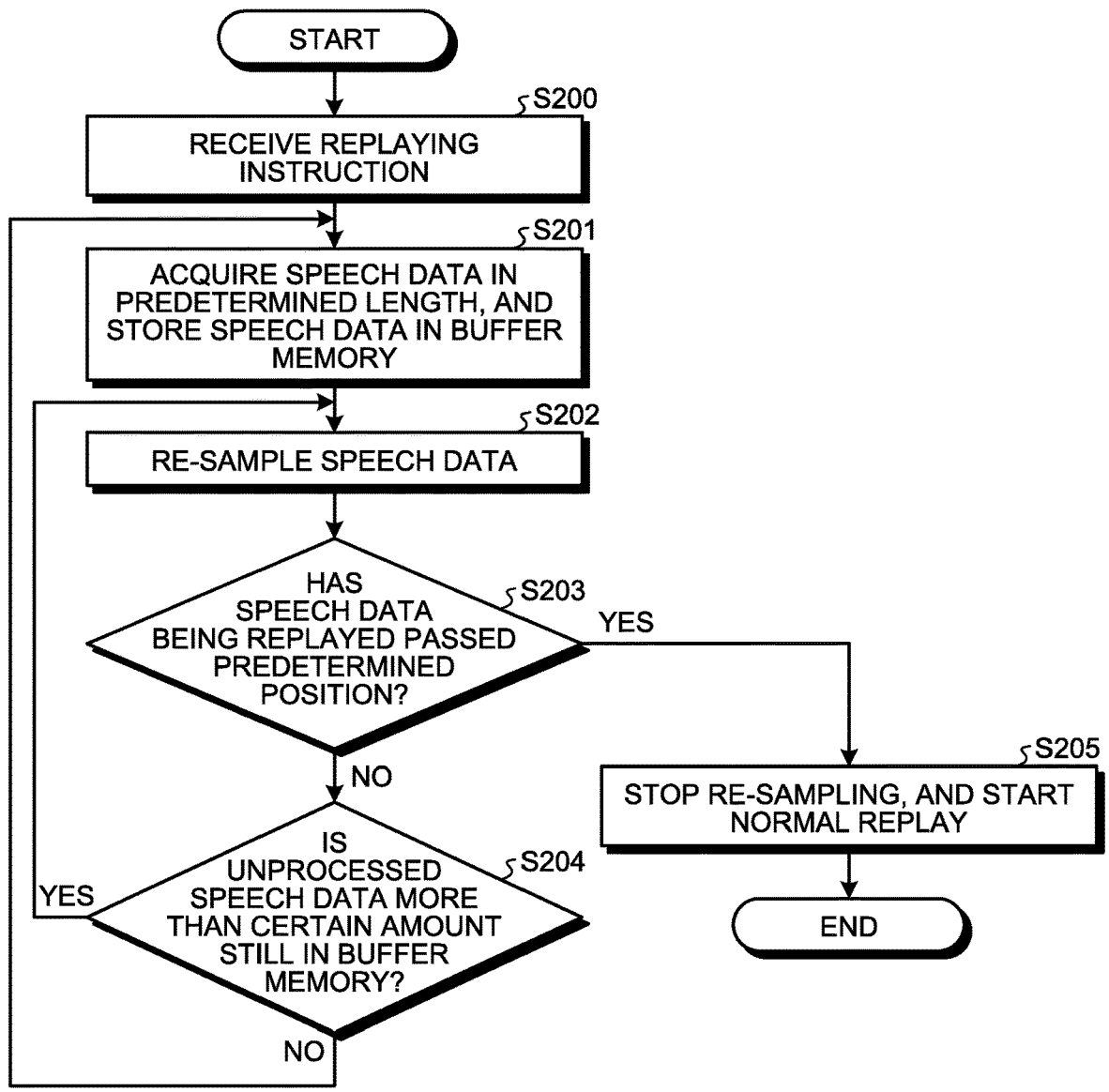
FIG. 41 is an exemplary flowchart illustrating a speech data replaying process according to the first embodiment.

FIG. 41 is an exemplary flowchart illustrating a speech data replaying process performed in the server device 10 according to the first embodiment. In the explanation hereunder, it is assumed that the value n in the n-times speed is predetermined. Therefore, the position (the time $t_{crs}$ mentioned above) at which the speech data replayed at the n-times speed catches up the speech data recorded at one-time speed can be acquired in advance.

At Step S200, the server device 10 receives an instruction for replaying the speech data from the timepoint at which the user has left the seat, in response to an operation of the button 7070b on the terminal device 20d, for example. The replay instruction is passed to the speech processor 1141 included in the project manager 104 corresponding to the meeting ID in the server device 10.

The terminal device 20d may transmit the meeting ID to the server device 10 in response to an operation of the button 7070b, or the server device 10 may acquire the meeting ID by referring to the meeting managing table or the like based on the information of the terminal device 20d from which the replay instruction is received.

At the next Step S201, upon receiving the instruction for replaying the speech data from the time $t_{awy}$ from the server device 10, the speech processor 1141 acquires a predetermined length of speech data from the speech data mapped to the meeting ID recorded in the storage 1003, and stores the speech data in the buffer memory 1140.

At the next Step S202, the speech processor 1141 re-samples the speech data stored in the buffer memory 1140. For the purpose of explanation, it is assumed that the re-sampling process is executed sequentially from the head of the speech data stored in the buffer memory 1140. The re-sampled speech data is then transmitted from the server device 10 to the terminal device 20d, and replayed on the terminal device 20d.

At the next Step S203, the speech processor 1141 determines whether the point being replayed has passed a predetermined point in the speech data (time $t_{crs}$). If the speech processor 1141 determines that the point being replayed has passed the predetermined point (No at Step S203), the process is shifted to Step S204.

At Step S204, the speech processor 1141 determines whether unprocessed speech data more than a certain amount is still in the buffer memory 1140. If the speech processor 1141 determines that unprocessed speech data more than a certain amount is in the buffer memory 1140 (Yes at Step S204), the speech processor 1141 shifts the process back to Step S202, and continues the re-sampling process. If the speech processor 1141 determines that unprocessed speech data more than the certain amount is not in the buffer memory 1140 (No at Step S204), the speech processor 1141 shifts the process back to Step S201.

At Step S203, if the speech processor 1141 determines that the point being replayed has passed the predetermined point in the speech data (time $t_{crs}$) (Yes at Step S203), the speech processor 1141 shifts the process to Step S205. At Step S205, the speech processor 1141 stops re-sampling, and starts replaying the speech data in a normal mode, that is, starts replaying the speech data recorded in storage 1003 without changing the replay speed. At Step S205, when the speech data starts being replayed in the normal replay mode, the series of process following the flowchart illustrated in FIG. 41 is ended.

Second Embodiment

A second embodiment of the present invention will now be explained. In the first embodiment described above, the speech data is replayed at a high speed, merely by replaying the speech data at a replay speed higher than the speed at which the speech data is recorded. By contrast, in the second embodiment, a silent portion included in the speech data is detected, and the detected silent portion is skipped while the speech data is replayed.

Figure 42:
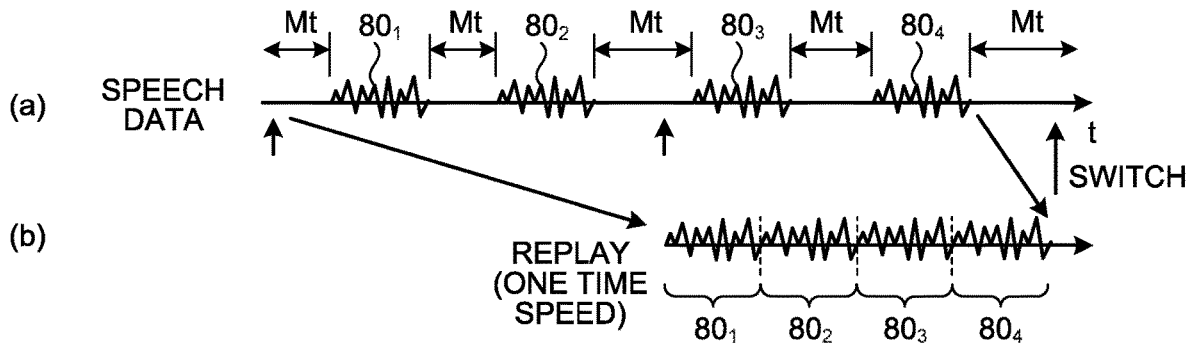
FIG. 42 schematically illustrates a replaying process according to the second embodiment.

FIG. 42 schematically illustrates a replaying process according to the second embodiment. In FIG. 42, (a) illustrates an example of speech data recorded during the meeting and stored in the storage 1003. In (a) of FIG. 42, it is assumed that each section other than the sections in which the pieces of speech $80_1$ to $80_4$ are detected is a silent section Mt in which speech at a volume equal to or larger than a predetermined level is not detected.

In the second embodiment, the speech data illustrated in (a) of FIG. 42 is replayed, by skipping the silent sections Mt. For example, in the speech data illustrated in (a) of FIG. 42, the pieces of speech $80_1$ to $80_4$ are connected by deleting the silent sections Mt, as illustrated in (b) of FIG. 42. The server device 10 then transmits the speech data in which the pieces of speech $80_1$ to $80_4$ are connected, to the terminal device 20*d*. In the example illustrated in (a) and (b) of FIG. 42, because the speech $80_4$ starts being replayed while the speech $80_4$ is being recorded, the replay mode is switched to the normal replay mode, after the replaying of the speech $80_4$ is finished.

Because the silent sections Mt are deleted, the length of the speech data is reduced. Therefore, when the speech data having been recorded from the second time that is previous to the first time starts being replayed at the first time, it is possible to allow a point currently being replayed to catch up with a point currently being recorded in the speech data. Therefore, when the user temporarily leaves the seat and returns during the meeting, the user can check what has been discussed during the time in which the user was temporarily absent from the meeting, and catch up with the discussions subsequent to the return easily.

Modification of Second Embodiment

Figure 43:
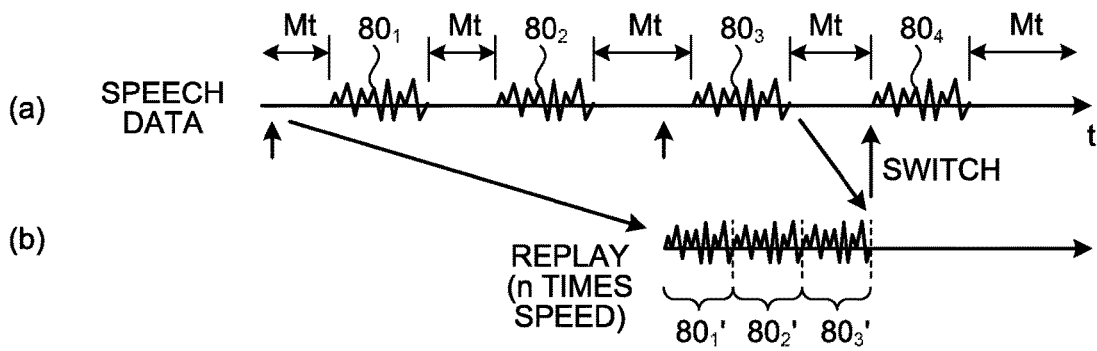
FIG. 43 schematically illustrates a modification of the second embodiment.

A modification of the second embodiment will now be explained. In the modification of the second embodiment, the high-speed replaying according to the first embodiment is applied to the second embodiment. The modification of the second embodiment will now be explained briefly with reference to FIG. 43. In FIG. 43, (a) is the same as (a) of FIG. 42 described above, so that the explanation thereof is omitted herein. In the modification of the second embodiment, not only the silent sections Mt are deleted, but also the speech $80_1$ to $80_3$ is converted into speech data $80_1'$, $80_2'$, $80_3'$ at the n times replay speed, through re-sampling, for example, as illustrated in (b) of FIG. 43.

In the modification of the second embodiment, because silent sections in the speech data are deleted, and the speech $80_1$, $80_2$, $80_3$ are converted into speech data $80_1'$, $80_2'$, $80_3'$, respectively, at the n times replay speed, the replay mode can be switched to the normal replay mode at an even earlier timing. In the example illustrated in (a) and (b) of FIG. 43, at the timing at which replaying of the speech $80_3'$ is finished, the speech $80_4$ that is subsequent to the speech $80_3$ corresponding to the speech $80_3'$ starts being recorded in the speech data, and the end of the piece of speech data being replayed arrives before the start of the piece of speech data being recorded. At the timing at which the end of the speech data being replayed arrives before the start of the speech data being recorded, the replay mode is switched to the normal replay mode, and the speech $80_4$ being recorded is replayed in the normal replay mode.

Figure 44:
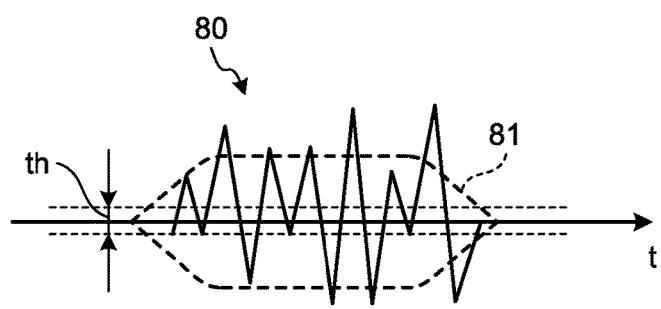
FIG. 44 schematically illustrates an example of a silent section detecting method that can be commonly applicable to the second embodiment and the modification thereof.

Explained now briefly with reference to FIG. 44 is an example of a method for detecting a silent section Mt, which is an example that is commonly applicable to the second embodiment and the modification thereof. Because the configuration of the video/speech processor 1040, explained with reference to FIG. 40 in relation to the speech data processing, can be used as it is in the second embodiment and the modification thereof, the detailed explanation thereof will be omitted herein.

The speech processor 1141 stores input speech data (which is at a speed of one time, with respect to the speed n times this speed) in the buffer memory 1140, in units of a predetermined amount. The speech processor 1141 applies a low-pass filter to the speech data 80 stored in the buffer memory 1140, and generates an envelope 81 of the speech data 80. The speech processor 1141 determines the level of the generated envelope 81 against a threshold th, and determines a section of the envelope 81 falling within the threshold th as a silent section Mt.

Figure 45:
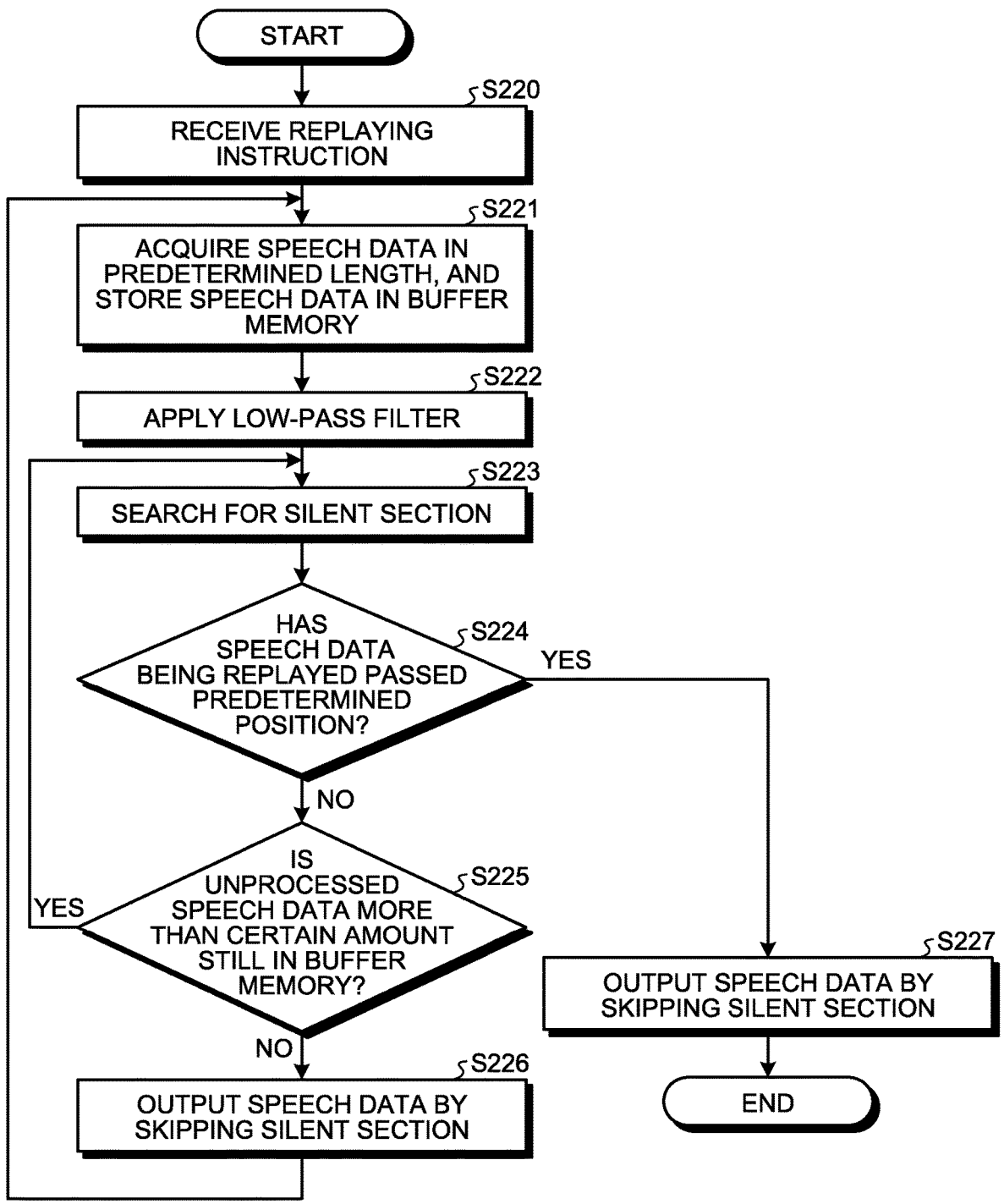
FIG. 45 is an exemplary flowchart illustrating a speech data replaying process according to the second embodiment and the modification thereof.

FIG. 45 is an exemplary flowchart illustrating a speech data replaying process performed in the server device 10 according to the second embodiment and the modification thereof. At Step S220, the server device 10 receives an instruction for replaying the speech data from when the user has left the seat, in response to an operation of the button 7070*b* on the terminal device 20*d*, for example. The replay instruction is passed to the speech processor 1141 included in the project manager 104 corresponding to the meeting ID in the server device 10.

At the next Step S221, upon receiving the instruction for replaying the speech data from the time $t_{awy}$ from the server device 10, the speech processor 1141 acquires a predetermined length of speech data from the speech data mapped to the meeting ID recorded in the storage 1003, and stores the speech data in the buffer memory 1140. At the next Step S222, the speech processor 1141 applies a low-pass filter to the speech data stored in the buffer memory 1140, and detects the envelope 81.

At the next Step S223, the speech processor 1141 determines the level of the envelope 81 detected at Step S222 against the threshold th, and searches for a silent section Mt. At the next Step S224, the speech processor 1141 determines whether the point being replayed has passed a predetermined point in the speech data. In such a case, for example, the speech processor 1141 can determine that the point being replayed has passed the predetermined point in the speech data at the timing at which the end of a piece of speech data currently being replayed arrives before the start of the piece of speech data currently being recorded, as explained with reference to FIGS. 42 and 43. If the speech processor 1141 determines that the point being replayed has not passed the predetermined point (No at Step S224), the process is shifted to Step S225.

At Step S225, the speech processor 1141 determines whether unprocessed speech data more than a certain amount is in the buffer memory 1140. If the speech processor 1141 determines that unprocessed speech data more than a certain amount is in the buffer memory 1140 (Yes at Step S225), the speech processor 1141 shifts the process back to Step S223, and continues the process of searching for a silent section Mt. If the speech processor 1141 determines that unprocessed speech data more than a certain amount is not in the buffer memory 1140 (No at Step S225), the process is shifted to Step S226.

At Step S226, based on the search result of the silent section Mt performed at Step S223, the speech processor 1141 outputs the speech data stored in the buffer memory 1140, by skipping the silent section Mt. The process is then shifted back to Step S221.

At Step S224, if the speech processor 1141 determines that the point being replayed has passed the predetermined point in the speech data (Yes at Step S224), the speech processor 1141 shifts the process to Step S227. At Step S227, in the same manner as at Step S226, the speech processor 1141 outputs the speech data stored in the buffer memory 1140, by skipping the silent section Mt, based on the search result of the silent section Mt performed at Step S223. The speech processor 1141 then switches the speech data replay mode to the normal replay mode, and the series of process following the flowchart illustrated in FIG. 45 is ended.

Third Embodiment

Figure 46:
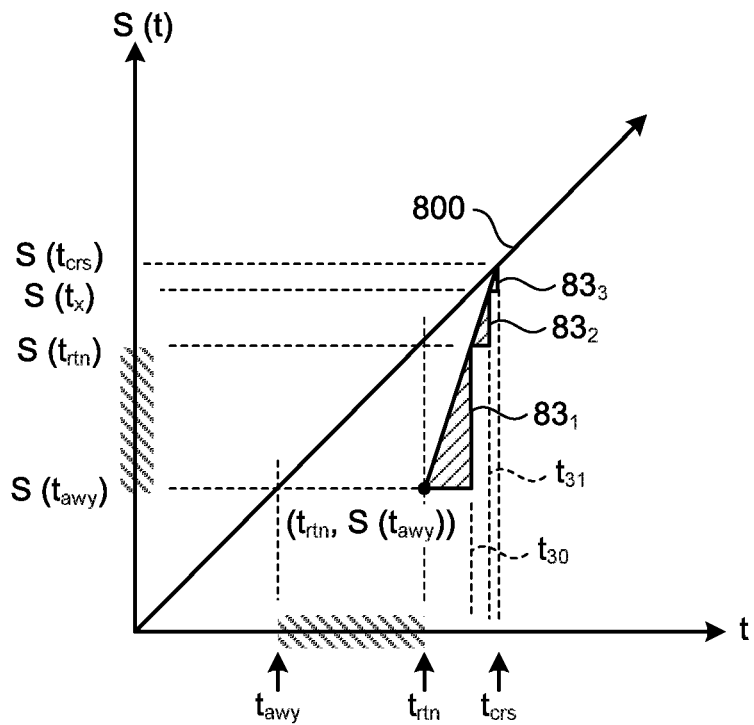
FIG. 46 is a schematic for generally explaining a process according to a third embodiment of the present invention.

A third embodiment of the present invention will now be explained. In the third embodiment, the speech data subsequent to the time $t_{awy}$ is converted into text information, and the text information is output. FIG. 46 is a schematic for generally explaining a process according to the third embodiment. In FIG. 46, the denotations of the reference numerals are the same as those in FIG. 39 described above, so the explanations thereof are omitted herein.

The speech data S ($t_{awy}$) to S($t_{rtn}$) recorded between the time $t_{awy}$ and the time $t_{rtn}$ starts being converted into text information at the time $t_{rtn}$, and ended at time $t_{30}$, for example (area $83_1$). The conversion of the speech data S($t_{rtn}$) to S($t_x$) recorded between the time $t_{rtn}$ and the time $t_{30}$ into text information is started at the time $t_{30}$, and the conversion is finished at time $t_{31}$, for example (area $83_2$).

In the manner described above, the process of converting the recorded speech data into text information, and the process of converting the speech data recorded during the time of conversion into text information are repeated until the speech data converted into text information catches up with the speech data currently being recorded. In the example illustrated in FIG. 46, the speech data being converted into text information catches up with the speech data currently being recorded in the area $83_3$ (time $t_{crs}$). In such a case, the oblique side of the areas $83_1$, $83_2$, and $83_3$ can be considered to correspond to the second timeline.

Figure 47:
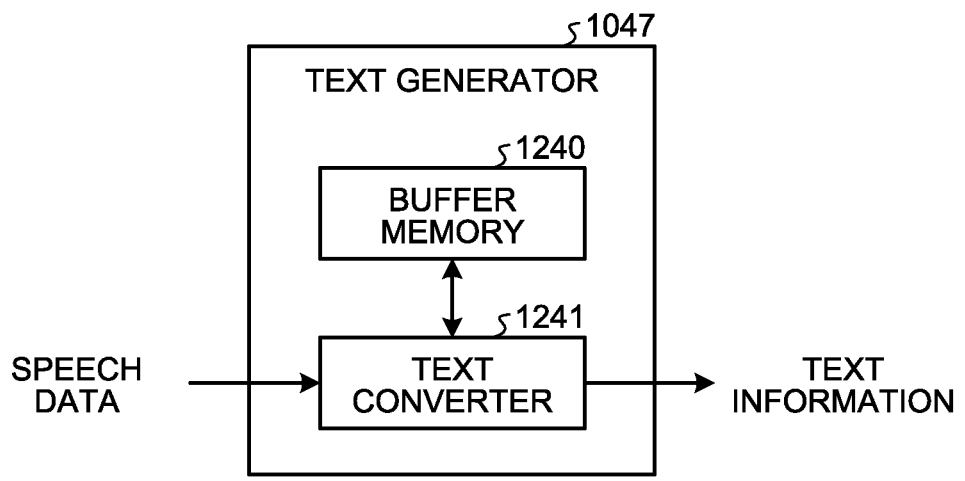
FIG. 47 is a block diagram illustrating an exemplary configuration of a text generator applicable to the third embodiment.

FIG. 47 illustrates an example of a configuration of the text generator 1047 included in the server device 10, which is an example applicable to the third embodiment. The text generator 1047 includes a buffer memory 1240 and a text converter 1241.

For example, the text converter 1241 receives an input of speech data read from the storage 1003. The text converter 1241 stores the received speech data in the buffer memory 1240. The text converter 1241 converts the speech data stored in the buffer memory 1240 into text information, using a known voice recognition technology. For example, the text converter 1241 recognizes the voice included in the speech data using an acoustic model learned in advance, and identifies a set of series of recognized voices as words. To identify words, for example, the Hidden Markov model may be used. The text converter 1241 outputs the text information resultant of the conversion of the speech data.

It is assumed herein that the text converter 1241 is capable of converting speech data into a text at a speed sufficiently higher than the speed at which the converted speech data is replayed.

Figure 48:
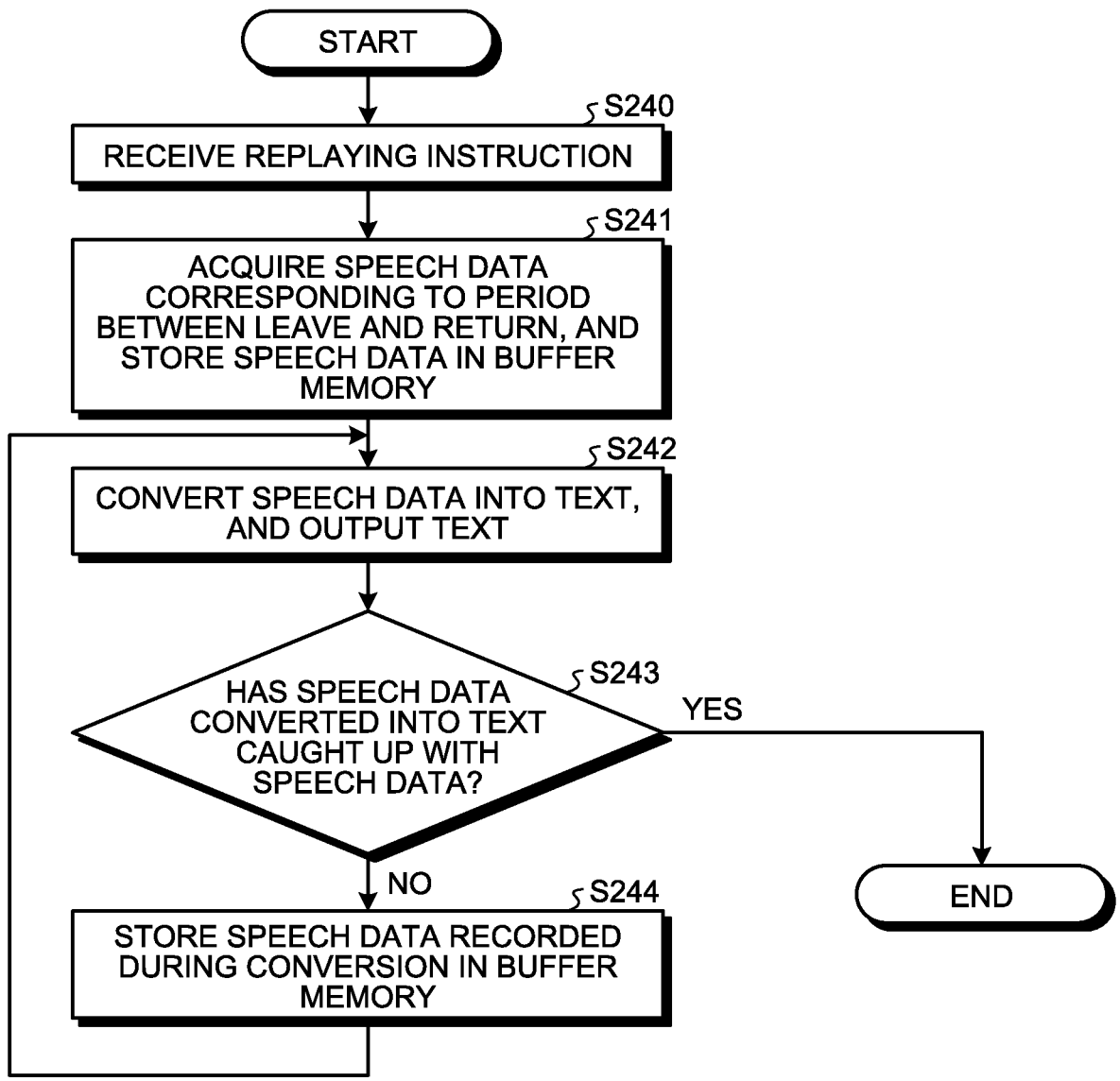
FIG. 48 is an exemplary flowchart illustrating a text conversion process according to the third embodiment.

FIG. 48 is an exemplary flowchart illustrating a text converting process performed in the server device 10 according to the third embodiment. At Step S240, in response to an operation of the button 7070b on the terminal device 20d, for example, the server device 10 receives an instruction for replaying the speech data from when the user has left the seat (time $t_{awy}$). The replay instruction is passed to the text generator 1047 included in the project manager 104 corresponding to the meeting ID in the server device 10.

At the next Step S241, upon receiving the instruction for replaying the speech data recorded between the time $t_{awy}$ and the time $t_{rtn}$ from the server device 10, the text converter 1241 included in the text generator 1047 acquires the speech data corresponding to this period from the speech data recorded in the storage 1003 in a manner mapped to the meeting ID, and stores the acquired speech data in the buffer memory 1240.

At the next Step S242, the text converter 1241 reads the speech data from the buffer memory 1240, and converts the read speech data into text information. The text converter 1241 then outputs the text information resultant of the conversion of the speech data. The server device 10 then transmits the text information output from the text converter 1241 to the terminal device 20d.

At the next Step S243, the text converter 1241 determines whether the speech data converted into a text has caught up with the speech data currently being recorded. If the text converter 1241 determines that the speech data has not caught up (No at Step S243), the process is shifted to Step S244.

At Step S244, the text converter 1241 acquires the speech data recorded while the speech data is previously being converted at Step S242 from the storage 1003, and stores the speech data in the buffer memory 1240. Once the storing of the speech data in the buffer memory 1240 is completed, the text converter 1241 shifts the process back to Step S242, and starts converting the speech data stored in the buffer memory 1240 into a text.

At Step S243, if the text converter 1241 determines that the speech data having been converted into a text has caught up with the speech data currently being recorded (time $t_{crs}$) (Yes at Step S243), the series of process illustrated in the flowchart in FIG. 48 is ended.

When the process following the flowchart illustrated in FIG. 48 is ended, the server device 10 transmits the speech data subsequent to the time $t_{crs}$ to the terminal device 20d. Without limitation to the example explained above, the server device 10 may keep causing the text generator 1047 to generate text data from the speech data even after the process following the flowchart illustrated in FIG. 48 is ended.

Figure 49:
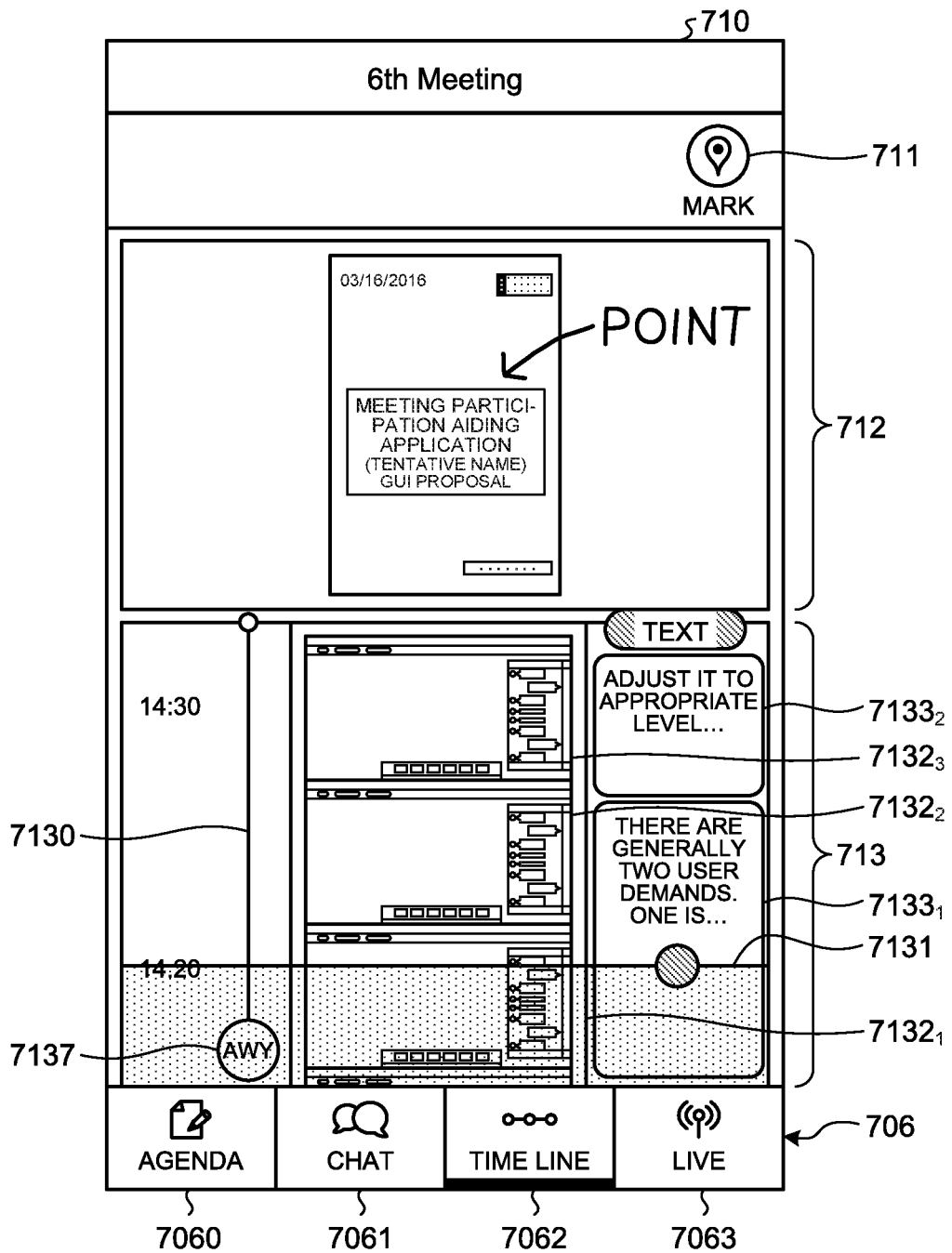
FIG. 49 is a schematic illustrating an example of a timeline display screen in which text information converted from speech data is displayed, according to the third embodiment.

FIG. 49 illustrates an example of the timeline display screen 710 in which the text information resultant of the conversion of the speech data is displayed on the terminal device 20d, for example, according to the third embodiment. In response to an operation of the button 7070b provided to the meeting view screen 700 illustrated in FIG. 37, for example, the server device 10 displays the timeline display screen 710.

In the example illustrated in FIG. 49, pieces of text information $7133_1$ and $7133_2$ resultant of the conversion of the speech data by the text generator 1047 provided to the server device 10 are displayed in the right-hand side area of the timeline display area 713. In the timeline display area 713, the marker 7137 indicating a leave of the user is plotted to a position of the timeline 7130, with such a position corresponding to the time at which the user has operated the button 7070a on the meeting view screen 700 illustrated in FIG. 37.

In the manner described above, in the third embodiment, the speech data recorded from the timepoint of the user's leave is sequentially converted into text information, and the text information is presented to the user. Therefore, when the user temporarily leaves the seat and returns the meeting, the user can check what has been discussed during the time in which the user was temporarily absent from the meeting, and catch up with the discussions subsequent to the return, easily.

Fourth Embodiment

A fourth embodiment of the present invention will now be explained. In the fourth embodiment, the server device 10 presents the image displayed in the drawing area 5402 of the interactive whiteboard 22, or the image of material data presented by the interactive whiteboard 22 while the user is temporarily absent from the meeting, to the terminal device 20d used by the user, for example. The server device 10 is caused to switch the image to be presented to the terminal device 20d by a specific action performed by the user.

For example, in response to a user operation of the button 7070b performed on the meeting view screen 700, illustrated in FIG. 37, displayed on the terminal device 20d, the server device 10 transmits the image displayed in the drawing area 5402 of the interactive whiteboard 22, or the image of the material data presented by the interactive whiteboard 22 during a period between the time $t_{awy}$, which is the time the user has left the seat, and the time $t_{rm}$, which is the time at which the user has returned, to the terminal device 20d.

The terminal device 20d displays the timeline display screen 710, which has been explained with reference to FIG. 49, and causes the timeline display screen 710 to display the thumbnail images $7132_1$, $7132_2$, and $7132_3$ of the images received from the server device 10 in the timeline display area 713. In response to a user operation made on the thumbnail image $7132_1$, $7132_2$, or $7132_3$, the terminal device 20d displays the image corresponding to the designated thumbnail image in the image display area 712.

In the manner described above, through an operation performed on the terminal device 20d, the user can select a desirable one of the images displayed in the drawing area 5402 of the interactive whiteboard 22 and the images of the material data presented by the interactive whiteboard 22 during the period between the timepoint at which the user has left the seat and the time point at which the user has returned, and display the image on the image display area 712. In this manner, the user can check the discussions made while the user has been absent, easily.

Another Example of Embodiment

In the above description, the terminal device 20d is caused to transmit the time at which the user leaves the seat or returns to the server device 10, in response to an operation of the button 7070a or 7070b in the meeting view screen 700, but the present invention is not limited thereto. For example, the terminal device 20d may cause the speech processor 204 to analyze the user's voice recorded with the microphone 2013, and, if the terminal device 20d determines that a predetermined keyword is included in the voice, as a result of the analysis, the terminal device 20d may detect and transmit the time at which the user has left the seat or returned, to the server device 10. In the same manner, the terminal device 20d may cause the video processor 205 to analyze the video data captured with the camera 2015, and, if the terminal device 20d determines that the video includes a predetermined pose of the user, as a result of the analysis, the terminal device 20d may detect and transmit the time at which the user has left the seat or returned, to the server device 10.

Figure 50:
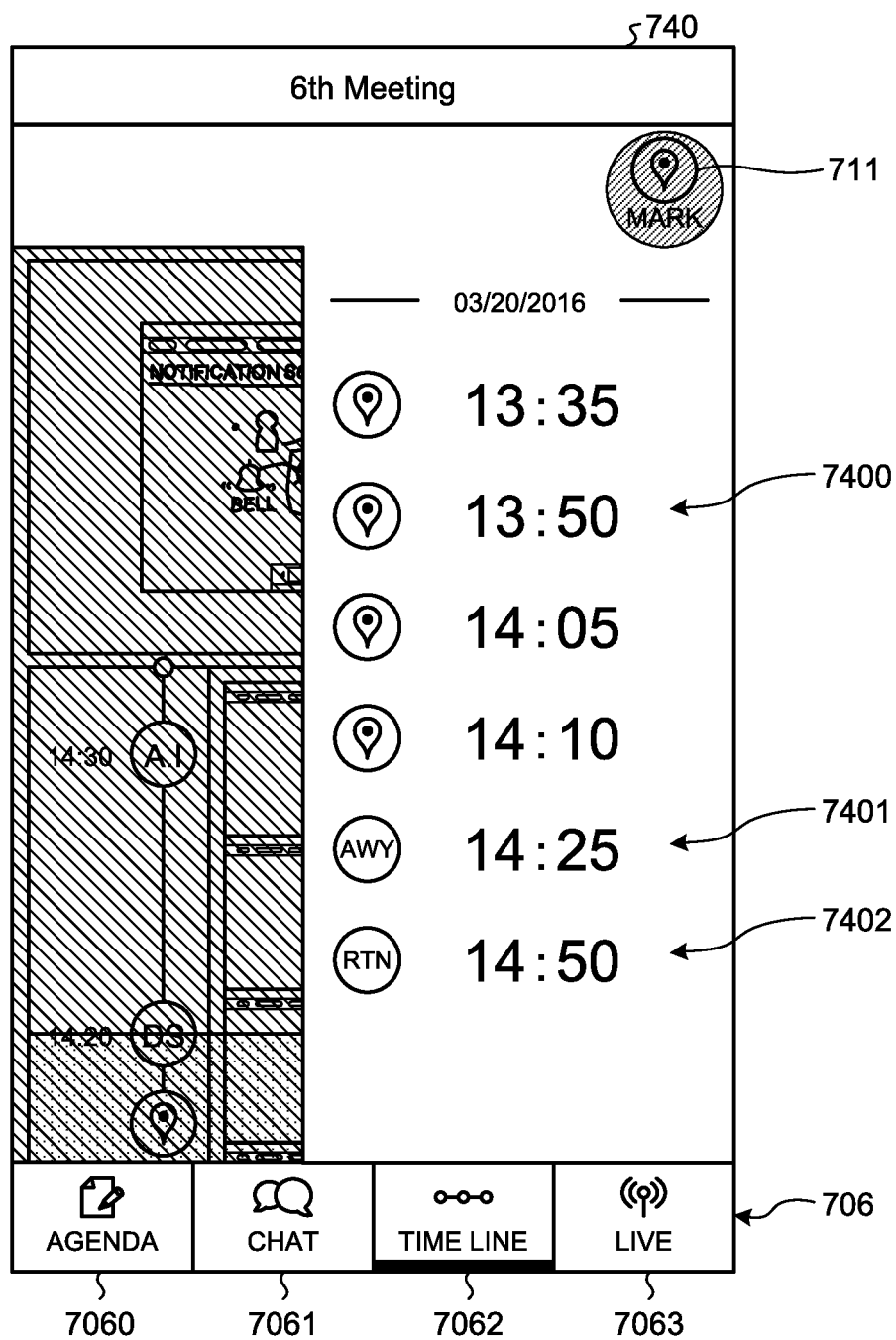
FIG. 50 is a schematic illustrating an example of a marker list screen including markers indicating a leave and a return applicable to the embodiments.

Furthermore, in the above description, the terminal device 20d requests the information subsequent to the leave from the server device 10, in response to an operation of the button 7070b performed in the meeting view screen 700, but the present invention is not limited thereto. For example, the terminal device 20d may generate marker information containing the time information indicating the time of the return, in response to an operation of the button 7070b, and store the marker information in the RAM 2002. When a user then makes an operation for displaying the list of markers, the terminal device 20d may display the marker list screen 740 including the marker 7401 indicating a leave and the marker 7402 indicating a return, as illustrated in FIG. 50. In such a case, the terminal device 20d requests the information subsequent to the leave from the server device 10, in response to an operation of one of the markers 7401 and 7402, for example.

Furthermore, in the above description, the time $t_{awy}$ is explained to be the time at which the user has temporarily left the seat, and the time $t_{rm}$ is the time at which the user has returned the meeting, but the present invention is not limited thereto. In other words, the time $t_{awy}$ and $t_{rm}$ may be any other two points in the speech data and the video data having been recorded in the server device 10, as long as the temporal relation of the two points is retained.

According to an aspect of the present invention, information between two points in a timeline can be checked easily, advantageously.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing apparatus comprising processing circuitry configured to
   acquire information sequentially in accordance with a first timeline;
   set, to the first timeline, a first timepoint and a second timepoint that is subsequent to the first timepoint on the first timeline; and
   present target information over a period between the second timepoint and a third timepoint that is subsequent to the second timepoint on the timeline, in accordance with a second timeline having a unit time shorter than a unit time of the first timeline, the target information being included in a period between the first timepoint and the third timepoint out of the acquired information.

2. The information processing apparatus according to claim 1, wherein the processing circuitry is configured to set the first timepoint and the second timepoint based on time at which an action of a user is received.

3. The information processing apparatus according to claim 1, wherein the third timepoint corresponds to latest time acquired.

4. The information processing apparatus according to claim 1, wherein
   the acquired information includes speech information, and
   the processing circuitry is further configured to
      detect a silent portion included in the speech information, and
      present the speech information by skipping the detected silent portion.

5. The information processing apparatus according to claim 1, wherein
   the acquired information includes speech information, and
   the processing circuitry is further configured to
      convert the speech information into text information, and
      present the text information resultant of conversion of the speech information.

6. The information processing apparatus according to claim 5, wherein the processing circuitry is configured to
   convert the speech information acquired over a section on the first timeline into the text information, and
   convert the speech information acquired over the section during which immediately previous conversion is performed into text information, from a timepoint at which the conversion is completed.

7. The information processing apparatus according to claim 1, wherein
   the acquired information includes pieces of image information, and
   the processing circuitry is further configured to switch, in response to an action of a user, the pieces of image information acquired over a period between the first timepoint and the second timepoint on the first timeline.

8. The information processing apparatus according to claim 1, wherein the processing circuitry is further configured to switch the second timeline to the first timeline as a timeline for presenting the target information, at a timepoint at which time on the first timeline matches corresponding time on the second timeline.

9. An information processing method comprising:
   acquiring information sequentially in accordance with a first timeline;
   setting, to the first timeline, a first timepoint and a second timepoint that is subsequent to the first timepoint on the first timeline; and
   presenting target information acquired at the acquiring and included in a period between the first timepoint and a third timepoint that is subsequent to the second timepoint on the timeline, over a period between the second timepoint and the third timepoint, in accordance with a second timeline a unit time of which is shorter than that of the first timeline.

10. An information processing system comprising:
    a terminal device; and
    an information processing apparatus,
    the terminal device including
       an input unit to which an input is made in response to an action of a user; and
       processing circuitry configured to replay information, and
    the information processing apparatus including processing circuitry configured to
       acquire information sequentially in accordance with a first timeline;
       set, to the first timeline, a first timepoint and a second timepoint that is subsequent to the first timepoint on the first timeline, in response to the action input to the input unit; and
       present target information over a period between the second timepoint and a third timepoint that is subsequent to the second timepoint on the timeline, in accordance with a second timeline having a unit time shorter than a unit time of the first timeline, the target information being included in a period between the first timepoint and the third timepoint out of the acquired information.

* * * * *